(12) United States Patent
De Lorenzo et al.

(10) Patent No.: US 10,117,065 B1
(45) Date of Patent: Oct. 30, 2018

(54) SYSTEMS AND METHODS FOR LEARNING WIRELESS TRANSCEIVER LOCATIONS AND UPDATING A SPATIALLY-DEPENDENT PATH-LOSS MODEL

(71) Applicant: Athentek Innovations, Inc., Palo Alto, CA (US)

(72) Inventors: David S. De Lorenzo, Palo Alto, CA (US); Huanchun Ye, Cupertino, CA (US); Ivy H. Tseng, Taipei (TW); Yi-Hsiu Wang, Palo Alto, CA (US)

(73) Assignee: Athentek Innovations, Inc., Palo Alto, CA (US)

( * ) Notice: Subject to any disclaimer, the term of this patent is extended or adjusted under 35 U.S.C. 154(b) by 0 days.

(21) Appl. No.: 15/611,727

(22) Filed: Jun. 1, 2017

(51) Int. Cl.
*H04W 24/00* (2009.01)
*H04W 4/04* (2009.01)
*H04B 17/318* (2015.01)
*H04W 16/20* (2009.01)
*H04W 88/08* (2009.01)

(52) U.S. Cl.
CPC .......... *H04W 4/043* (2013.01); *H04B 17/318* (2015.01); *H04W 16/20* (2013.01); *H04W 88/08* (2013.01)

(58) Field of Classification Search
CPC ... H04W 4/043; H04W 17/318; H04W 16/20; H04W 88/08
See application file for complete search history.

(56) References Cited

U.S. PATENT DOCUMENTS

| | | | | |
|---|---|---|---|---|
| 5,950,131 A | * | 9/1999 | Vilmur | H04B 7/2637 370/332 |
| 6,094,580 A | * | 7/2000 | Yu | H04W 16/18 455/446 |
| 6,125,280 A | | 9/2000 | Grandhi et al. | |
| 6,292,929 B2 | * | 9/2001 | Scepanovic | G06F 17/5072 716/118 |
| 6,336,035 B1 | * | 1/2002 | Somoza | H04W 16/18 455/423 |
| 6,711,148 B1 | * | 3/2004 | Hills | H04L 41/0823 370/338 |

(Continued)

*Primary Examiner* — Stephen M D Agosta
(74) *Attorney, Agent, or Firm* — Levine Bagade Han LLP

(57) ABSTRACT

An indoor positioning system determines the location of a mobile device by comparing measured signal strengths to a database determined via offline calibration. Automated maintenance and repair of the database are facilitated by accurately characterizing indoor radio signal propagation. Systems and methods for generating spatially-dependent path-loss models are disclosed. In one variation, a computer-implemented method of generating a spatially-dependent path-loss model involves dividing a coordinate-plane representing an indoor environment into non-overlapping tiles; obtaining transmit and received signal strengths of radio signals generated by a calibration device at a number of reference points and measured at a number of wireless access points; calculating vectors which represent the traversal distances of the tiles by each of the radio signals; and solving a system of path-loss equations relating the transmit signal strengths, the received signal strengths, and the distance vectors to determine values for tile-specific path-loss coefficients for each of the tiles.

19 Claims, 32 Drawing Sheets

(56) References Cited

U.S. PATENT DOCUMENTS

| | | |
|---|---|---|
| 6,990,428 B1 | 1/2006 | Kaiser et al. |
| 7,415,262 B2 | 8/2008 | Liu et al. |
| 7,751,829 B2 * | 7/2010 | Masuoka .............. G01S 5/0294 |
| | | 455/41.2 |
| 8,886,210 B1 | 11/2014 | Sugar |
| 2002/0071395 A1 | 6/2002 | Redi et al. |
| 2006/0075131 A1 * | 4/2006 | Douglas ................ G01S 5/0252 |
| | | 709/230 |
| 2008/0043637 A1 * | 2/2008 | Rahman ................. H04L 45/22 |
| | | 370/254 |
| 2008/0180227 A1 * | 7/2008 | Le ........................... H04L 12/66 |
| | | 340/286.02 |
| 2008/0182528 A1 | 7/2008 | Le et al. |
| 2011/0117924 A1 | 5/2011 | Brunner et al. |
| 2014/0308976 A1 | 10/2014 | Garin et al. |
| 2014/0314003 A1 | 10/2014 | Zhou et al. |
| 2015/0080013 A1 * | 3/2015 | Venkatraman ...... H04W 64/003 |
| | | 455/456.1 |
| 2015/0257014 A1 | 9/2015 | Ahmed et al. |

\* cited by examiner

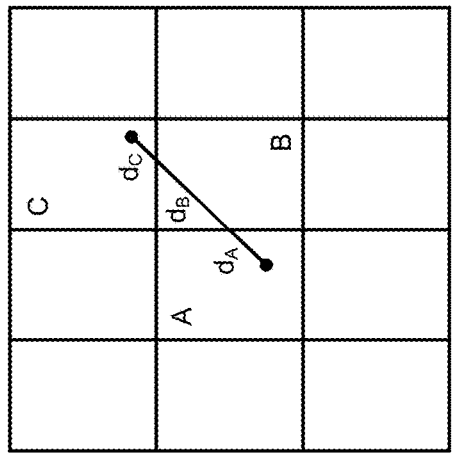
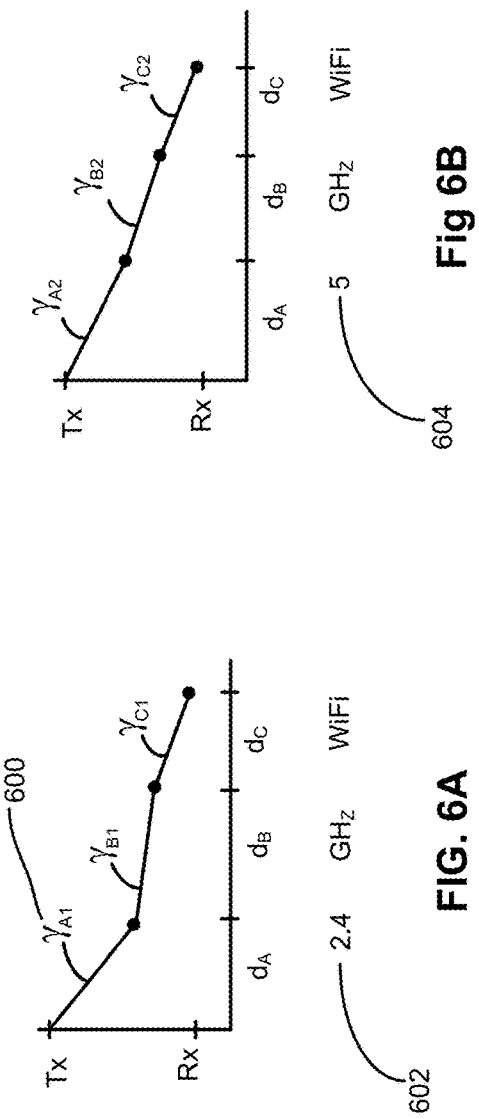
Fig 6B
FIG. 6A $$d_{ijk} = \sum_{1}^{n} d_{ijk,n} \quad \text{where } d_{ijk,n} \triangleq \text{the } n^{th} \text{ distance segment in tile } k$$

$$d_{ij1} = d_{ij1,1} + d_{ij1,2}$$

$$d_{ij2} = d_{ij2,1} + d_{ij2,2} + d_{ij2,3}$$

$$d_{ij} = |\vec{X_j} - \vec{X_i}| = \sum_{k=1}^{2} d_{ijk}$$

$$rssi_{ij} = tx_j - \begin{bmatrix} d_{ij1} & d_{ij2} & \cdots & d_{ijk} \end{bmatrix} \begin{bmatrix} \gamma_1 \\ \gamma_2 \\ \vdots \\ \gamma_k \end{bmatrix}$$

$$tx_j - rssi_{ij} = \begin{bmatrix} d_{ij1} & d_{ij2} & \cdots & d_{ijk} \end{bmatrix} \begin{bmatrix} \gamma_1 \\ \gamma_2 \\ \vdots \\ \gamma_k \end{bmatrix}$$

FIG. 13

$$[\gamma_1 \; \gamma_2 \; \cdots \; \gamma_k]$$

$$\begin{bmatrix} d_{111} & d_{121} & d_{1N1} & d_{211} & d_{221} & d_{2N1} & d_{N11} & d_{N21} & d_{NN1} \\ \vdots & \vdots & \vdots & \vdots & \vdots & \vdots & \vdots & \vdots & \vdots \\ d_{112} & d_{122} & d_{1N2} & d_{212} & d_{222} & d_{2N2} & d_{N12} & d_{N22} & d_{NN2} \\ d_{11K} & d_{12K} & d_{1NK} & d_{21K} & d_{22K} & d_{2NK} & d_{N1K} & d_{N2K} & d_{NNK} \end{bmatrix}$$

$$=$$

$$[tx_1 - rssi_{11} \;\; tx_2 - rssi_{12} \;\; \cdots \;\; tx_N - rssi_{1N} \;\; tx_1 - rssi_{21} \;\; tx_2 - rssi_{22} \;\; \cdots \;\; tx_N - rssi_{2N} \;\; \cdots \;\; tx_1 - rssi_{N1} \;\; tx_2 - rssi_{N2} \;\; \cdots \;\; tx_N - rssi_{NN}]$$

FIG. 14

$$T \triangleq [t_{x1} \; t_{x2} \; \cdots \; t_{xN} \; t_{x1} \; t_{x2} \; \cdots \; t_{xN} \; \cdots]$$

this repeats 'N' times $$R \triangleq [r_{11} \; r_{12} \; \cdots \; r_{1N} \; r_{21} \; r_{22} \; \cdots \; r_{2N} \; \cdots \; r_{N1} \; r_{N2} \; \cdots \; r_{NN}]$$

$$\Gamma \triangleq [\gamma_1 \; \gamma_2 \; \cdots \; \gamma_K]^T$$

$$\Gamma = \underbrace{(D^*D)^{-1}D^*}_{\text{Pseudo inverse of D}}(T-R) \quad 1502$$

FIG. 15

$$
\begin{bmatrix}
tx_1 - rssi_{11} \\
tx_2 - rssi_{12} \\
\vdots \\
tx_N - rssi_{1N} \\
tx_{N+1} - rssi_{1(N+1)} \\
\vdots \\
tx_{N+M} - rssi_{1(N+M)} \\
tx_1 - rssi_{21} \\
\vdots \\
tx_{N+M} - rssi_{2(N+M)} \\
\vdots \\
tx_1 - rssi_{N1} \\
\vdots \\
tx_{N+M} - rssi_{N(N+M)} \\
tx_1 - rssi_{(N+1)1} \\
tx_2 - rssi_{(N+1)2} \\
\vdots \\
tx_N - rssi_{(N+1)N} \\
tx_1 - rssi_{(N+2)1} \\
\vdots \\
tx_N - rssi_{(N+2)1} \\
\vdots \\
tx_1 - rssi_{(N+M)1} \\
\vdots \\
tx_N - rssi_{(N+M)N}
\end{bmatrix}
=
\begin{bmatrix}
d_{111} & d_{112} & \cdots & d_{12K} \\
d_{121} & d_{122} & \cdots & d_{12K} \\
\vdots & \vdots & & \vdots \\
d_{1N1} & d_{1N2} & \cdots & d_{1NK} \\
d_{1(N+1)1} & d_{1(N+1)2} & \cdots & d_{1(N+1)K} \\
\vdots & \vdots & & \\
d_{1(N+M)1} & d_{1(N+M)2} & \cdots & d_{1(N+M)K} \\
d_{211} & d_{212} & \cdots & d_{21K} \\
\vdots & \vdots & & \\
d_{2(N+M)1} & d_{2(N+M)2} & \cdots & d_{2(N+M)K} \\
\vdots & \vdots & & \vdots \\
d_{N11} & d_{N12} & \cdots & d_{N1K} \\
\vdots & \vdots & & \\
d_{N(N+M)1} & d_{N(N+M)2} & \cdots & d_{N(N+M)K} \\
d_{(N+M)11} & d_{(N+M)12} & \cdots & d_{(N+M)1K} \\
d_{(N+1)2} & d_{(N+1)22} & \cdots & d_{(N+1)2K} \\
\vdots & \vdots & & \\
d_{(N+1)N1} & d_{(N+1)N2} & \cdots & d_{(N+1)NK} \\
d_{(N+2)11} & d_{(N+2)12} & \cdots & d_{(N+2)1K} \\
\vdots & \vdots & & \\
d_{(N+2)11} & d_{(N+2)12} & \cdots & d_{(N+2)1K} \\
\vdots & \vdots & & \\
d_{(N+M)11} & d_{(N+M)12} & \cdots & d_{(N+M)1K} \\
\vdots & \vdots & & \\
d_{(N+M)N1} & d_{(N+M)N2} & \cdots & d_{(N+M)NK}
\end{bmatrix}
\begin{bmatrix}
\gamma_1 \\
\gamma_2 \\
\vdots \\
\gamma_k
\end{bmatrix}
$$

FIG. 20

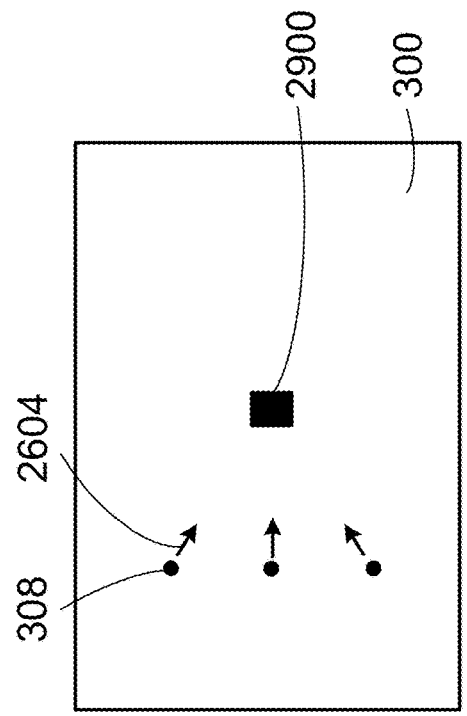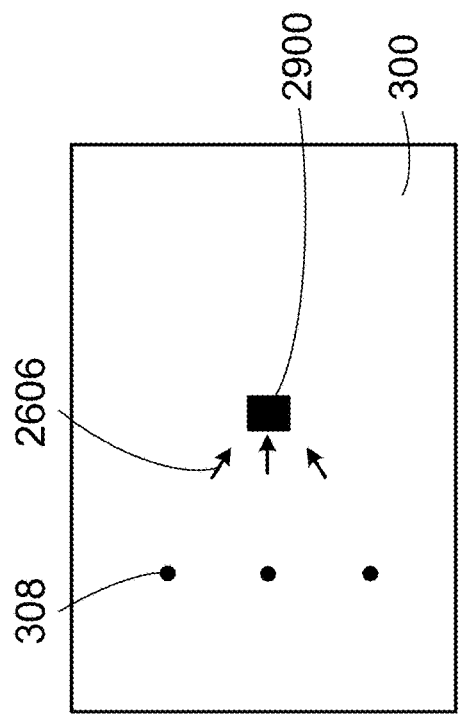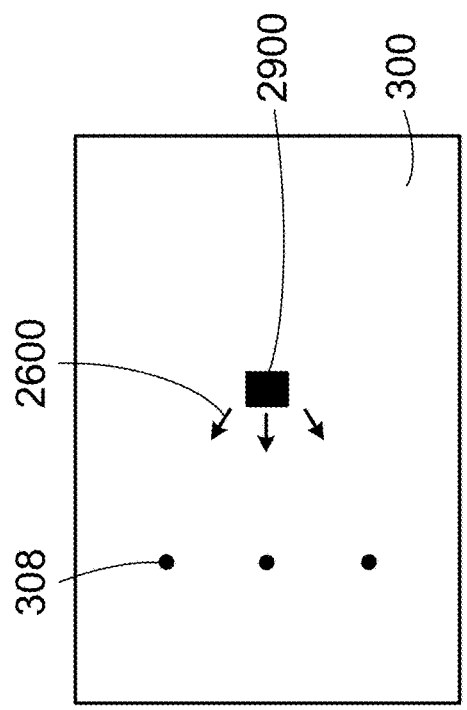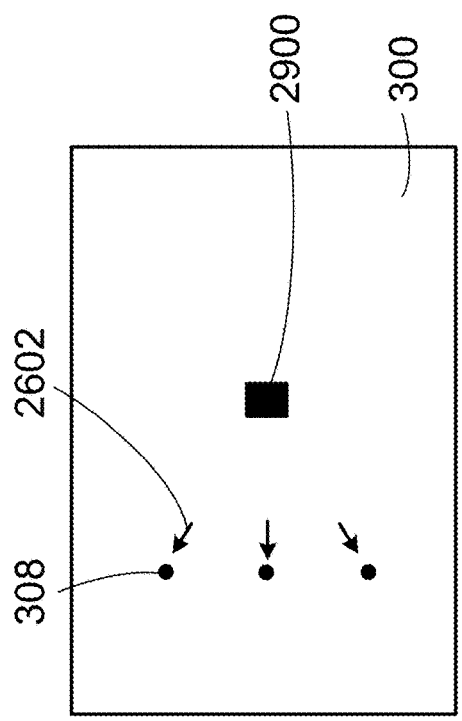

SYSTEMS AND METHODS FOR LEARNING WIRELESS TRANSCEIVER LOCATIONS AND UPDATING A SPATIALLY-DEPENDENT PATH-LOSS MODEL

BACKGROUND

1. Field of the Technology

The present disclosure relates generally to the field of wireless communication, and, more specifically, to systems and methods of generating spatially-dependent path-loss models and learning the locations of wireless transceivers using such spatially-dependent path-loss models.

2. Related Art

Portable devices that receive their location information through wireless connections are becoming more common. Location information can be obtained from GPS, cellular, Wi-Fi, or other radio frequency location modalities. The location of portable devices with wireless transceivers can be learned with various algorithms. The signals received by devices are affected by losses in the environment. Environments can be indoor or outdoor and wireless signal loss can be modeled with fixed as well as adaptive spatially-dependent path-loss models.

Solutions are needed for systems and methods to conveniently and effectively learn wireless transceiver locations. Such a solution should be robust, relatively low-cost, and provide an accurate representation of the path-losses between wireless transceivers as well as between wireless transceivers and devices that access those wireless transceivers. Moreover, such a solution should not be overly complex and should be easy to deploy.

SUMMARY

A high-accuracy indoor positioning system (IPS) can employ Wi-Fi signal strength measurements and a weighted-K-Nearest Neighbor (weighted-KNN) location algorithm. The IPS can determine the location of a mobile device in the following manner. The mobile device can broadcast a radio signal. That radio signal can be detected by a number of fixed wireless access points (APs). Each AP can measure the signal strength of the radio signal. The signal strength values at each AP comprise a measurement vector. The measurement vector can be compared to prediction vectors stored in a signal strength database. The comparison can employ a weighted-KNN location algorithm. Based on the comparison, a location of the mobile device can be computed. Broadly, operation of an IPS can comprise the following steps.

The first step can be deployment planning, which comprises a number of sub-steps. First, engineers can obtain building floor plans, site maps, and other available facility information pertinent to the installation, operation, and maintenance of the IPS. Next, engineers or automated systems can determine one or more suitable local coordinate systems as well as required rotations and translations of those coordinate systems to an Earth-fixed coordinate basis. Next, automated, semi-automated, or manual procedures can process building floor plans in order to determine exterior and interior boundaries, features likely to exhibit significant radio signal attenuation, and routing information. The routing information comprises paths which define permissible routes within the indoor environment as well as entry and exit points and between-floor portals. Next, for each region or floor within the indoor environment, the number and install locations of the wireless access points (APs) can be determined for purposes of locating Wi-Fi equipped mobile devices. For example, a rule-of-thumb on wireless AP density may be that for typical deployments, experience indicates that required 67th percentile accuracy, in meters, can be approximately equal to one-third the median inter-AP separation. So, if required 67th percentile accuracy is three meters, then median inter-AP separation should be 10 meters. Guidance on where to install wireless APs includes achieving roughly uniform AP spatial density, situating the APs in less-trafficked and unobtrusive locations within the indoor environment, and, for AC-powered APs, proximity to an electrical outlet. Next, annotate building floor plans with icons or markers showing approximate locations where new wireless APs can be installed. Finally, when deployment includes the optional step of a calibration reference survey, develop a suggested route which a calibration device can follow when conducting the survey, and annotate building floor plans as required.

The next step can be to procure, configure, and install new wireless APs, which can be provisioned for locating Wi-Fi equipped mobile devices, and optionally to log work completion with a smartphone application, or "app". The workflow for installing each new AP comprises a number of sub-steps. First, a field technician can go to the suggested location for the new AP based on map and text guidance shown on their smartphone or tablet computer. Next, for AC-powered APs, the technician can insert the AP's power connector into an AC wall outlet; for battery-powered APs, the technician can toggle a power switch or otherwise cause the AP to power-on. Then, in their smartphone app, the technician can drop a push-pin at the location where this new AP has been installed; the smartphone app can communicate the push-pin location to a server. Immediately following AP power-on, the AP can check-in with the server. Thus, the server can associate the push-pin dropped in the smartphone app, and its location, with the identifier of this newest wireless AP to check in. Finally, the server can communicate to the smartphone app that the field technician can continue with installation of the next AP.

The next step can be that the wireless APs perform self-calibration scans ("self" here refers not to each AP, but to "IPS self-calibration", a mechanism for IPS automatic calibration). A purpose of this step can be that the APs discover and communicate with their neighbors in order to measure the radio signal attenuation between each pair of APs. With self-calibration, the system can operate in two distinct and alternating states, normal operations and self-calibration mode. Normal operations, as the name indicates, can be the usual condition, while self-learning mode can be reserved for times when location estimation availability is at a lower priority. During normal operations, each wireless AP can be more or less constantly "camped" on the particular wireless channel associated with its upstream AP from the facility's existing wireless network.

In other words, when an AP has data to communicate to the server, then it can use this connection to the facility's existing wireless network to securely transmit that data. Concurrently, each AP can be listening for beacon signals, data packets, and other network transmissions from mobile devices which are to be located. The signals from a particular mobile device, received near-simultaneously by a number of APs, can be part of the measurement vector which can be used by the IPS to estimate the location of the mobile device at that time. Furthermore, since there may not be a single channel on which all APs are camped, and since the channel list may not be known beforehand, mobile devices which transmit beacon signals may be hard-coded to transmit on a particular list of channels, or they may transmit on all available channels. Thus, a mobile device may be near-simultaneously received by APs camped on several channels. During self-calibration mode, each wireless AP can issue probe requests in order to elicit probe response messages from its neighboring APs, which can probe response messages it uses to estimate the signal attenuation between these neighbors and itself. When and on what channel an AP issues each probe request may be randomized, i.e., channel randomization among a list of configured channels in order to probe all of its neighbors (regardless of which channels they are on), and time randomization in order to minimize collisions with probe requests issued by neighboring APs. The measurements made by a wireless AP during normal operations and self-calibration mode can be uploaded to a server.

Following or concurrent to the self-calibration step can be an optional step of a calibration reference survey, wherein attenuation between various locations within the facility can be measured. During this step, a calibration device can be maneuvered manually, semi-autonomously, or autonomously throughout the indoor environment, visiting in turn each of a succession of calibration reference points (either pre-determined or established subsequent to the calibration reference survey based on locations at which measurements were made). The calibration device may be transmit-only, receive-only, or both transmit and receive. The signals from the calibration device to the wireless APs, from the wireless APs to the calibration device, or between (i.e., to and from) the calibration device and the wireless APs, respectively, allow measuring the signal strengths of wireless signals between the APs and the RPs. As an example, the workflow for one route of a manual calibration reference survey can be summarized. First, a field technician goes to the suggested location for the start of the calibration survey. In a smartphone app, the technician drops a push-pin to indicate their location at the start of the route; the app communicates the push-pin location to the server. In addition, there may be an inertial measurement unit (IMU) attached or proximate to, or integral with, the calibration device, which aids in reconstruction of the calibration route. Next, the technician travels along the suggested survey route, periodically dropping push-pins to assist in route reconstruction. Upon conclusion of the calibration survey, the technician drops a final push-pin to indicate their location at the end of the route. During or subsequent to the survey, all measurements can be uploaded to the server.

The next step can be to construct a Wi-Fi signal strength database, which database predicts what the measurements would be if a mobile device were situated at various locations throughout the indoor environment. In other words, if a mobile device were situated at a particular location, then the signal strength measurements can match the predictions in the database for that location better (i.e., a smaller difference between the values) than for the predictions for a location far-removed from where the mobile device is. The Wi-Fi signal strength database also may contain estimated locations for the wireless APs installed for purposes of locating mobile devices. For example, recall that during the self-calibration step, each AP can have broadcast a radio signal in response to its neighbors' probe requests. The signal strength values at each neighbor comprise a measurement vector. The measurements for each wireless AP can be processed in a manner analogous to the processing of a mobile device measurement vector, as described above, in order to determine the location of that AP.

Systems and methods for determining a spatially-dependent path-loss model, for provisioning data of new wireless APs into a signal strength database, and for updating data of moved wireless APs into a signal strength database are disclosed herein. Provisioning a new AP or updating a moved AP utilize the estimated location of the new or moved AP and the spatially-dependent path-loss model in order to determine signal strength values of that AP at each of several calibration reference points (RPs). Thus, systems and methods are disclosed for initial provisioning of an IPS and for automated maintenance and repair of an IPS.

A system to generate a spatially-dependent path-loss model associated with an indoor environment is disclosed. The system can include wireless access points (APs) positioned throughout the indoor environment and a server. The server can include a processing unit, a memory unit, and a server communication unit. The server communication unit is in communication with the wireless APs, and the processing unit can be programmed to divide a coordinate-plane representing the indoor environment into non-overlapping tiles. The processing unit can be further programmed to obtain AP transmit strengths of wireless signals generated by each of the wireless APs to the other wireless APs at a first frequency. The AP transmit strengths can be obtained from each of the wireless APs or a wireless signal-strength database. The processing unit can be further programmed to obtain AP-to-AP received signal strength indicators (RSSIs) measured at each of the wireless APs from the wireless signals transmitted by the other wireless APs at the first frequency. The AP-to-AP RSSIs can be obtained from each of the wireless APs or the wireless signal-strength database. The processing unit can be further programmed to obtain AP-to-AP distance vectors between each of the wireless APs, and construct a set of path-loss equations using the AP transmit strengths at the first frequency, the AP-to-AP RSSIs obtained at the first frequency, the AP-to-AP distance vectors, and a tile-specific path-loss coefficient for each of the tiles within the indoor environment. The processing unit can be further programmed to solve the set of path-loss equations to yield a value for the tile-specific path-loss coefficient for each of the tiles within the indoor environment.

The processing unit can be further programmed to obtain additional AP transmit strengths of wireless signals generated by each of the wireless APs to the other wireless APs at a second frequency different from the first frequency, wherein the additional AP transmit strengths are obtained from each of the wireless APs or the wireless signal-strength database. The processing unit can be further programmed to obtain additional AP-to-AP RSSIs measured at each of the wireless APs from the wireless signals transmitted by the other wireless APs at the second frequency. The additional AP-to-AP RSSIs can be obtained from each of the wireless APs or the wireless signal-strength database. The processing unit can be further programmed to construct another set of path-loss equations using the additional AP transmit strengths at the second frequency, the additional AP-to-AP RSSIs obtained at the second frequency, the AP-to-AP distance vectors, and another tile-specific path-loss coefficient for each of the tiles within the indoor environment, and solve the other set of path-loss equations to yield a value for the other tile-specific path-loss coefficient for each of the tiles within the indoor environment.

The system can have at least one of the tiles shaped as a polygon having at least three sides. The tiles can have at least a first tile having a first shape and a second tile having a second shape. The first shape can be different from the second shape. The system can select a side of the first shape to align with a physical feature of the indoor environment that attenuates wireless signals at the first frequency. The system can have a calibration device moveable within the indoor environment such that the calibration device is configured to transmit wireless signals to the wireless APs at a number of calibration reference points (RPs) located throughout the indoor environment. The processing unit of the server can be further programmed to obtain RP calibration transmit strengths of the wireless signals generated by the calibration device at each of the calibration RPs to the wireless APs at the first frequency. The RP calibration transmit strengths can be obtained from the calibration device or the wireless signal-strength database. The processing unit can be further programmed to obtain RP-to-AP calibration RSSIs measured at each of the wireless APs from the wireless signals transmitted by the calibration device at each of the calibration RPs at the first frequency. The RP-to-AP calibration RSSIs can be obtained from each of the wireless APs or the wireless signal-strength database. The processing unit can be further programmed to calculate RP-to-AP distance vectors between each of the calibration RPs and the wireless APs, and construct the set of path-loss equations using the AP transmit strengths at the first frequency, the RP calibration transmit strengths at the first frequency, the AP-to-AP RSSIs obtained at the first frequency, the RP-to-AP calibration RSSIs obtained at the first frequency, the AP-to-AP distance vectors, the RP-to-AP distance vectors, and the tile-specific path-loss coefficient for each of the tiles within the indoor environment.

The system can be further programmed to obtain AP-to-RP calibration RSSIs measured by the calibration device at each of the calibration RPs from the wireless signals transmitted by each of the wireless APs at the first frequency. The AP-to-RP calibration RSSIs can be obtained from the calibration device or the wireless signal-strength database. The processing unit can be further programmed to construct the set of path-loss equations using the AP transmit strengths at the first frequency, the RP calibration transmit strengths at the first frequency, the AP-to-AP RSSIs obtained at the first frequency, the RP-to-AP calibration RSSIs obtained at the first frequency, the AP-to-RP calibration RSSIs obtained at the first frequency, the AP-to-AP distance vectors, the RP-to-AP distance vectors, and the tile-specific path-loss coefficient for each of the tiles within the indoor environment.

The processing unit can be further programmed to divide the coordinate plane into a number of the non-overlapping tiles covering the indoor environment. The number of tiles can be dependent on an amount of wireless APs and calibration RPs within the indoor environment.

The system can further include a calibration device moveable within the indoor environment such that the calibration device is configured to receive wireless signals transmitted by the wireless APs at a number of calibration reference points (RPs) located throughout the indoor environment. The processing unit can be further programmed to obtain AP-to-RP calibration RSSIs measured by the calibration device at each of the calibration RPs from the wireless signals transmitted by each of the wireless APs at the first frequency. The AP-to-RP calibration RSSIs can be obtained from the calibration device or the wireless signal-strength database. The processing unit can be further programmed to calculate AP-to-RP distance vectors between each of the wireless APs and the calibration RPs, and construct the set of path-loss equations using the AP transmit strengths at the first frequency, the AP-to-AP RSSIs obtained at the first frequency, the AP-to-RP calibration RSSIs obtained at the first frequency, the AP-to-AP distance vectors, the AP-to-RP distance vectors, and the tile-specific path-loss coefficient for each of the tiles within the indoor environment.

The processing unit can be further programmed to divide the coordinate plane into a number of the non-overlapping tiles covering the indoor environment. The number of tiles can be dependent on an amount of wireless APs and calibration RPs within the indoor environment.

A path-loss within each of the tiles can be spatially independent such that the tile-specific path-loss coefficient calculated for each of the tiles is a constant value.

The AP transmit strengths can be signal strengths of idealized single-ray signals transmitted by each of the wireless APs. The AP-to-AP RSSIs can be signal strengths of the idealized single-ray signals received by each of the wireless APs.

The wireless APs can include a first AP and a second AP located in different tiles. The tile-specific path-loss coefficient calculated for each of the tiles can be direction-independent such that a transmit strength of a first wireless signal generated by the first AP to the second AP minus an RSSI of the first wireless signal received by the second AP equals the transmit strength of a second wireless signal generated by the second AP to the first AP minus an RSSI of the second wireless signal received by the first AP.

The tile specific path-loss coefficient can have units of dB/meter.

Solving the set of path-loss equations can include applying a pseudoinverse to the set of path-loss equations.

A method of generating a spatially-dependent path-loss model associated with an indoor environment is also disclosed. The method can include dividing, using a processing unit of a server, a coordinate-plane representing the indoor environment into non-overlapping tiles. The method can also include obtaining, using a server communication unit of the server coupled to the processing unit, AP transmit strengths of wireless signals generated by wireless access point (APs) positioned throughout the indoor environment to each of the other wireless APs at a first frequency. The AP transmit strengths can be obtained from each of the wireless APs or a wireless signal-strength database. The method can also include obtaining, using the server communication unit, AP-to-AP received signal strength indicators (RSSIs) measured at each of the wireless APs from the wireless signals transmitted by the other wireless APs at the first frequency. The AP-to-AP RSSIs can be obtained from each of the wireless APs or the wireless signal-strength database. The method can also include calculating, using the processing unit, AP-to-AP distance vectors between each of the wireless APs and constructing, using the processing unit, a set of path-loss equations using the AP transmit strengths at the first frequency, the AP-to-AP RSSIs obtained at the first frequency, the AP-to-AP distance vectors, and a tile-specific path-loss coefficient for each of the tiles within the indoor environment. The method can also include solving, using the processing unit, the set of path-loss equations to yield a value for the tile-specific path-loss coefficient for each of the tiles within the indoor environment.

The method can further include obtaining, using the server communication unit, additional AP transmit strengths of wireless signals generated by each of the wireless APs to the other wireless APs at a second frequency different from the first frequency. The additional AP transmit strengths can be obtained from each of the wireless APs or a wireless signal-strength database. The method can further include obtaining, using the server communication unit, additional AP-to-AP RSSIs measured at each of the wireless APs from the wireless signals transmitted by the other wireless APs at the second frequency, wherein the additional AP-to-AP RSSIs are obtained from each of the wireless APs or the wireless signal-strength database. The method can further include constructing, using the processing unit, another set of path-loss equations using the additional AP transmit strengths at the second frequency, the additional AP-to-AP RSSIs obtained at the second frequency, the AP-to-AP distance vectors, and another tile-specific path-loss coefficient for each of the tiles within the indoor environment. The method can further include solving, using the processing unit, the other set of path-loss equations to yield a value for the other tile-specific path-loss coefficient for each of the tiles within the indoor environment.

The method can further include obtaining, using the server communication unit, RP calibration transmit strengths of the wireless signals generated by a calibration device at a number of calibration reference points (RPs) at the first frequency. The calibration device can be moveable within the indoor environment such that the calibration device can be configured to transmit wireless signals to the wireless APs at the calibration RPs located throughout the indoor environment. The RP calibration transmit strengths can be obtained from the calibration device or the wireless signal-strength database. The method can further include obtaining, using the server communication unit, RP-to-AP calibration RSSIs measured at each of the wireless APs from the wireless signals transmitted by the calibration device at each of the calibration RPs at the first frequency. The RP-to-AP calibration RSSIs can be obtained from each of the wireless APs or the wireless signal-strength database. The method can further include calculating, using the processing unit, RP-to-AP distance vectors between each of the calibration RPs and the wireless APs, and constructing, using the processing unit, the set of path-loss equations using the AP transmit strengths at the first frequency, the RP calibration transmit strengths at the first frequency, the AP-to-AP RSSIs obtained at the first frequency, the RP-to-AP calibration RSSIs obtained at the first frequency, the AP-to-AP distance vectors, the RP-to-AP distance vectors, and the tile-specific path-loss coefficient for each of the tiles within the indoor environment.

The method can further include obtaining, using the server communication unit, AP-to-RP calibration RSSIs measured by the calibration device at each of the calibration RPs from the wireless signals transmitted by each of the wireless APs at the first frequency. The AP-to-RP calibration RSSIs can be obtained from the calibration device or the wireless signal-strength database. The method can further include constructing, using the processing unit, the set of path-loss equations using the AP transmit strengths at the first frequency, the RP calibration transmit strengths at the first frequency, the AP-to-AP RSSIs obtained at the first frequency, the RP-to-AP calibration RSSIs obtained at the first frequency, the AP-to-RP calibration RSSIs obtained at the first frequency, the AP-to-AP distance vectors, the RP-to-AP distance vectors, and the tile-specific path-loss coefficient for each of the tiles within the indoor environment.

A non-transitory computer-readable medium comprising instructions stored thereon is also disclosed. The instructions, that when executed by a processing unit, can perform the steps of dividing a coordinate-plane representing the indoor environment into non-overlapping tiles and obtaining AP transmit strengths of wireless signals generated by wireless access point (APs) positioned throughout the indoor environment to each of the other wireless APs at a first frequency. The AP transmit strengths can be obtained from each of the wireless APs or a wireless signal-strength database. The instructions can also perform the steps of obtaining AP-to-AP received signal strength indicators (RSSIs) measured at each of the wireless APs from the wireless signals transmitted by the other wireless APs at the first frequency, wherein the AP-to-AP RSSIs are obtained from each of the wireless APs or the wireless signal-strength database, calculating AP-to-AP distance vectors between each of the wireless APs, constructing a set of path-loss equations using the AP transmit strengths at the first frequency, the AP-to-AP RSSIs obtained at the first frequency, the AP-to-AP distance vectors, and a tile-specific path-loss coefficient for each of the tiles within the indoor environment, and solving the set of path-loss equations to yield a value for the tile-specific path-loss coefficient for each of the tiles within the indoor environment.

A system to discover a new wireless access point (AP) within an indoor environment is also disclosed. The system can include a server and wireless APs positioned throughout the indoor environment. The wireless APs include the new wireless AP. The server can include a processing unit, a memory unit, and a server communication unit. The server communication unit is in communication with the wireless APs. The processing unit can be programmed to obtain AP transmit strengths of wireless signals generated by the new wireless AP to the other wireless APs and of the wireless signals generated by the other wireless APs to the new wireless AP. The AP transmit strengths can be obtained from the new wireless AP and the other wireless APs or a wireless signal-strength database. The processing unit can be further programmed to obtain AP-to-AP received signal strength indicators (RSSIs) measured at the new wireless AP from the wireless signals transmitted by the other wireless APs and the AP-to-AP RSSIs measured at each of the other wireless APs from the wireless signals transmitted by the new wireless AP, wherein the AP-to-AP RSSIs are obtained from the new wireless AP and the other wireless APs or a wireless signal-strength database. The processing unit can be further programmed to determine a location of the new wireless AP within the indoor environment using at least one of information from an installation log and an AP location solver based on information from the AP transmit strengths, the AP-to-AP RSSIs, and data from a wireless signal-strength database. The processing unit can be further programmed to calculate a number of estimated AP-to-RP RSSIs representing estimated RSSIs which would be measured at the calibration RPs from wireless signals transmitted by the new wireless AP to the calibration RPs using a spatially-dependent path-loss model based on the location of the new wireless AP, the AP transmit strength of the new wireless AP, and the tile-specific path-loss coefficient for each of the tiles within the indoor environment, and add estimated AP-to-RP RSSIs to the wireless signal-strength database.

The processing unit can be further programmed to calculate AP-to-AP distance vectors between each of the APs and the new wireless AP using the location of the new wireless AP calculated prior to calculating the estimated AP-to-RP RSSIs.

The processing unit can be further programmed to calculate RP-to-AP distance vectors between each of the calibration RPs and the new wireless AP using the location of the new wireless AP calculated prior to calculating the estimated AP-to-RP RSSIs.

The processing unit can be further programmed to identify the new wireless AP as a previously unseen AP prior to determining the location of the new wireless AP by comparing the AP transmit strengths and the AP-to-AP RSSIs against transmit strength data and RSSI data previously stored in the wireless signal-strength database, and add an entry in the wireless signal-strength database associated with the new wireless AP.

The AP transmit strengths can be signal strengths of idealized single-ray signals transmitted by the new wireless AP and the other wireless APs. The AP-to-AP RSSIs can be signal strengths of the idealized single-ray signals received by the new wireless AP and the other wireless APs.

A system to discover a moved wireless access point (AP) within an indoor environment is also disclosed. The system can include a server and wireless APs positioned throughout the indoor environment. At least one of the wireless APs has been physically moved within the indoor environment since a previous check-in. The server can include a processing unit, a memory unit, and a server communication unit. The server communication unit is in communication with the wireless APs. The processing unit can be programmed to obtain AP transmit strengths of wireless signals generated by each of the wireless APs to other wireless APs, and obtain AP-to-AP received signal strength indicators (RSSIs) measured at each of the wireless APs from the wireless signals generated by each of the other wireless APs, and flag one of the wireless APs as the moved wireless AP by comparing the AP transmit strengths and the AP-to-AP RSSIs against transmit strength data and RSSI data previously stored in the wireless signal-strength database, and determine a location of the moved wireless AP within the indoor environment using at least one of information from an installation log and an AP location solver based on information from the AP transmit strengths, the AP-to-AP RSSIs, and data from the wireless signal-strength database, and calculate a number of estimated AP-to-RP RSSIs representing estimated RSSIs which would be measured at the calibration RPs from wireless signals transmitted by the moved wireless AP to the calibration RPs using a spatially-dependent path-loss model based on the location of the moved wireless AP, the AP transmit strength of the moved wireless AP, and the tile-specific path-loss coefficient for each of the tiles within the indoor environment, and add the estimated AP-to-RP RSSIs to the wireless signal-strength database.

The AP transmit strengths can be signal strengths of idealized single-ray signals transmitted by the moved wireless AP and the other wireless APs. The AP-to-AP RSSIs can be signal strengths of the idealized single-ray signals received by the moved wireless AP and the other wireless APs.

The processing unit can be further programmed to calculate AP-to-AP distance vectors between each of the APs and the moved wireless AP using the location of the moved wireless AP calculated prior to calculating the estimated AP-to-RP RSSIs.

The processing unit can be further programmed to calculate RP-to-AP distance vectors between each of the calibration RPs and the moved wireless AP using the location of the moved wireless AP calculated prior to calculating the estimated AP-to-RP RSSIs.

A method of discovering a new wireless access point (AP) within an indoor environment is also disclosed. The method can include obtaining, using a server communication unit of a server, AP transmit strengths of wireless signals generated by the new wireless AP to the other wireless APs and of the wireless signals generated by the other wireless APs to the new wireless AP, wherein the AP transmit strengths are obtained from the new wireless AP and the other wireless APs. The method can also include obtaining, using the server communication unit, AP-to-AP received signal strength indicators (RSSIs) measured at the new wireless AP from the wireless signals transmitted by the other wireless APs and the AP-to-AP RSSIs measured at each of the other wireless APs from the wireless signals transmitted by the new wireless AP, wherein the AP-to-AP RSSIs are obtained from the new wireless AP and the other wireless APs. The method can also include determining, using a processing unit of the server, a location of the new wireless AP within the indoor environment using information from at least one of an installation log and an AP location solver based on information from the AP transmit strengths, the AP-to-AP RSSIs, and data from a wireless signal-strength database. The method can also include calculating, using the processing unit, a number of estimated AP-to-RP RSSIs representing estimated RSSIs which would be measured at the calibration RPs from wireless signals transmitted by the new wireless AP to the calibration RPs using a spatially-dependent path-loss model based on the location of the new wireless AP, the AP transmit strength of the new wireless AP, and the tile-specific path-loss coefficient for each of the tiles within the indoor environment, and adding, using the processing unit, the estimated AP-to-RP RSSIs to the wireless signal-strength database.

The method can further include calculating, using the processing unit, AP-to-AP distance vectors between each of the APs and the new wireless AP using the location of the new wireless AP calculated prior to calculating the estimated AP-to-RP RSSIs.

The method can further include calculating, using the processing unit, RP-to-AP distance vectors between each of the calibration RPs and the new wireless AP using the location of the new wireless AP calculated prior to calculating the estimated AP-to-RP RSSIs.

The method can further include identifying, using the processing unit, the new wireless AP as a previously unseen AP prior to determining the location of the new wireless AP by comparing the AP transmit strengths and the AP-to-AP RSSIs against transmit strength data and RSSI data previously stored in the wireless signal-strength database, and adding, using the processing unit, an entry in the wireless signal-strength database associated with the new wireless AP.

The AP transmit strengths can be signal strengths of idealized single-ray signals transmitted by the new wireless AP and the other wireless APs. The AP-to-AP RSSIs can be signal strengths of idealized single-ray signals received by the new wireless AP and the other wireless APs.

A method of discovering a moved wireless access point (AP) within an indoor environment is also disclosed. The method can include obtaining, using a server communication unit of a server, AP transmit strengths of wireless signals generated by a number of wireless APs within the indoor environment to other wireless APs within the indoor environment, wherein at least one of the wireless APs has been physically moved within the indoor environment since a previous check-in. The method can include obtaining, using the server communication unit, AP-to-AP received signal strength indicators (RSSIs) measured at each of the wireless APs from the wireless signals generated by each of the other wireless APs. The method can include flagging, using a processing unit of the server, one of the wireless APs as the moved wireless AP by comparing the AP transmit strengths and the AP-to-AP RSSIs against transmit strength data and RSSI data previously stored in the wireless signal-strength database. The method can include determining, using the processing unit, a location of the moved wireless AP within the indoor environment using at least one of information from an installation log and an AP location solver based on information from the AP transmit strengths, the AP-to-AP RSSIs, and data from the wireless signal-strength database. The method can include calculating, using the processing unit, a number of estimated AP-to-RP RSSIs representing estimated RSSIs which would be measured at the calibration RPs from wireless signals transmitted by the moved wireless AP using a spatially-dependent path-loss model based on the location of the moved wireless AP, the AP transmit strength of the moved wireless AP, and the tile-specific path-loss coefficient for each tile within the indoor environment, and adding, using the processing unit, the estimated AP-to-RP RSSIs to the wireless signal-strength database.

The AP transmit strengths can be signal strengths of idealized single-ray signals transmitted by the moved wireless AP and the other wireless APs. The AP-to-AP RSSIs can be signal strengths of idealized single-ray signals received by the moved wireless AP and the other wireless APs.

The method can further include calculating, using the processing unit, AP-to-AP distance vectors between each of the APs and the moved wireless AP using the location of the moved wireless AP calculated prior to calculating the estimated AP-to-RP RSSIs.

The method can further include calculating, using the processing unit, RP-to-AP distance vectors between each of the calibration RPs and the moved wireless AP using the location of the moved wireless AP calculated prior to calculating the estimated AP-to-RP RSSIs.

A system to generate a spatially-dependent path-loss model associated with an indoor environment is also disclosed. The system can include a server and wireless access points (APs) positioned throughout the indoor environment. The system can also include a calibration device moveable within the indoor environment such that the calibration device can be configured to transmit wireless signals to the wireless APs and receive wireless signals transmitted by the wireless APs at a number of calibration reference points (RPs) located throughout the indoor environment. The server can include a processing unit, a memory unit, and a server communication unit. The server communication unit is in communication with the wireless APs and the calibration device. The processing unit can be programmed to divide a coordinate-plane representing the indoor environment into non-overlapping tiles. The processing unit can be further programmed to obtain RP calibration transmit strengths of the wireless signals transmitted by the calibration device at each of the calibration RPs to the wireless APs at a first frequency. The RP calibration transmit strengths can be obtained from the calibration device or a wireless signal-strength database. The processing unit can be further programmed to obtain RP-to-AP calibration RSSIs measured at each of the wireless APs from the wireless signals transmitted by the calibration device at each of the calibration RPs at the first frequency, wherein the RP-to-AP calibration RSSIs are obtained from each of the wireless APs or the wireless signal-strength database. The processing unit can be further programmed to calculate RP-to-AP distance vectors between each of the calibration RPs and the wireless APs. The processing unit can be further programmed to construct a set of path-loss equations using the RP calibration transmit strengths at the first frequency, the RP-to-AP calibration RSSIs obtained at the first frequency, the RP-to-AP distance vectors, and tile-specific path-loss coefficient for each of the tiles within the indoor environment, and solve the set of path-loss equations to yield a value for the tile-specific path-loss coefficient for each of the tiles within the indoor environment.

The processing unit of the server can be further programmed to obtain AP transmit strengths of the wireless signals transmitted by each of the wireless APs to the calibration device at each of the calibration RPs at the first frequency. The AP transmit strengths can be obtained from each of the wireless APs or the wireless signal-strength database. The processing unit can be further programmed to obtain AP-to-RP calibration RSSIs measured by the calibration device at each of the calibration RPs from the wireless signals transmitted by each of the wireless APs at the first frequency, wherein the AP-to-RP calibration RSSIs are obtained from the calibration device or the wireless signal-strength database, and construct the set of path-loss equations using the RP calibration transmit strengths at the first frequency, the AP transmit strengths at the first frequency, the RP-to-AP calibration RSSIs obtained at the first frequency, the AP-to-RP calibration RSSIs obtained at the first frequency, the RP-to-AP distance vectors, and the tile-specific path-loss coefficient for each of the tiles within the indoor environment.

The processing unit can be further programmed to obtain additional RP calibration transmit strengths of wireless signals transmitted by the calibration device at each of the calibration RPs to the wireless APs at a second frequency different from the first frequency. The additional RP calibration transmit strengths can be obtained from the calibration device or the wireless signal-strength database. The processing unit can be further programmed to obtain additional RP-to-AP calibration RSSIs measured at each of the wireless APs from the wireless signals transmitted by the calibration device at the second frequency, wherein the additional RP-to-AP calibration RSSIs are obtained from each of the wireless APs or the wireless signal-strength database. The processing unit can be further programmed to construct another set of path-loss equations using the additional RP calibration transmit strengths at the second frequency, the additional RP-to-AP calibration RSSIs obtained at the second frequency, the RP-to-AP distance vectors, and another tile-specific path-loss coefficient for each of the tiles within the indoor environment, and solve the other set of path-loss equations to yield a value for the other tile-specific path-loss coefficient for each of the tiles within the indoor environment.

The tiles can include at least a first tile having a first shape and a second tile having a second shape. The first shape can be different from the second shape. A side of the first shape can be selected to align with a physical feature of the indoor environment that attenuates wireless signals at the first frequency.

The processing unit can be further programmed to divide the coordinate plane into a number of the non-overlapping tiles covering the indoor environment. The number of tiles can be dependent on an amount of wireless APs and calibration RPs within the indoor environment.

A path-loss within each of the tiles can be spatially independent such that the tile-specific path-loss coefficient calculated for each of the tiles is a constant value.

The RP calibration transmit strengths can be signal strengths of idealized single-ray signals transmitted by the calibration device at each of the calibration RPs. The RP-to-AP calibration RSSIs can be signal strengths of the idealized single-ray signals received by each of the wireless APs.

A method of generating a spatially-dependent path-loss model associated with an indoor environment is also disclosed. The method can include dividing, using a processing unit of a server, a coordinate-plane representing the indoor environment into non-overlapping tiles. The method can include obtaining, using a server communication unit of the server coupled to the processing unit, RP calibration transmit strengths of wireless signals transmitted by a calibration device at a number of calibration reference points (RPs) to a number of wireless access points (APs) at a first frequency within the indoor environment, wherein the RP calibration transmit strengths can be obtained from the calibration device or a wireless signal-strength database. The calibration device can be moveable within the indoor environment. The method can include obtaining, using the server communication unit, RP-to-AP calibration RSSIs measured at each of the wireless APs from the wireless signals transmitted by the calibration device at each of the calibration RPs at the first frequency, wherein the RP-to-AP calibration RSSIs are obtained from each of the wireless APs or the wireless signal-strength database. The method can include calculating, using the processing unit, RP-to-AP distance vectors between each of the calibration RPs and the wireless APs. The method can include constructing using the processing unit, a set of path-loss equations using the RP calibration transmit strengths at the first frequency, the RP-to-AP calibration RSSIs obtained at the first frequency, the RP-to-AP distance vectors, and tile-specific path-loss coefficient for each of the tiles within the indoor environment, and solving, using the processing unit, the set of path-loss equations to yield a value for the tile-specific path-loss coefficient for each of the tiles within the indoor environment.

A non-transitory computer-readable medium comprising instructions stored thereon is also disclosed. The instructions, that when executed by a processing unit, can perform the steps of dividing a coordinate-plane representing an indoor environment into non-overlapping tiles and obtaining RP calibration transmit strengths of wireless signals transmitted by a calibration device at a number of calibration reference points (RPs) to a number of wireless access points (APs) at a first frequency within the indoor environment. The RP calibration transmit strengths can be obtained from the calibration device or a wireless signal-strength database. The calibration device can be moveable within the indoor environment. The processing unit can also perform the steps of obtaining RP-to-AP calibration RSSIs measured at each of the wireless APs from the wireless signals transmitted by the calibration device at each of the calibration RPs at the first frequency. The RP-to-AP calibration RSSIs can be obtained from each of the wireless APs or the wireless signal-strength database. The processing unit can also perform the steps of calculating RP-to-AP distance vectors between each of the calibration RPs and the wireless APs, constructing a set of path-loss equations using the RP calibration transmit strengths at the first frequency, the RP-to-AP calibration RSSIs obtained at the first frequency, the RP-to-AP distance vectors, and tile-specific path-loss coefficient for each of the tiles within the indoor environment, and solving the set of path-loss equations to yield a value for the tile-specific path-loss coefficient for each of the tiles within the indoor environment.

A system to generate a spatially-dependent path-loss model associated with an indoor environment is also disclosed. The system can include a server, wireless access points (APs) positioned throughout the indoor environment, and a calibration device moveable within the indoor environment such that the calibration device can be configured to receive wireless signals transmitted by each of the wireless APs at a number of calibration reference points (RPs) located throughout the indoor environment. The server can include a processing unit, a memory unit, and a server communication unit. The server communication unit is in communication with the wireless APs. The processing unit can be programmed to divide a coordinate-plane representing the indoor environment into non-overlapping tiles, and obtain AP transmit strengths of the wireless signals transmitted by each of the wireless APs to the calibration device at each of the calibration RPs at the first frequency. The AP transmit strengths can be obtained from each of the wireless APs or a wireless signal-strength database. The processing unit can be further programmed to obtain AP-to-RP calibration RSSIs measured by the calibration device at each of the calibration RPs from the wireless signals transmitted by each of the wireless APs at the first frequency. The AP-to-RP calibration RSSIs can be obtained from the calibration device or the wireless signal-strength database. The processing unit can be further programmed to calculate AP-to-RP distance vectors between each of the wireless APs and the calibration RPs, construct the set of path-loss equations using the AP transmit strengths at the first frequency, the AP-to-RP calibration RSSIs obtained at the first frequency, the AP-to-RP distance vectors, and tile-specific path-loss coefficient for each of the tiles within the indoor environment, and solve the set of path-loss equations to yield a value for the tile-specific path-loss coefficient for each of the tiles within the indoor environment.

The processing unit can be further programmed to obtain additional AP transmit strengths of wireless signals transmitted by each of the wireless APs to the calibration device at each of the calibration RPs at a second frequency different from the first frequency. The additional AP transmit strengths can be obtained from each of the wireless APs or the wireless signal-strength database. The processing unit can be further programmed to obtain additional AP-to-RP calibration RSSIs measured by the calibration device at each of the calibration RPs from the wireless signals transmitted by each of the wireless APs at the second frequency. The additional AP-to-RP calibration RSSIs can be obtained from the calibration device or the wireless signal-strength database. The processing unit can be further programmed to construct another set of path-loss equations using the additional AP transmit strengths at the second frequency, the additional AP-to-RP calibration RSSIs obtained at the second frequency, the AP-to-RP distance vectors, and another tile-specific path-loss coefficient for each of the tiles within the indoor environment, and solve the other set of path-loss equations to yield a value for the other tile-specific path-loss coefficient for each of the tiles within the indoor environment.

At least one of the tiles can be shaped as a polygon having at least three sides. The tiles can include at least a first tile having a first shape and a second tile having a second shape. The first shape can be different from the second shape. A side of the first shape can be selected to align with a physical feature of the indoor environment that attenuates wireless signals at the first frequency.

The processing unit can be further programmed to divide the coordinate plane into a number of the non-overlapping tiles covering the indoor environment. The number of tiles can be dependent on an amount of wireless APs and calibration RPs within the indoor environment.

A path-loss within each of the tiles can be spatially independent such that the tile-specific path-loss coefficient calculated for each of the tiles is a constant value.

The AP transmit strengths can be signal strengths of idealized single-ray signals transmitted by each of the wireless APs to the calibration device. The AP-to-RP calibration RSSIs can be signal strengths of the idealized single-ray signals measured by the calibration device at each of the calibration RPs from the wireless signals transmitted by each of the wireless APs.

A computer-implemented method of generating a spatially-dependent path-loss model associated with an indoor environment is also disclosed. The method can include dividing, using a processing unit of a server, a coordinate-plane representing the indoor environment into non-overlapping tiles. The method can also include obtaining, using a server communication unit of the server coupled to the processing unit, AP transmit strengths of wireless signals transmitted by a number of wireless access points (APs) to a calibration device at a number of calibration reference points (RPs) at a first frequency within the indoor environment, wherein the AP transmit strengths are obtained from the wireless APs or a wireless signal-strength database. The calibration device can be moveable within the indoor environment. The method can also include obtaining, using the server communication unit, AP-to-RP calibration RSSIs measured at the calibration device at the number of calibration RPs from the wireless signals transmitted by the wireless APs at the first frequency, wherein the AP-to-RP calibration RSSIs are obtained from the calibration device or the wireless signal-strength database. The method can also include calculating, using the processing unit, AP-to-RP distance vectors between each of the calibration RPs and the wireless APs. The method can also include constructing, using the processing unit, a set of path-loss equations using the AP transmit strengths at the first frequency, the AP-to-RP calibration RSSIs obtained at the first frequency, the AP-to-RP distance vectors, and tile-specific path-loss coefficient for each of the tiles within the indoor environment, and solving using the processing unit, the set of path-loss equations to yield a value for the tile-specific path-loss coefficient for each of the tiles within the indoor environment.

A non-transitory computer-readable medium comprising instructions stored thereon is also disclosed. The instructions, that when executed by a processing unit, can perform the steps of dividing a coordinate-plane representing the indoor environment into non-overlapping tiles, and obtaining AP transmit strengths of wireless signals transmitted by a number of wireless access points (APs) to a calibration device at a number of calibration reference points (RPs) at a first frequency within the indoor environment. The AP transmit strengths can be obtained from the wireless APs or a wireless signal-strength database. The calibration device can be moveable within the indoor environment. The processing unit can also perform the steps of obtaining AP-to-RP calibration RSSIs measured at the calibration device at the number of calibration RPs from the wireless signals transmitted by the wireless APs at the first frequency. The AP-to-RP calibration RSSIs can be obtained from the calibration device or the wireless signal-strength database. The processing unit can also perform the steps of calculating AP-to-RP distance vectors between each of the calibration RPs and the wireless APs, constructing a set of path-loss equations using the AP transmit strengths at the first frequency, the AP-to-RP calibration RSSIs obtained at the first frequency, the AP-to-RP distance vectors, and tile-specific path-loss coefficient for each of the tiles within the indoor environment, and solving the set of path-loss equations to yield a value for the tile-specific path-loss coefficient for each of the tiles within the indoor environment.

BRIEF DESCRIPTION OF THE DRAWINGS

FIG. 6A illustrates the attenuation of a wireless signal at a first frequency in three adjacent regions.

FIG. 6B illustrates the attenuation of a wireless signal at a second frequency in three adjacent regions.

FIG. 13 illustrates the system representing the received signal strength in a matrix form.

FIG. 14 illustrates equations representing a set of spatially-dependent path-loss model equations constructed by the system.

FIG. 15 illustrates a solution of the set of path-loss model equations calculated by the system.

FIG. 20 illustrates the set of path-loss equations for M reference points and N access points.

FIG. 31A illustrates AP-to-RP transmit strengths in the indoor environment representing wireless signals generated by the moved wireless AP.

FIG. 31B illustrates estimated AP-to-RP RSSIs in the indoor environment representing simulated wireless signals transmitted by the moved wireless AP.

FIG. 31C illustrates RP-to-AP transmit strengths in the indoor environment generated by a calibration device positioned at the calibration RPs to the moved wireless AP.

FIG. 31D illustrates RP-to-AP RSSIs in the indoor environment measured at the moved wireless AP.

DETAILED DESCRIPTION OF THE INVENTION

Figure 1:
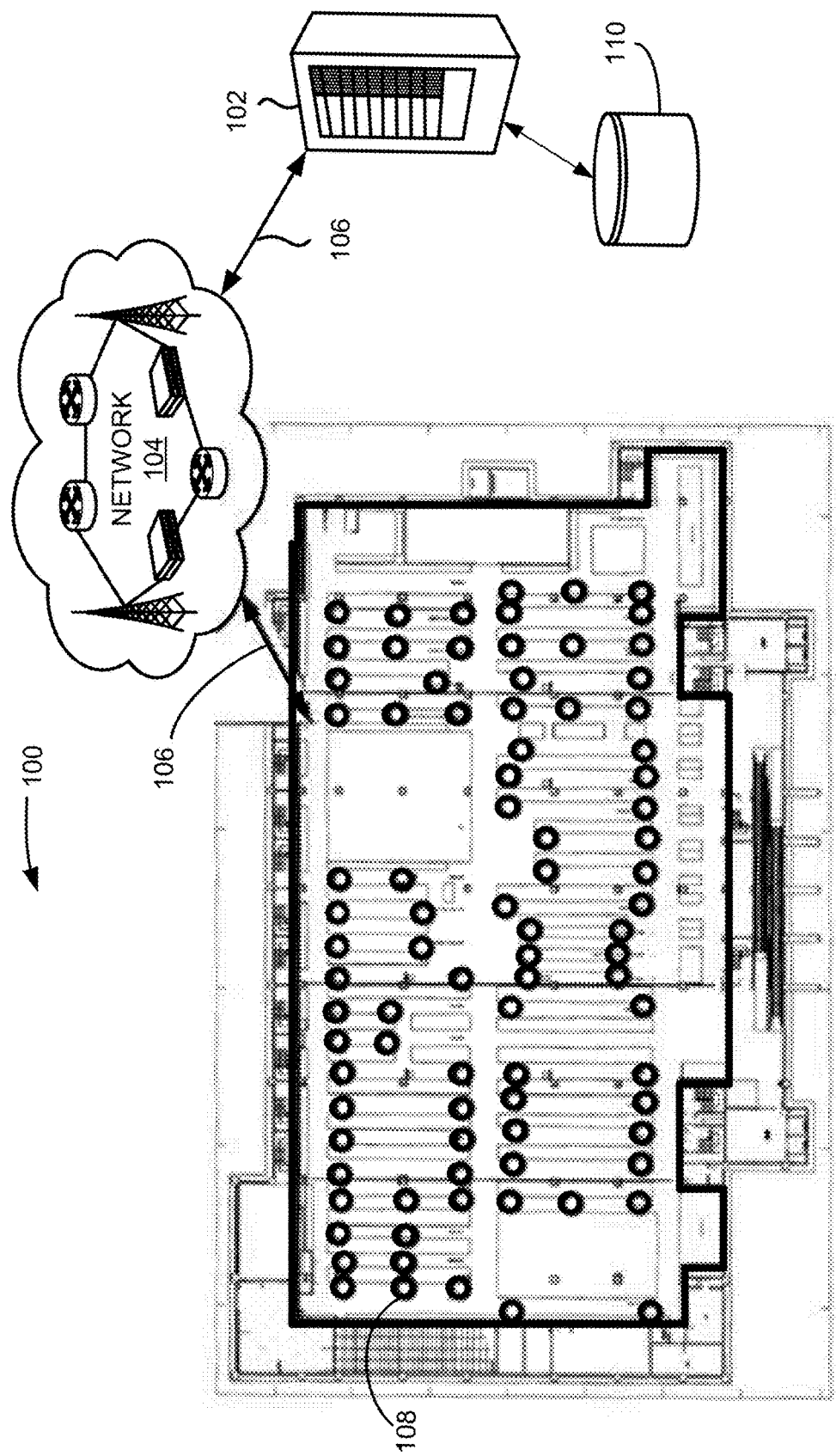
FIG. 1 illustrates a representation of a spatially-dependent path-loss model system.

FIG. 1 illustrates a system 100 to generate a spatially-dependent path-loss model 800 (see FIG. 8) associated with an indoor environment 300. The system 100 can include a server 102, a network 104, connections 106, calibration devices 112, and wireless access points (APs) 108.

Figure 2B:
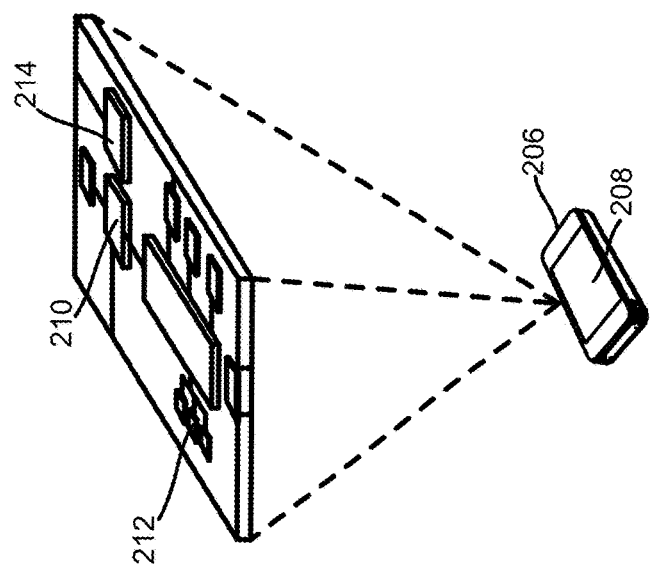
FIG. 2B illustrates a variation of a calibration device of the spatially-dependent path-loss model system.
Figure 2A:
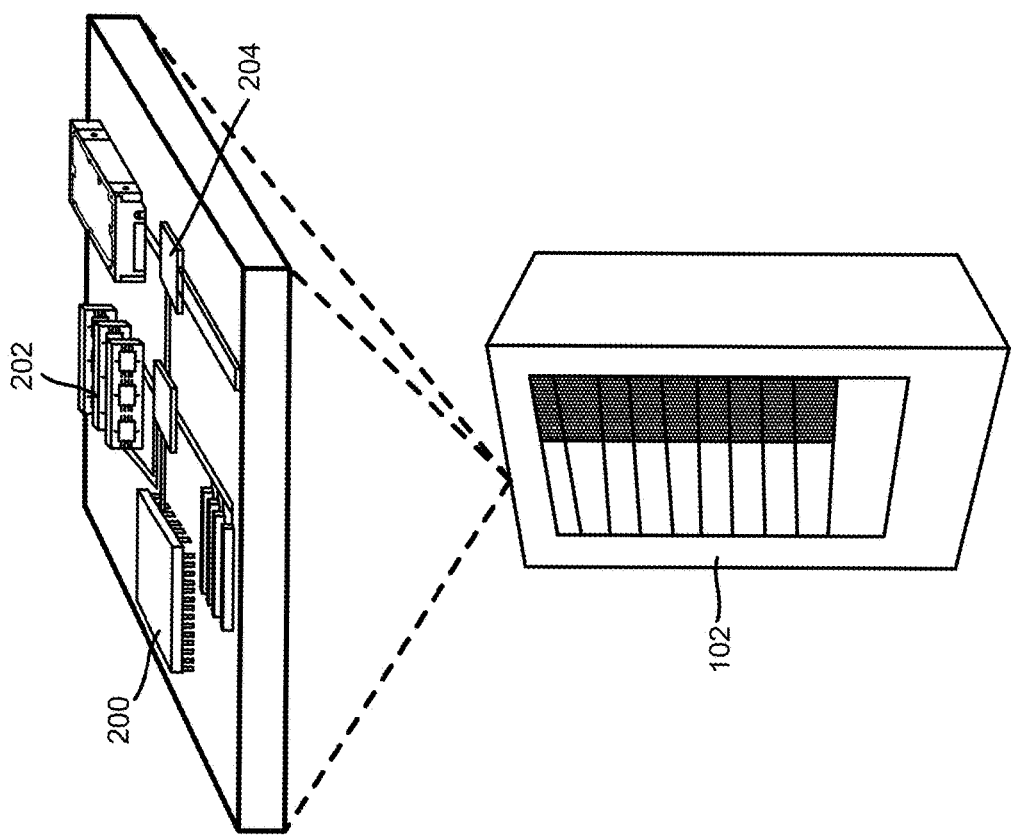
FIG. 2A illustrates a variation of a server of the spatially-dependent path-loss model system.

FIG. 2A illustrates a variation of the server 102 of the system 100. The server 102 can have a processing unit 200, a memory unit 202, and a server communication unit 204. The server 102 can access a database 110 such as a wireless signal-strength database. The database 110 can be local to the server 102 or it can be in the cloud. The database 110 can be a wireless signal-strength database, or another database for information that is used or accessed by the server 102. The processing unit 200 can be coupled to the memory unit 202 and the server communication unit 204 through high-speed buses.

In one variation, the database 110 can be stored in the memory unit 202. In another variation, the database 110 can be stored in a cloud storage system accessible to the server 102. In one variation, the database 110 can be one or more SQL databases. The database 110 can be a PostgreSQL database. In other variations, the database 110 can be one or more document-oriented databases such as a NoSQL database.

The processing unit 200 can include one or more central processing units (CPUs), graphical processing units (GPUs), Application-Specific Integrated Circuits (ASICs), field-programmable gate arrays (FPGAs), or a combination thereof. The processing unit 200 can execute software stored in the memory unit 202 in order to execute the methods or instructions described herein. The processing unit 200 can be implemented in a number of different manners. For example, the processing unit 200 can be an embedded processor, a processor core, a microprocessor, a logic circuit, a hardware finite state machine (FSM), a digital signal processor (DSP), or a combination thereof. As a more specific example the processing unit 200 can be a 64-bit processor.

The memory unit 202 can store software, data, logs, or a combination thereof. The memory unit 202 can be an internal memory as shown in FIG. 2A. Although not shown in the figures, it is contemplated by this disclosure that the memory unit 202 can be an external memory, such as a memory residing on a storage node, a cloud server, or a storage server. The memory unit 202 can be a volatile memory or a non-volatile memory. For example, the memory unit 202 can be a nonvolatile storage such as non-volatile random-access memory (NVRAM), flash memory, disk storage, or a volatile storage such as static random-access memory (SRAM). The memory unit 202 can be the main storage unit for the server 104.

The server communication unit 204 can include one or more wired or wireless communication interfaces. For example, the server communication unit 204 can be a network interface card of the server 104. The server communication unit 204 can be a wireless modem or a wired modem. In one embodiment, the server communication unit 204 can be a Wi-Fi modem. In other embodiments, the server communication unit 204 can be a 3G modem, a 4G modem, an LTE modem, a Bluetooth™ component, a radio receiver, an antenna, or a combination thereof. The server 102 can connect to or communicatively couple with the wireless signal transceivers 108, the network 104, or a combination thereof using the server communication unit 204. The server 102 can transmit or receive packets or messages using the server communication unit 204.

FIG. 2B illustrates an embodiment of the calibration device 206. The calibration device 206 can have a processor 210, a memory 212, a wireless communication module 214, and a display 208. The processor 210 can be coupled to the memory 212 and the wireless communication module 214 through high-speed buses.

The processor 210 can include one or more CPUs, GPUs, ASICs, FPGAs, or a combination thereof. The processor 210 can execute software stored in the memory 212 in order to execute the methods or instructions described herein. The processor 210 can be implemented in a number of different manners. For example, the processor 210 can be an embedded processor, a processor core, a microprocessor, a logic circuit, a hardware FSM, a DSP, or a combination thereof. As a more specific example the processor 210 can be a 32-bit processor such as an ARM™ processor.

The memory 212 can store software, data, logs, or a combination thereof. In one embodiment, the memory 212 can be an internal memory. In another embodiment, the memory 212 can be an external storage unit. The memory 212 can be a volatile memory or a non-volatile memory. For example, the memory 212 can be a nonvolatile storage such as NVRAM, Flash memory, disk storage, or a volatile storage such as SRAM. The memory 212 can be the main storage unit for the calibration device 206.

The wireless communication module 214 can include a wireless communication interface or chip. For example, the wireless communication module 214 can be a network interface card of the device 206. The wireless communication module 214 can be a wireless modem. In one embodiment, the wireless communication module 214 can be a Wi-Fi modem. In other embodiments, the wireless communication module 214 can be a 3G modem, a 4G modem, an LTE modem, a Bluetooth™ component, a radio receiver, an antenna, or a combination thereof. The device 206 can connect to or communicatively couple with the wireless signal transceivers 108, the network 104, or a combination thereof using the wireless communication module 214. The device 206 can transmit or receive packets or messages using the wireless communication module 214.

In one variation, the device 206 can also comprise a locational unit having a GPS receiver, an inertial unit, a magnetometer, a compass, or a combination thereof. The GPS receiver can receive GPS signals from a GPS satellite. The inertial unit can be implemented as a multi-axis accelerometer including a three-axis accelerometer, a multi-axis gyroscope including a three-axis MEMS gyroscope, or a combination thereof.

The display 208 can be a touchscreen display such as a liquid crystal display (LCD), a thin film transistor (TFT) display, an organic light-emitting diode (OLED) display, or an active-matrix organic light-emitting diode (AMOLED) display. In certain embodiments, the display 208 can be a retina display, a haptic touchscreen, or a combination thereof. For example, when the calibration device 206 is a smartphone, the display 208 can be the touchscreen display of the smartphone.

Figure 3:
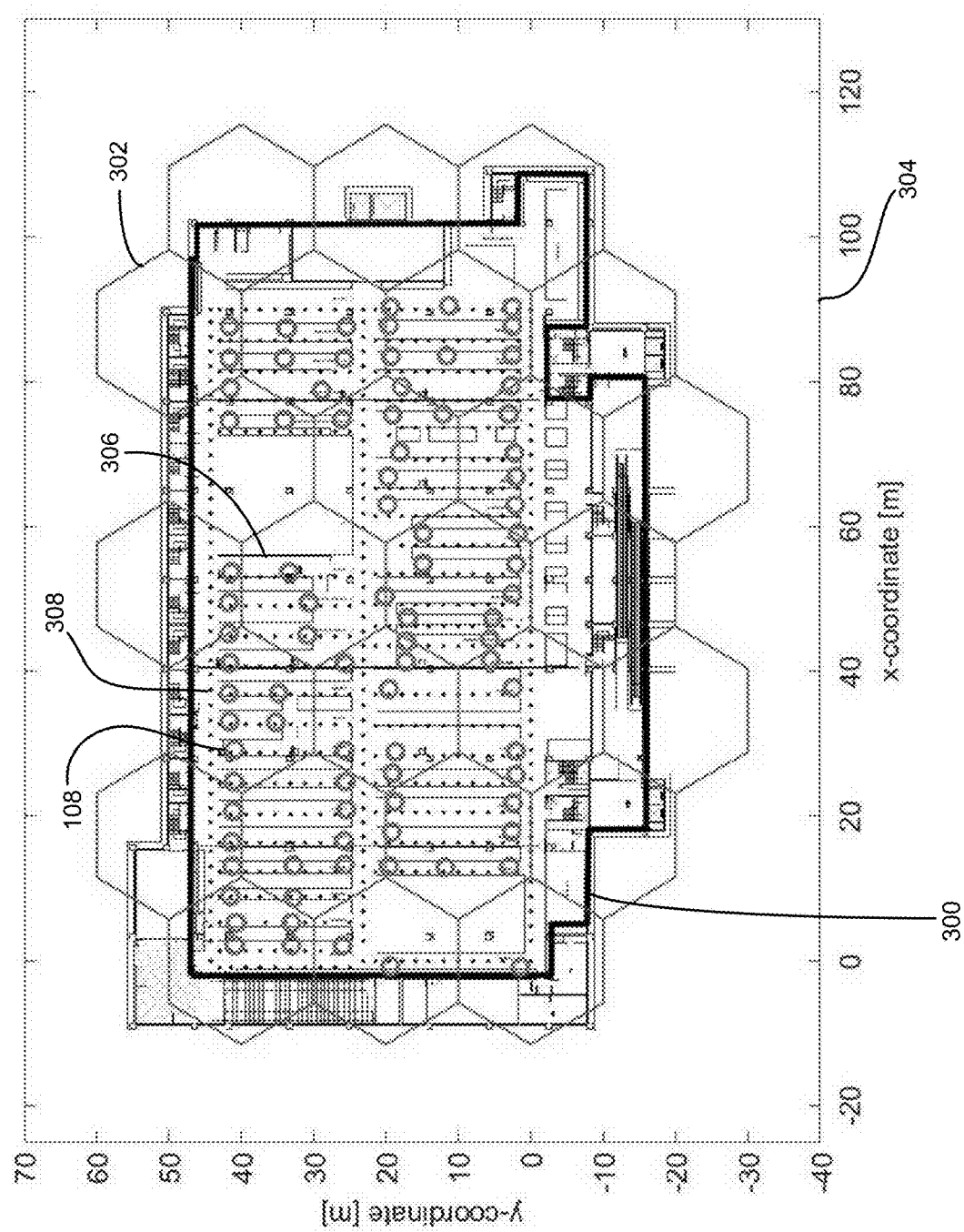
FIG. 3 illustrates a coordinate-plane representing an indoor environment divided into non-overlapping tiles.

FIG. 3 illustrates that the system 100 can divide up a coordinate-plane 304 representing the indoor environment 300 into non-overlapping tiles 302. The processing unit can be programmed to divide the coordinate plane into a number of tiles dependent on the number of wireless access points (APs) and calibration reference points (RPs) within the indoor environment 300.

It is to be understood that the indoor environment 300, as used herein, is not limited to indoor areas, as outdoor areas with wireless communication infrastructures may also benefit from the disclosed systems and techniques. In another embodiment of the invention, the indoor environment 300 can be a combination of indoor and outdoor areas. In one variation, the coordinate-plane 304 can be a rectilinear two-dimensional Cartesian plane including an x-axis and a y-axis. In other variations, the system 100 can represent the environment 300 in a three-dimensional coordinate system including an x-axis, a y-axis, and a z-axis. The non-overlapping tiles 302 in FIG. 3 can be polygons and the non-overlapping tiles 302 can be generated by the processing unit 200 of the system 100 calling a function to divide up the coordinate plane into tiles. The tiles 302 can be polygons as well as other non-polygonal shapes. The tiles 302 can have convex as well as concave shapes. The tiles in any one indoor environment 300 can have different shapes. In one embodiment of the invention, the tiles 302 can cover the indoor environment 300 completely. In another variation of the invention, the tiles 302 can partially cover the indoor environment 302.

In one variation of the invention, the number of tiles 302 in an environment 300 can depend on the number of measurements from wireless access points (APs) 108. In another variation, the number of non-overlapping tiles 302 in an environment 300 can depend on the number of measurements from the calibration device 206. The measurements from the calibration device 206 can be at one or more calibration reference points (RPs) 308. In another variation, the number of non-overlapping tiles 302 can depend on the number of measurements from wireless access points (APs) 108 and the number of measurements from the calibration device 206. For example, the system 100 can require 400 measurements per tile. Thus, if the number of measurements from wireless access points (APs) 108 and the number of measurements from the calibration device 206 is 4000, then the system can segment the indoor environment 300 into ten tiles.

As shown in FIG. 3, the indoor environment 300 can have a number of obstructions 306. For example, the environment 300 can represent a retail store of approximately 5000 square meters.

FIG. 3 also illustrates the calibration reference points (RPs) 308 within the indoor environment 300. The calibration reference points (RPs) 308 can be at regular intervals within an indoor environment 300. The number of calibration reference points (RPs) 308 can be a function of the desired number of non-overlapping tiles 302 in an indoor environment 300. In one variation, if the number of desired tiles is ten and the average number of desired calibration reference points (RPs) per non-overlapping tile 302 is thirty, then the system 100 can determine that three-hundred calibration reference points (RPs) 308 are required.

Figure 4:
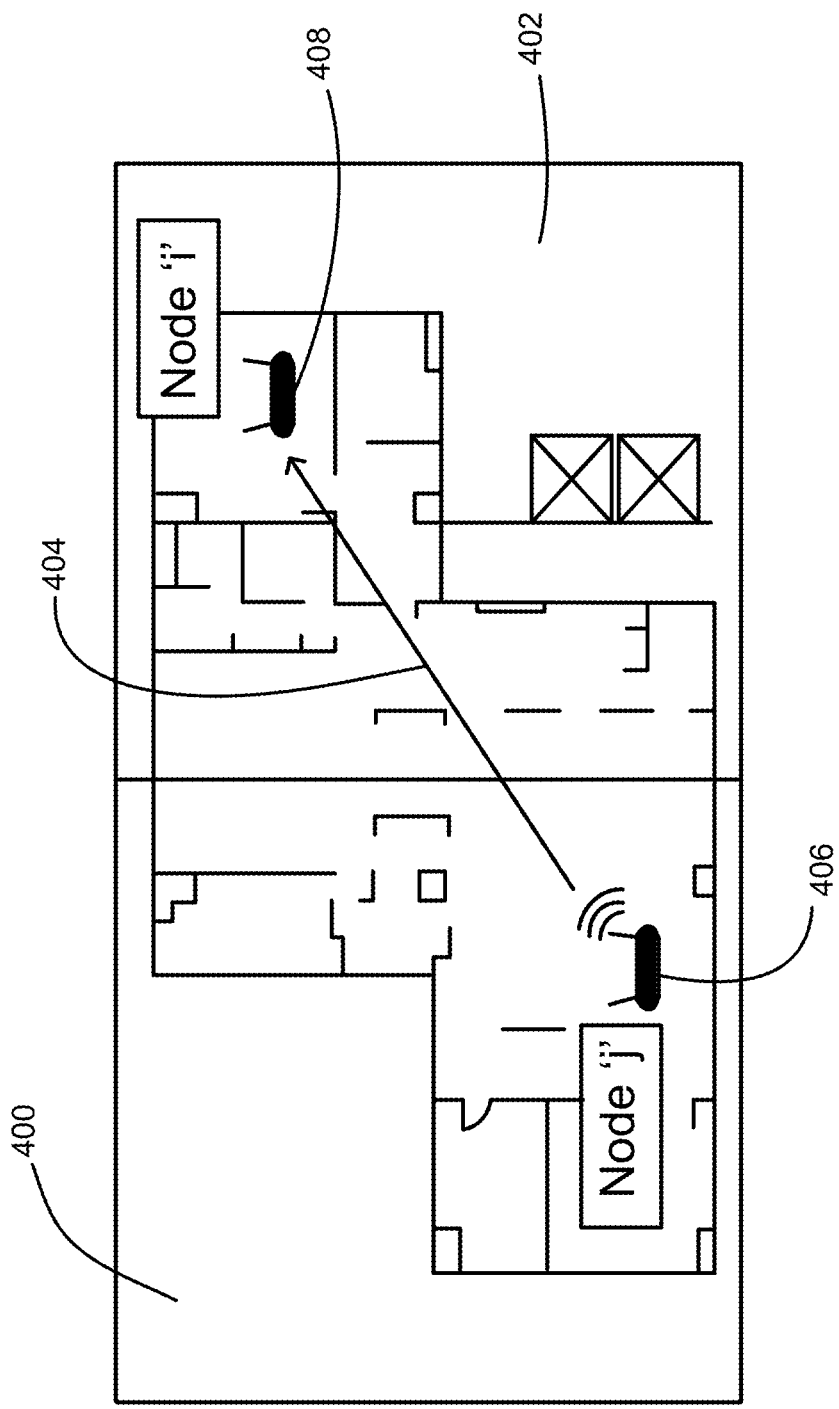
FIG. 4 illustrates a first node transmitting in a first tile, and a second node receiving in a second tile.

FIG. 4 illustrates a two-tile indoor environment 300 comprised of square tiles, with a first node transmitting in a first tile 400 and a second node receiving in a second tile 402. For a spatially-dependent path-loss model 800 (see FIG. 8) with an idealized single-ray signal 404, the path-loss 500 (see FIG. 5) that a signal undergoes can be a function of the distance traveled across each of several tiles. The measured attenuation can be a function of the path-loss 500 in a first tile 400 and the path-loss in a second tile 402. With a single measurement, it can be difficult to distinguish the path-loss characteristics of the first tile and the second tile for a two-tile environment. However, with more measurements between first nodes transmitting in the first tile 400, and second nodes receiving in the second tile 402, a surface in three dimensions can be created with one axis being the distance in the first tile 400, the second axis being the distance in the second tile 402, and the third axis being the path-loss 500 (see FIG. 5) between the pairs of nodes. The surface created by the path-loss 500 on the third axis can be used to distinguish the path-loss 500 as a function of distance in the first tile 400 from the path-loss 500 as a function of distance in the second tile 402.

Figure 5:
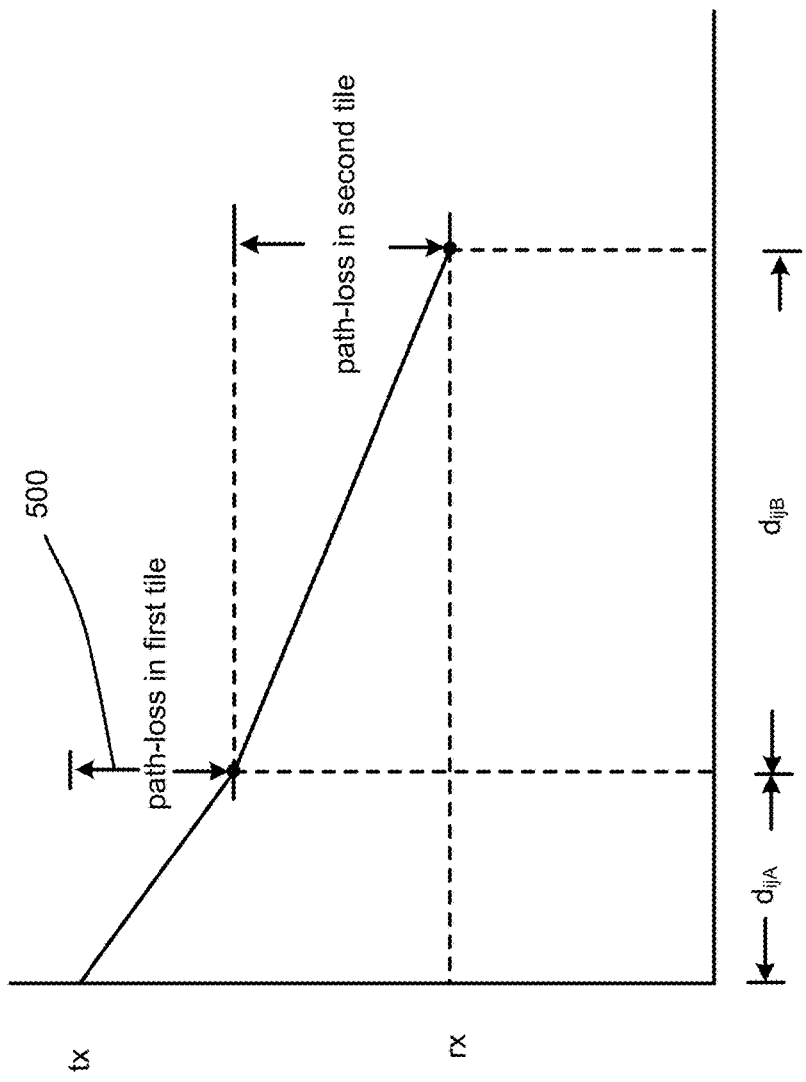
FIG. 5 illustrates the attenuation of a wireless signal in two different regions.

FIG. 5 illustrates that the system 100 can calculate the distance the singe-ray signal 404 travels in a first tile 400, $d_{ijA}$, the distance the signal travels in a second tile 402, $d_{ijB}$, and the path-loss 500 that the system 100 can measure between nodes 'i' and 'j'. FIG. 5 illustrates a representation of the path-loss 500 in the first tile 400 and the path-loss 500 in the second tile 402 as a function of the distance traveled in each non-overlapping tile 302. The path-loss 500 within each of the non-overlapping tiles 302 is spatially independent such that the system 100 can calculate a constant tile-specific path-loss coefficient 1202 (see FIG. 12) for each of the non-overlapping tiles 302. An AP transmit strength 900 (see FIG. 9) is a signal strength of idealized single-ray signals 404 transmitted by the wireless AP 108, and an AP-to-AP received signal strength indicator (RSSI) is a signal strength of the idealized single-ray signals 404 received by the wireless AP 108.

FIG. 6A illustrates that the system 100 can calculate a spatially-dependent path-loss model 800 that has idealized single-ray signals, where the wireless (APs) 108 are operating at a first frequency 602. For example, the first frequency 602 can be the 2.4 GHz band. In this illustration, the system 100 can split the indoor environment 300 into twelve rectangular non-overlapping tiles 302, and a wireless signal can traverse three of the non-overlapping tiles 302 labelled A, B, and C. The tile-specific path-loss coefficients 600 can be dependent on the first frequency 602, and in this illustration they are labelled $\gamma_{A1}$, $\gamma_{B1}$, and $\gamma_{C1}$. The path-loss 500 within each of the non-overlapping tiles 302 is spatially independent such that the tile specific path-loss coefficient 600 for each of the non-overlapping tiles 302 is a constant value. The AP transmit strengths 900 can be signal strengths of idealized single-ray signals 404 transmitted by each of the wireless APs 108, and the AP-to-AP RSSIs can be signal strengths of the idealized single-ray signals received by each of the wireless APs 108.

FIG. 6B illustrates that the system 100 can calculate a spatially-dependent path-loss model 800 that has idealized single-ray signals where the wireless access points (APs) 108 are operating at a second frequency 604. For example, the second frequency 604 can be the 5 GHz band. In this illustration, the system 100 can split the indoor environment 300 into twelve rectangular non-overlapping tiles 302, and a wireless signal can traverse three of the non-overlapping tiles 302 labelled, A, B, and C. The tile-specific path-loss coefficients 600 can be dependent on the second frequency 604, and in this illustration they are labelled $\gamma_{A2}$, $\gamma_{B2}$, and $\gamma_{C2}$. The path-loss 500 within each of the non-overlapping tiles 302 is spatially independent such that the tile specific path-loss coefficient 600 for each of the non-overlapping tiles 302 is a constant value. The AP transmit strengths 900 can be signal strengths of idealized single-ray signals 404 transmitted by each of the wireless APs 108, and the AP-to-AP RSSIs can be signal strengths of the idealized single-ray signals received by each of the wireless APs 108. The tile-specific path-loss coefficients 600 can be different when the wireless APs 108 are operating at the first frequency 602 as compared to when they are operating at the second frequency 604.

Figure 7:
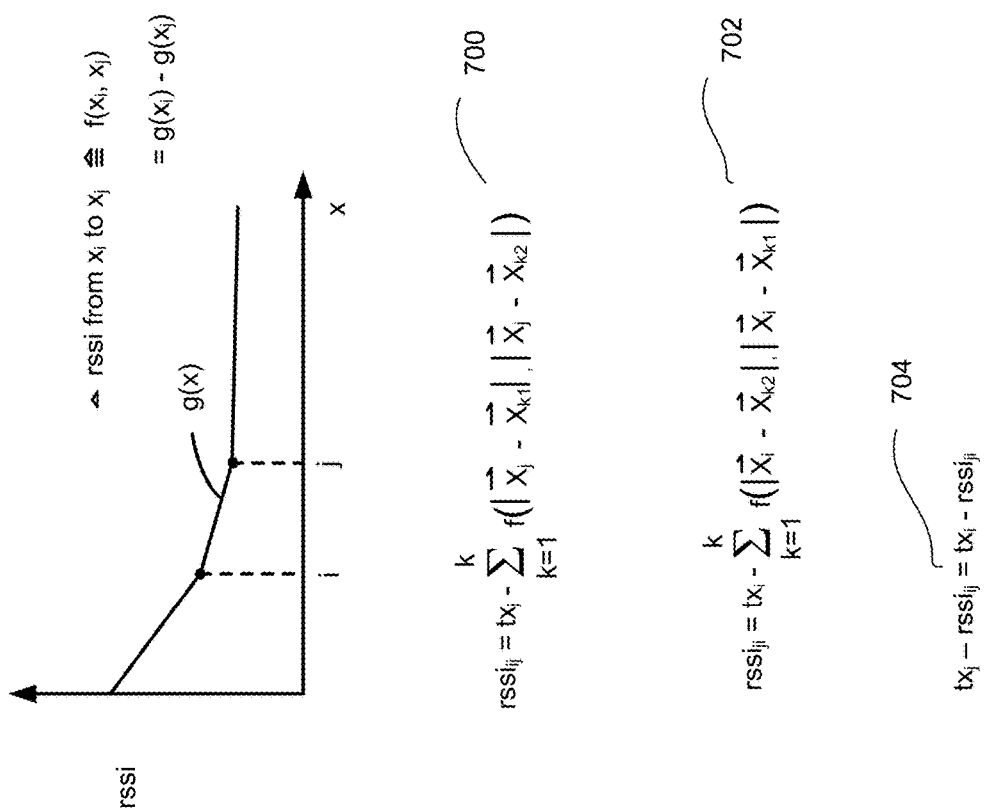
FIG. 7 illustrates the principle of channel reciprocity.

FIG. 7 illustrates that the system 100 can calculate the path-loss 500 within the first tile 400. The path-loss 500 within the first tile 400 of the idealized single-ray signal 404 can be spatially-independent within the first tile 400 and can be calculated from point 'i' to point 'j' 700. The path-loss 500 within the first tile 400 of the idealized single-ray signal 404 can be spatially-independent within the first tile 400 and can be calculated from point 'j' to point 'i' 702. The path-loss 500 calculated from 'i' to 'j' can be equal to the path-loss 500 calculated from point 'j' to point 'i' 704. FIG. 7 illustrates the calculations of the system 100 of the received signal strength at point 'i' from a transmitter at point 'j' 700 and the calculations of the system 100 of the received signal strength at point 'j' from point 'i' 702. The AP transmit strength 900 (see FIG. 9) can be the signal strength of idealized single-ray signals 404 transmitted by a first wireless AP at point 'i', and the AP-to-AP RSSI 904 (see FIG. 9) can be the signal strength of the idealized single-ray signals 404 received by a second wireless AP at point 'j'. The AP transmit strength 900 (see FIG. 9) can be the signal strength of idealized single-ray signals 404 transmitted by the second wireless AP at point 'j', and the AP-to-AP RSSI 904 (see FIG. 9) can be the signal strength of the idealized single-ray signals 404 received by the first wireless AP at point 'i'.

Figure 8:
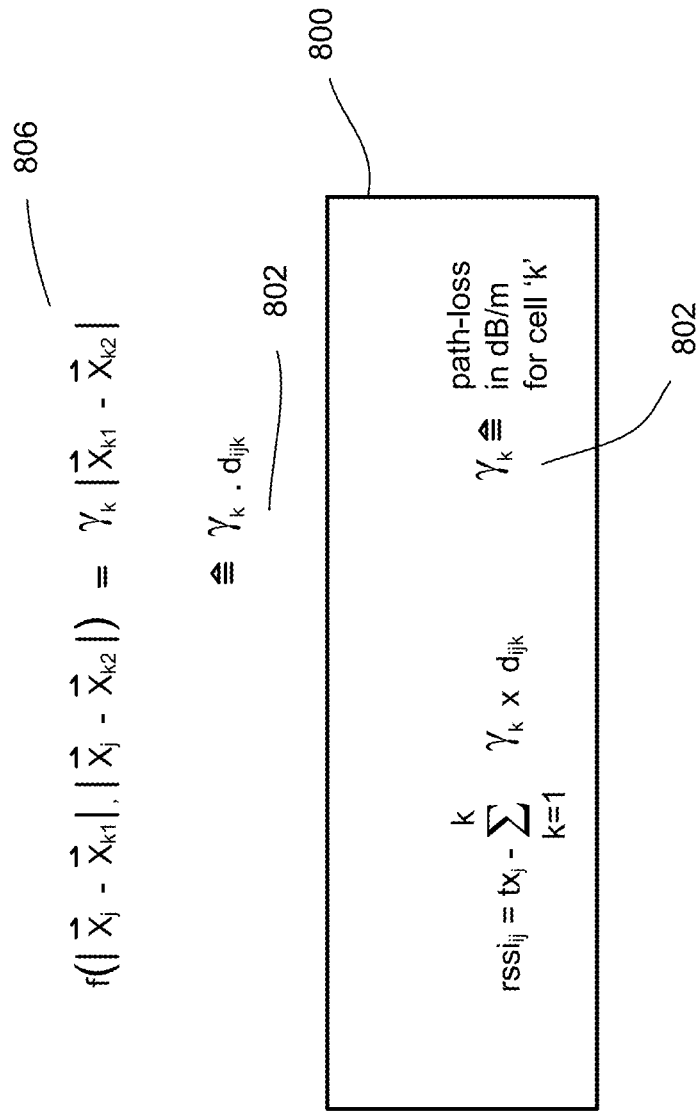
FIG. 8 illustrates an equation for a simple linear spatially-dependent path-loss model.

FIG. 8 illustrates that the system 100 can perform calculations of a spatially-dependent path-loss model 800 which is linear. The path-loss for the first tile 400 can be expressed as being proportional to the distance the idealized single-ray signal 404 takes to traverse the first tile 400 as illustrated in a first equation 806 in FIG. 8. As this distance does not depend on the direction of traversal, the spatially-dependent path-loss model 800 can be linear. The spatially-dependent path-loss model that is linear is consistent with the channel reciprocity principle which states that the channel from point 'i' to point 'j' is identical to the channel from 'j' to 'i' if the channel is measured at the same time and the same frequency. The system 100 can perform calculations of path-loss 500 within the first tile 400 which are spatially independent such that the tile-specific path-loss coefficient 600 calculated for the first tile is a constant value 802. The system 100 can perform calculations of path-loss 500 within the second tile 402 which are spatially independent such that the tile-specific path-loss coefficient 600 calculated for the second tile is another constant value 802. The tile-specific path-loss coefficients 600 calculated for the first tile 400 and the second tile 402 can be different. The system 100 can perform calculations of path-loss 500 for the non-overlapping tiles 302 in the indoor environment 300 such that the tile-specific path-loss coefficients 600 are all constant values. The tile-specific path-loss coefficient 600 can have units of dB milliwatts/meter which can be abbreviated dBm/m. dBm is an abbreviation for the power ratio in decibels (dB) of the measured power referenced to one milliwatt (mW).

The system 100 can comprise a first AP 406 in a first tile 400 and a second AP 408 located in a different tile. The tile-specific path-loss coefficient 600 calculated for each of the non-overlapping tiles 302 can be direction-independent such that the transmit strength of a first wireless signal generated by the first AP 406 to the second AP 408 minus an RSSI of the first wireless signal received by the second AP 408 equals the transmit strength of a second wireless signal generated by the second AP 408 to the first AP 406 minus an RSSI of the second wireless signal received by the first AP 406.

The system 100 can determine a signal strength received at a point 'i' from a transmitter T. For a linear, single-ray (no reflection, no scattering, no diffraction) spatially-dependent path-loss model 800, the system 100 can calculate the signal strength received at 'i' from transmitter 'j' ($RSSI_{ij}$) as j's transmit power less the sum of the attenuation as the signal traverses each tile 'k', where $\gamma_k$ is the path-loss within tile 'k'. $\gamma$ can have units of dBm/meter.

The system 100 can perform spatially-dependent path-loss model calculations where the AP transmit strengths 900 (see FIG. 9) are signal strengths of idealized single-ray signals 404 transmitted by each of the wireless APs 108, and the AP-to-AP RSSIs 904 (see FIG. 9) are signal strengths of the idealized single-ray signals 404 received by each of the wireless APs 108.

Figure 9:
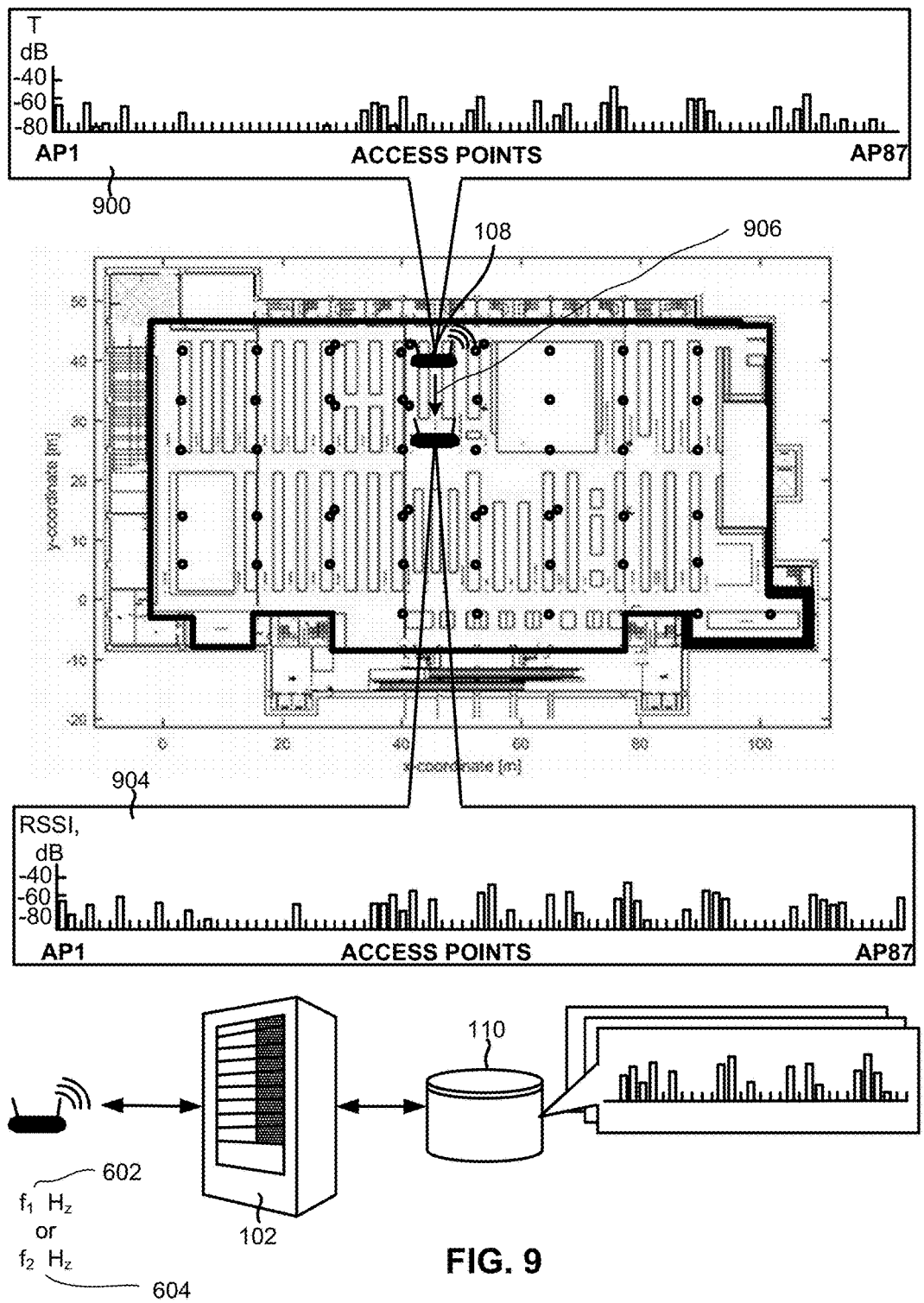
FIG. 9 illustrates a representation of the indoor environment having 87 access points.

FIG. 9 illustrates that the system 100 can have 87 wireless access points (APs) 108 positioned throughout the indoor environment 300. The wireless APs 108 can be evenly spaced in the indoor environment 300 and cover the entire indoor environment 300

It should be understood by one of ordinary skill in the art that although specific numbers of wireless access points (APs) 108 are shown in FIG. 9, the actual number of wireless APs 108 deployed can increase or decrease based on the size or dimensions of the indoor environment 300 or based on other factors such as the number of expected wireless AP users.

In the variation shown in FIG. 9, the server can obtain the AP transmit strengths 900 of wireless signals transmitted by each of the wireless APs 108 to the other wireless APs 108 at a first frequency 602. The AP transmit strengths 900 can be obtained from each of the wireless APs 108 or the database 110 or a combination of both. The first frequency 602 can be any frequency that the wireless APs 108 use. The wireless APs 108 can operate at 2.4 GHz, or in another variation the wireless APs can operate at a second frequency 604 of 5 GHz.

In the variation shown in FIG. 9, the server can obtain the AP-to-AP received signal strength indicators (RSSIs) 904 measured at each of the wireless APs 108 from the wireless signals transmitted by the other wireless APs 108 at the first frequency 602. The AP-to-AP RSSIs 904 can be obtained from each of the wireless APs 108 or the database 110 or a combination of both. The first frequency 602 can be any frequency that the wireless APs 108 use. The wireless APs 108 can operate at 2.4 GHz, or in another variation the wireless APs 108 can operate at a second frequency 604 of 5 GHz.

Figure 10:
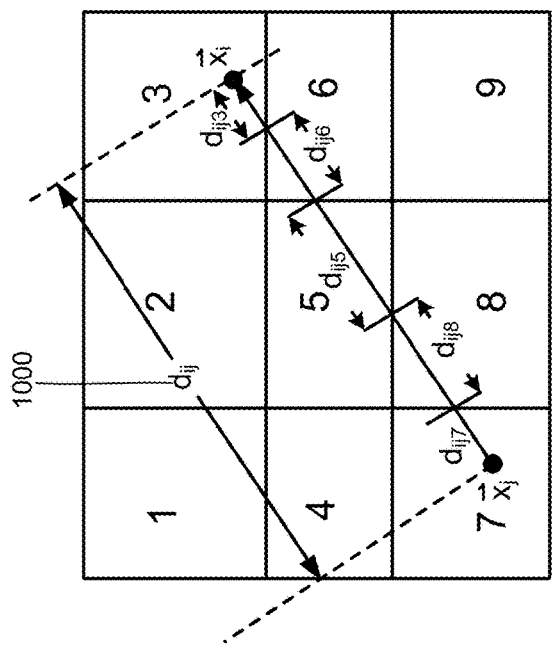
FIG. 10 illustrates the system determining a distance vector between two points.

FIG. 10 illustrates that the system 100 can determine a distance vector 1000 between two points. In this variation, the indoor environment 300 can be divided into nine non-overlapping tiles 302. The non-overlapping tiles 302 can be rectangular, or in another variation, the system 100 can divide the indoor environment 300 into three non-overlapping tiles 302. In another variation, the system 100 can divide the indoor environment 300 into non-overlapping tiles 302 that are triangular. In FIG. 10, a wireless AP 108 or calibration device 206 can send the idealized single-ray signal from 'j' to 'i'. In this example, the system 100 calculates the overall distance from 'j' in tile 7 to 'i' in tile 3 as the sum of distances $d_{ij7}$, $d_{ij8}$, $d_{ij5}$, $d_{ij6}$, and $d_{ij3}$. In general, the distance in tile 'k', $d_{ijk}$, is given by the equation 1002 in FIG. 10. The overall distance from 'j' to 'i', $d_{ij}$, is given by the formula 1000 in FIG. 10. The system can use the distance formulas in FIG. 10 for all indoor environments 300 that are divided into non-overlapping tiles 302 that are convex shaped. For a single-ray wireless signal, convex shaped tiles have at most one entry point into the tile. For a single-ray wireless signal, convex shaped tiles have at most one exit point out of the tile. The system 100 can calculate the AP-to-AP distance vector 906 between any pair of wireless APs. The system 100 can calculate RP-to-AP distance vectors 1904 (see FIG. 19) between any calibration reference point (RP) 308 and any wireless AP 108. The system 100 can calculate AP-to-RP distance vectors 2104 (see FIG. 21) between any wireless AP 108 and any calibration reference point (RP) 308.

Figure 11:
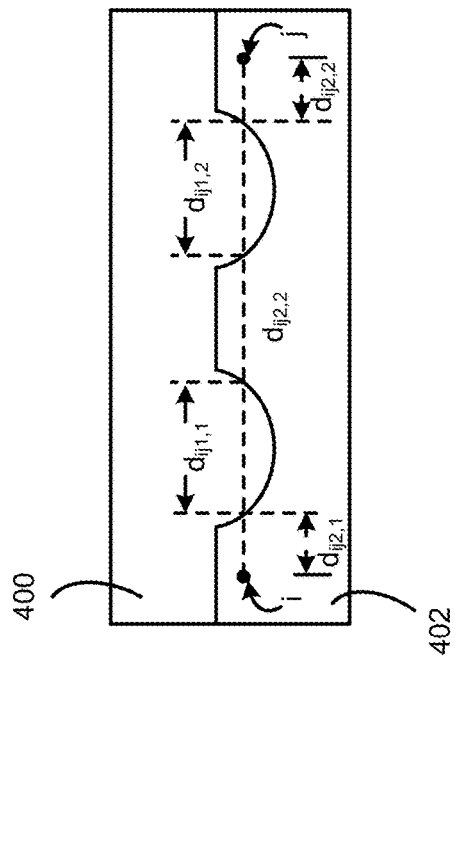
FIG. 11 illustrates the system determining the distance vector between two points with concave shaped tiles.

FIG. 11 illustrates that the system 100 can determine the distance vector 1000 in non-overlapping tiles 302 between two points 'i' and 'j'. In this variation, the indoor environment 300 can be divided into two non-overlapping tiles 302. The non-overlapping tiles 302 are concave and non-polygonal in shape. In FIG. 11, a wireless AP 108 or calibration device 206 sends a wireless signal from 'j' to 'i'. In this example, the system calculates the overall distance from 'j' in the second tile 402 to 'i' in the second tile 402 as the sum of distances $d_{ij21}$, $d_{ij22}$, $d_{ij23}$, $d_{ij11}$, and $d_{ij12}$. In general, the distance in tile is given by the $d_{ijk}$ formula 1002 in FIG. 11. The overall distance from 'j' to 'i', is given by the $d_{ij}$ formula for the distance vector 1000 in FIG. 11. The system 100 can use the distance formulas in FIG. 11 for all indoor environments 300 that are divided into non-overlapping tiles 302 that have one or more concave shaped tiles. For a single-ray wireless signal, concave shaped tiles can have more than one entry point into the tile. For a single-ray wireless signal, concave shaped tiles can have more than one exit point out of the tile.

Figure 12:
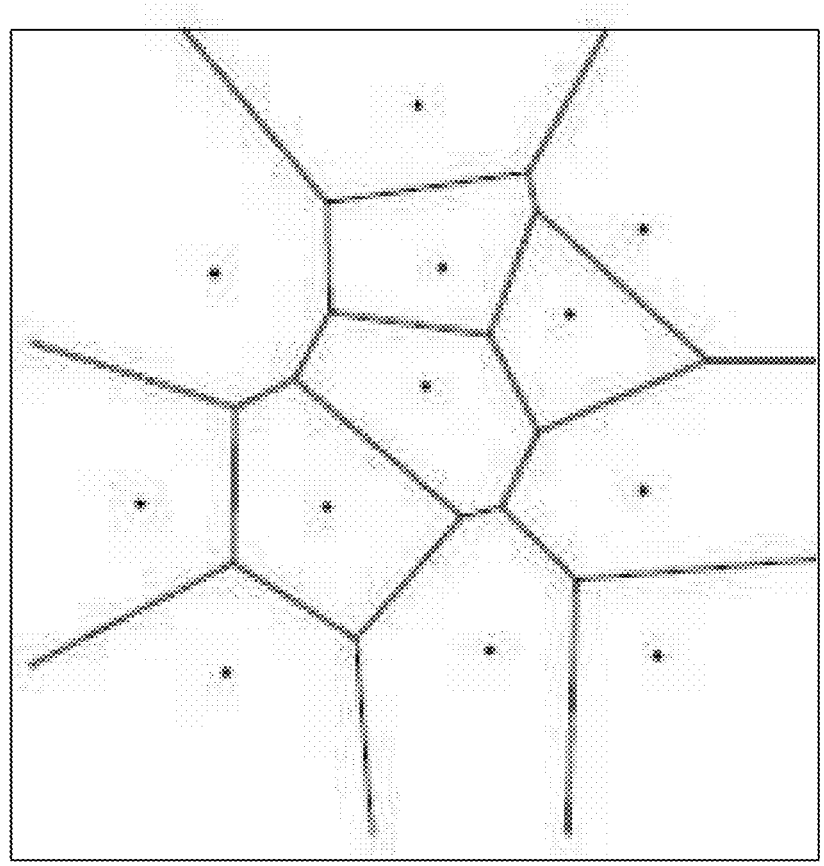
FIG. 12 illustrates the indoor environment divided into Voronoi cells.

FIG. 12 illustrates the indoor environment 300 divided into Voronoi cells. A Voronoi diagram is a partitioning of a coordinate-plane 304 into regions based on distance to points in a specific subset of the coordinate-plane 304. The set of points is specified beforehand, and for each point there is a corresponding region consisting of all points closer to that point than to any other. These regions are called Voronoi cells. The system 100 can construct the non-overlapping tiles 302 by choosing an initial set of points distributed throughout the indoor environment 300. The location of the points can be chosen by the system 100 using a number of criteria. One criterion can be to choose points where there might be different path-loss characteristics. For example, one point could be placed in each room, hallway, and open space of an indoor environment 300. Another criterion can be to place points according to where there is the most demand for Wi-Fi. The system 100 can then construct the Voronoi cells in the indoor environment 300 in the manner just described. By the mathematical properties of Voronoi regions, the resulting tiling is non-overlapping.

FIG. 13 illustrates a variation of the formula representing the spatially-dependent path-loss model 800 in a matrix form. In the first equation, $RSSI_{ij}$ is expressed as a function of the transmit strength at $x_j$, the distance vector 1000, and the gamma vector. The second equation rearranges the terms of the first equation. In FIG. 13 the AP transmit strengths 900 are signal strengths of idealized single-ray signals 404 transmitted by each of the wireless APs 108, and the AP-to-AP RSSIs 904 are signal strengths of the idealized single-ray signals 404 received by each of the wireless APs 108.

FIG. 14 illustrates equations representing a set of equations for the spatially-dependent path-loss model 800 that can be constructed by the system 100. Expanding the terms in the equations in FIG. 13 yields the matrix set of equations shown in FIG. 14. With these equations, the system 100 can construct a set of path-loss equations using the AP transmit strengths 900 at the first frequency 602, the AP-to-AP RSSIs 904 obtained at the first frequency 602, the AP-to-AP distance vectors 906, and a tile-specific path-loss coefficient 600 for each of the non-overlapping tiles 302 within the indoor environment 300. The system 100 can construct another set of path-loss equations using the additional AP transmit strengths 900 at the second frequency 604, the additional AP-to-AP RSSIs 904 obtained at the second frequency 604, the AP-to-AP distance vectors 906, and another tile-specific path-loss coefficient 600 for each of the non-overlapping tiles 302 within the indoor environment 300.

FIG. 15 illustrates that the system 100 can solve the set of path-loss equations 1400 to yield a value for the tile-specific path-loss coefficient 600 for each of the tiles within the indoor environment 300. Solving the set of path-loss equations can be accomplished by applying a pseudoinverse 1502 to the set of path-loss equations 1400, yielding values for the k elements of the gamma array. The units of each element of the gamma array can be dB milliwatts/meter or dBm/m. The system 100 can use the solved k elements of the gamma array, the transmit strengths and distance vectors to estimate RSSIs.

Figure 16:
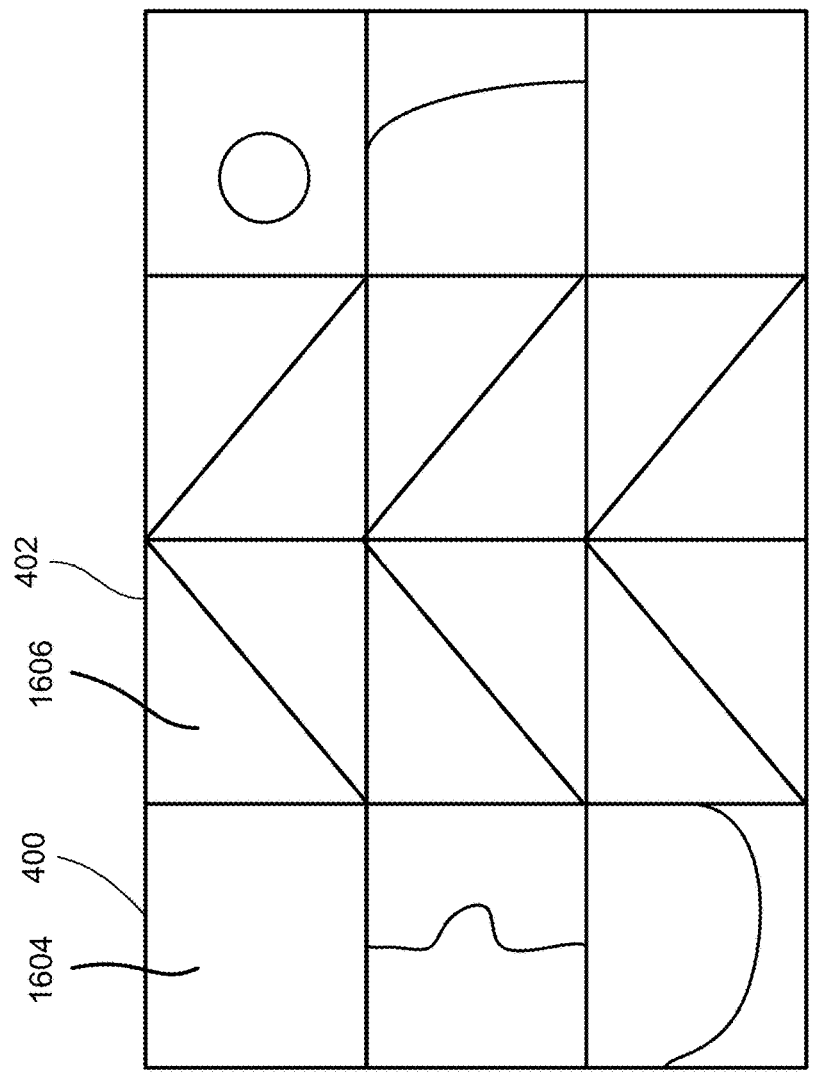
FIG. 16 shows non-overlapping tiles shaped as polygons with at least three sides.

FIG. 16 illustrates that the system can divide the indoor environment 300 into non-overlapping tiles 302 shaped as polygons with at least three sides. The system can also divide the indoor environment 300 into non-overlapping tiles 302 comprising at least a first tile having a first shape and a second tile having a second shape, wherein the first shape is different from the second shape.

In one variation, the system 100 can divide the indoor environment 300 into non-overlapping tiles 302 comprising tiles of square and triangular shapes.

Figure 17:
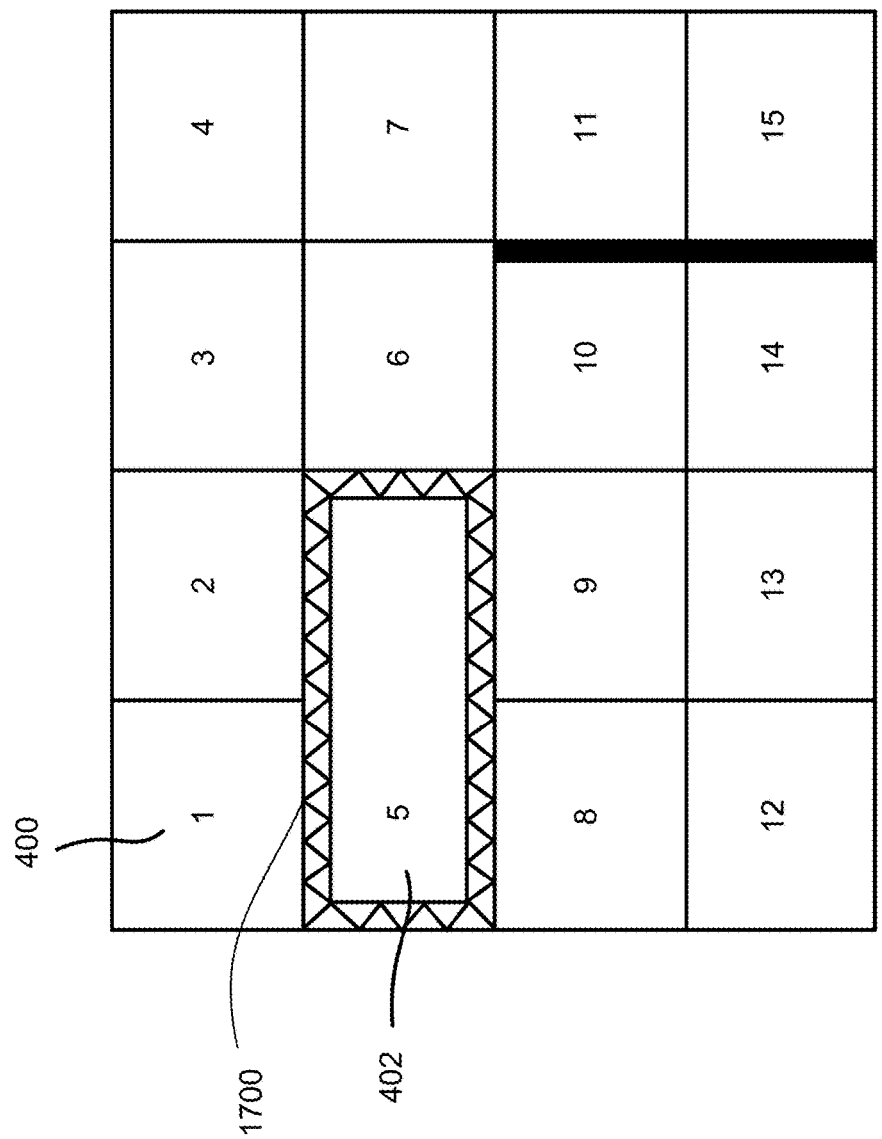
FIG. 17 illustrates the indoor environment with a tile having the same shape as a room in the indoor environment.

FIG. 17 illustrates that the system 100 can divide the indoor environment 300 into tiles comprising a first tile 400 having the same shape as a room in the indoor environment 300. In another embodiment, they system can divide the indoor environment 300 into tiles wherein the side of the first tile 400 can align with a physical feature of the indoor environment 300 that attenuates wireless signals at the first frequency 602.

Figure 18:
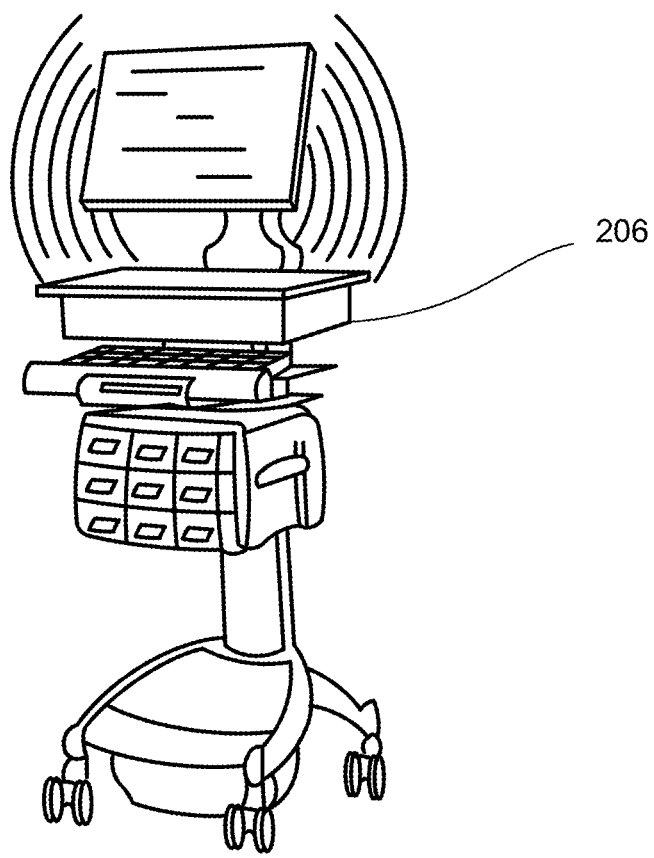
FIG. 18 illustrates a calibration device moveable within the indoor environment.

FIG. 18 illustrates that the calibration device 206 can be moved within the indoor environment 300. The calibration device 206 can be moved with manual human labor. The calibration device 206 can have electric powered motors for movement within the indoor environment 300. The calibration device 206 can be partially or fully autonomous. The calibration device 206 can have sensors to detect obstructions within the indoor environment 300. The calibration device 206 can have a rechargeable battery system. The calibration device 206 can be a drone that can hover above ground. The calibration device 206 can be programmed to automatically find spots with no signal coverage by the wireless AP 108.

Figure 19:
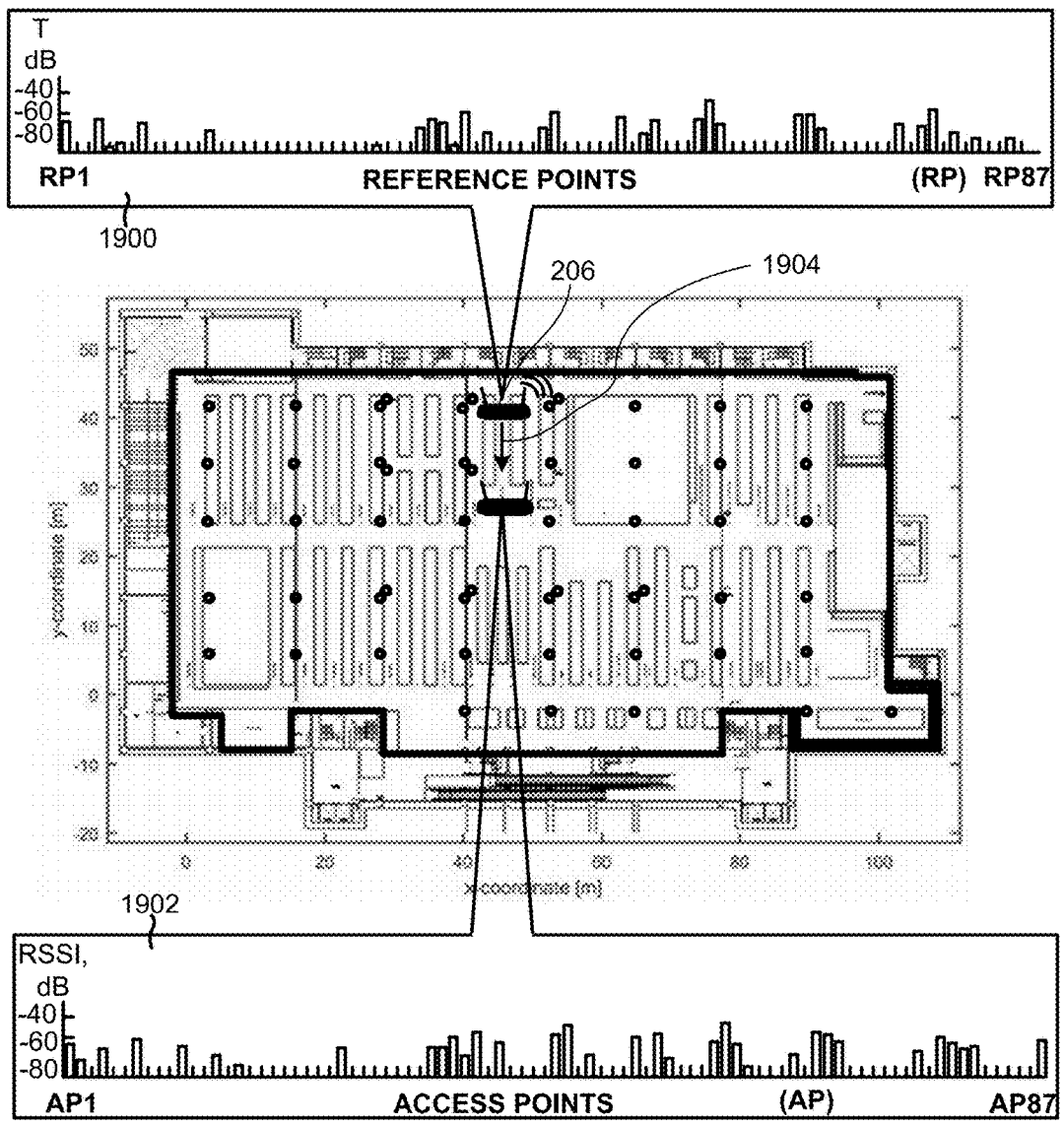
FIG. 19 illustrates a representation of the indoor environment with a calibration device at each of several reference point positions transmitting wireless signals to the access points.

FIG. 19 illustrates that the system 100 can have 87 wireless access points (APs) 108 and 87 calibration reference points (RPs) 308 positioned throughout the indoor environment 300. The wireless access points (APs) 108 can be evenly spaced in the indoor environment 300 and can cover the entire indoor environment 300. The calibration reference points (RPs) 308 can be evenly spaced in the indoor environment 300 and can cover the entire indoor environment 300.

It should be understood by one of ordinary skill in the art that although specific numbers of wireless access points (APs) 108 and calibration reference points (RPs) 308 are shown in FIG. 19, the actual number of wireless access points (APs) 108 deployed and calibration reference points (RPs) established can increase or decrease based on the size or dimensions of the indoor environment 300 or based on other factors such as the number of expected wireless AP users.

In the variation shown in FIG. 19, the server can obtain the RP calibration transmit strengths 1900 of wireless signals generated by the calibration device 206 at each of the calibration reference points RPs 308 to the wireless APs 108 at a first frequency 602. The RP calibration transmit strengths 1900 can be obtained from the calibration device 206 or the database 110 or a combination of both. The first frequency 602 can be any frequency that the calibration device 206 and the wireless APs 108 use. In one variation, the calibration device 206 and the wireless APs 108 can operate at 2.4 GHz, or in another variation the calibration device 206 and the wireless APs 108 can operate at a second frequency 604 of 5 GHz.

In the variation shown in FIG. 19, the server 102 can obtain the RP-to-AP received signal strength indicators (RSSIs) 1902 measured at each of the wireless APs 108 from the wireless signals transmitted by the calibration device 206 at the calibration reference points (RPs) at the first frequency 602. The RP-to-AP RSSIs 1902 can be obtained from the wireless APs 108 or the database 110 or a combination of both. The first frequency 602 can be any frequency that the calibration device 206 and wireless APs 108 use. In one variation, the calibration device 206 and wireless APs 108 can operate at 2.4 GHz, or in another variation the calibration device 206 and wireless APs 108 can operate at a second frequency 604 of 5 GHz.

FIG. 20 illustrates that the system 100 can calculate the set of path-loss equations for M calibration reference points (RPs) 308 and N wireless access points (APs) 108. The system 100 can construct the set of path-loss equations 1400 using the AP transmit strengths 900 at the first frequency 602, the RP calibration transmit strengths 1900 at the first frequency 602, the AP-to-AP RSSIs 904 obtained at the first frequency 602, the RP-to-AP calibration RSSIs 1902 obtained at the first frequency 602, the AP-to-AP distance vectors 906, the RP-to-AP distance vectors 1904, and the tile-specific path-loss coefficient 600 for each of the tiles within the indoor environment 300.

The system 100 can construct the set of path-loss equations 1400 using the AP transmit strengths 900 at the first frequency 602, the AP-to-AP RSSIs 904 obtained at the first frequency 602, the AP-to-RP calibration RSSIs 2102 obtained at the first frequency 602, the AP-to-AP distance vectors 906, the AP-to-RP distance vectors 2104, and the tile-specific path-loss coefficient 600 for each of the tiles within the indoor environment 300.

In the special case where the number of calibration reference points 308 is zero, the set of path-loss equations 1400 is identical to the set of path-loss equations 1400 in FIG. 14.

Figure 21:
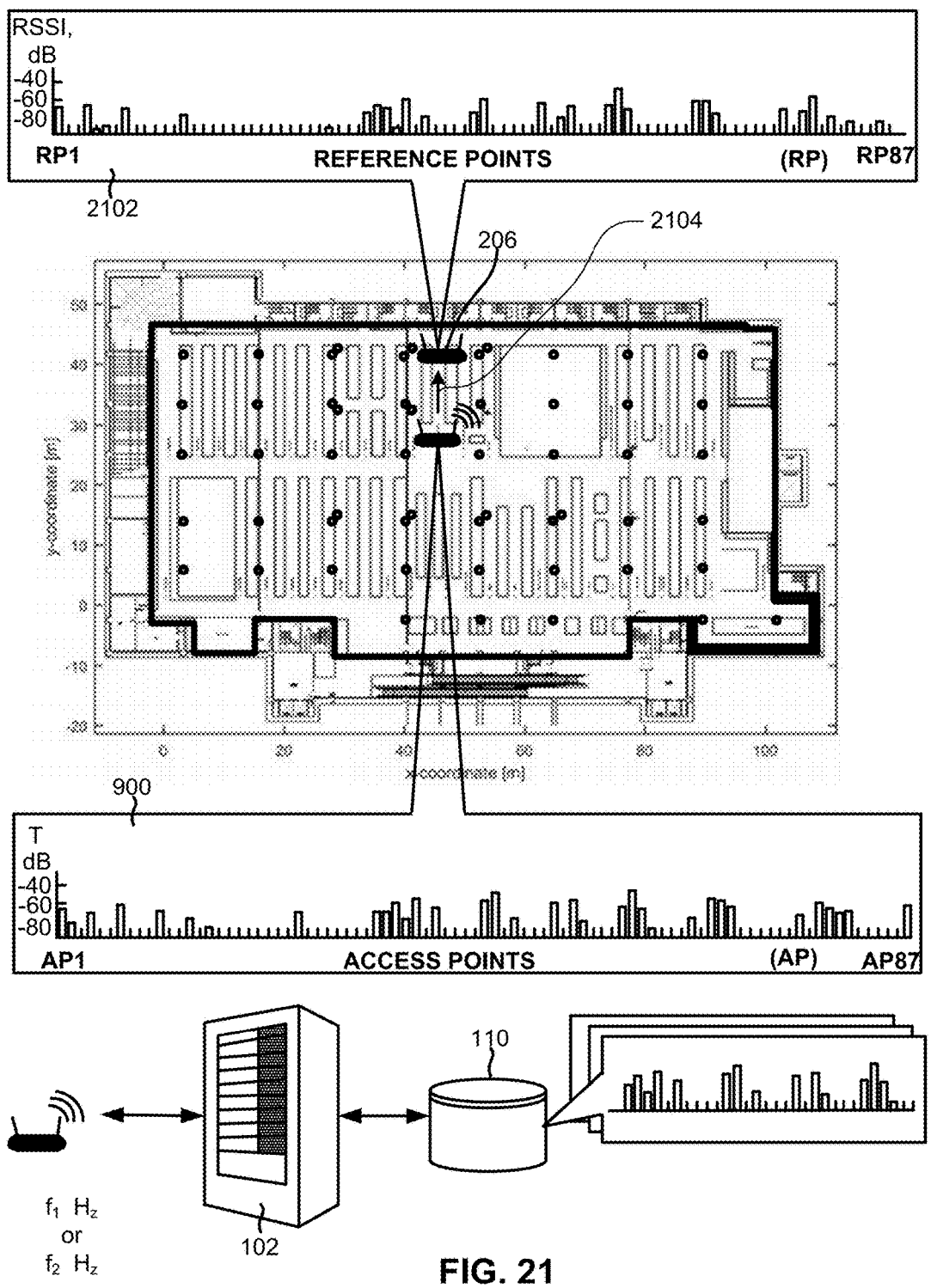
FIG. 21 illustrates a representation of the indoor environment where access points are transmitting to the calibration device and the calibration device is at several reference point positions.

FIG. 21 illustrates that the calibration device 206 is moveable within the indoor environment 300 and that the calibration device 206 can be configured to receive wireless signals transmitted by the wireless access points (APs) 108 at a number of calibration reference points (RPs) 308 located throughout the indoor environment 300.

FIG. 21 illustrates a variation of the system 100 having 87 wireless APs positioned throughout the environment 300. In the variation shown in FIG. 21, the reference points can be evenly spaced in the environment 300 and cover the entire environment 300.

It should be understood by one of ordinary skill in the art that although specific numbers of reference points are shown in FIG. 21, the actual number of calibration reference points can increase or decrease based on the size or dimensions of the environment 300 or based on other factors such as the number of expected wireless AP users.

In the variation shown in FIG. 21, the server can obtain the AP transmit strengths 900 of wireless signals generated by each of the wireless APs to the calibration device at each of the calibration RPs at the first frequency. The AP transmit strengths 900 can be obtained from each of the wireless APs or the database 110 or a combination of both. The first frequency can be any frequency that the calibration device uses. In one variation, the calibration device can operate at 2.4 GHz. In another variation, the calibration device can operate at 5 GHz.

In the variation shown in FIG. 21, the server can obtain the AP-to-RP calibration RSSIs measured by the calibration device at each of the calibration RPs from the wireless signals transmitted by each of the wireless APs at the first frequency. The AP-to-RP calibration RSSIs can be obtained from the calibration device or the database 110 or a combination of both. The first frequency can be any frequency that the calibration device uses. In one variation, the calibration device can operate at 2.4 GHz. In another variation, the calibration device can operate at 5 GHz.

In one variation of the invention, the system 100 can construct the set of path-loss equations for M calibration reference points (RPs) 308 and N wireless access points (APs) 108. The system 100 can construct the set of path-loss equations 1400 using the AP transmit strengths 900 at the first frequency 602, the RP calibration transmit strengths 1900 at the first frequency 602, the AP-to-AP RSSIs 904 obtained at the first frequency 602, the RP-to-AP calibration RSSIs 1902 obtained at the first frequency 602, the AP-to-RP calibration RSSIs 2102 at the first frequency 602, the AP-to-AP distance vectors 906, and the RP-to-AP distance vectors 1904, and calculate the tile-specific path-loss coefficient 600 for each of the tiles within the indoor environment 300.

In another variation of the invention, the system 100 can construct the set of path-loss equations 1400 using the AP transmit strengths 900 at the second frequency 604, the RP calibration transmit strengths 1900 at the second frequency 604, the AP-to-AP RSSIs 904 obtained at the second frequency 604, the RP-to-AP calibration RSSIs 1902 obtained at the second frequency 604, the AP-to-RP calibration RSSIs 2102 at the second frequency 604, the AP-to-AP distance vectors 906, and the RP-to-AP distance vectors 1904, and calculate the tile-specific path-loss coefficient 600 for each of the tiles within the indoor environment 300.

In another variation of the invention, the system 100 can construct the set of path-loss equations for M calibration reference points (RPs) 308 and N wireless access points (APs) 108. The system 100 can construct the set of path-loss equations 1400 using the AP transmit strengths 900 at the first frequency 602, the RP calibration transmit strengths 1900 at the first frequency 602, the RP-to-AP calibration RSSIs 1902 obtained at the first frequency 602, the AP-to-RP calibration RSSIs 2102 at the first frequency 602, and the RP-to-AP distance vectors 1904, and calculate the tile-specific path-loss coefficient 600 for each of the tiles within the indoor environment 300.

In another variation of the invention, the system 100 can construct the set of path-loss equations 1400 using the AP transmit strengths 900 at the second frequency 604, the RP calibration transmit strengths 1900 at the second frequency 604, the RP-to-AP calibration RSSIs 1902 obtained at the second frequency 604, the AP-to-RP calibration RSSIs 2102 at the second frequency 604, and the RP-to-AP distance vectors 1904, and calculate the tile-specific path-loss coefficient 600 for each of the tiles within the indoor environment 300.

In another variation of the invention, the system 100 can construct the set of path-loss equations for M calibration reference points (RPs) 308 and N wireless access points (APs) 108. The system 100 can construct the set of path-loss equations 1400 using the AP transmit strengths 900 at the first frequency 602, the RP calibration transmit strengths 1900 at the first frequency 602, the AP-to-AP RSSIs 904 obtained at the first frequency 602, the RP-to-AP calibration RSSIs 1902 obtained at the first frequency 602, the AP-to-AP distance vectors 906, and the RP-to-AP distance vectors 1904, and calculate the tile-specific path-loss coefficient 600 for each of the tiles within the indoor environment 300.

In another variation of the invention, the system 100 can construct the set of path-loss equations 1400 using the AP transmit strengths 900 at the second frequency 604, the RP calibration transmit strengths 1900 at the second frequency 604, the AP-to-AP RSSIs 904 obtained at the second frequency 604, the RP-to-AP calibration RSSIs 1902 obtained at the second frequency 604, the AP-to-AP distance vectors 906, and the RP-to-AP distance vectors 1904, and calculate the tile-specific path-loss coefficient 600 for each of the tiles within the indoor environment 300.

In another variation of the invention, the system 100 can construct the set of path-loss equations for M calibration reference points (RPs) 308 and N wireless access points (APs) 108. The system 100 can construct the set of path-loss equations 1400 using the AP transmit strengths 900 at the first frequency 602, the RP calibration transmit strengths 1900 at the first frequency 602, the AP-to-AP RSSIs 904 obtained at the first frequency 602, the AP-to-RP calibration RSSIs 2102 at the first frequency 602, the AP-to-AP distance vectors 906, and the RP-to-AP distance vectors 1904, and calculate the tile-specific path-loss coefficient 600 for each of the tiles within the indoor environment 300.

In another variation of the invention, the system 100 can construct the set of path-loss equations 1400 using the AP transmit strengths 900 at the second frequency 604, the RP calibration transmit strengths 1900 at the second frequency 604, the AP-to-AP RSSIs 904 obtained at the second frequency 604, the AP-to-RP calibration RSSIs 2102 at the second frequency 604, the AP-to-AP distance vectors 906, and the RP-to-AP distance vectors 1904, and calculate the tile-specific path-loss coefficient 600 for each of the tiles within the indoor environment 300.

In another variation of the invention, the system 100 can construct the set of path-loss equations for M calibration reference points (RPs) 308 and N wireless access points (APs) 108. The system 100 can construct the set of path-loss equations 1400 using the RP calibration transmit strengths 1900 at the first frequency 602, the RP-to-AP calibration RSSIs 1902 obtained at the first frequency 602, and the RP-to-AP distance vectors 1904, and calculate the tile-specific path-loss coefficient 600 for each of the tiles within the indoor environment 300.

In another variation of the invention, the system 100 can construct the set of path-loss equations 1400 using the RP calibration transmit strengths 1900 at the second frequency 604, the RP-to-AP calibration RSSIs 1902 obtained at the second frequency 604, and the RP-to-AP distance vectors 1904, and calculate the tile-specific path-loss coefficient 600 for each of the tiles within the indoor environment 300.

In another variation of the invention, the system 100 can construct the set of path-loss equations for M calibration reference points (RPs) 308 and N wireless access points (APs) 108. The system 100 can construct the set of path-loss equations 1400 using the AP transmit strengths 900 at the first frequency 602, the AP-to-RP calibration RSSIs 2102 at the first frequency 602, and the RP-to-AP distance vectors 1904, and calculate the tile-specific path-loss coefficient 600 for each of the tiles within the indoor environment 300.

In another variation of the invention, the system 100 can construct the set of path-loss equations 1400 using the AP transmit strengths 900 at the second frequency 604, the AP-to-RP calibration RSSIs 2102 at the second frequency 604, and the RP-to-AP distance vectors 1904, and calculate the tile-specific path-loss coefficient 600 for each of the tiles within the indoor environment 300.

In another variation of the invention, the system 100 can construct the set of path-loss equations for M=0 calibration reference points (RPs) 308 and N wireless access points (APs) 108. The system 100 can construct the set of path-loss equations 1400 using the AP transmit strengths 900 at the first frequency 602, the AP-to-AP RSSIs 904 obtained at the first frequency 602, and the AP-to-AP distance vectors 906, and calculate the tile-specific path-loss coefficient 600 for each of the tiles within the indoor environment 300.

In another variation of the invention, the system 100 can construct the set of path-loss equations 1400 using the AP transmit strengths 900 at the second frequency 604, the AP-to-AP RSSIs 904 obtained at the second frequency 604, and the AP-to-AP distance vectors 906, and calculate the tile-specific path-loss coefficient 600 for each of the tiles within the indoor environment 300.

Figure 22A:
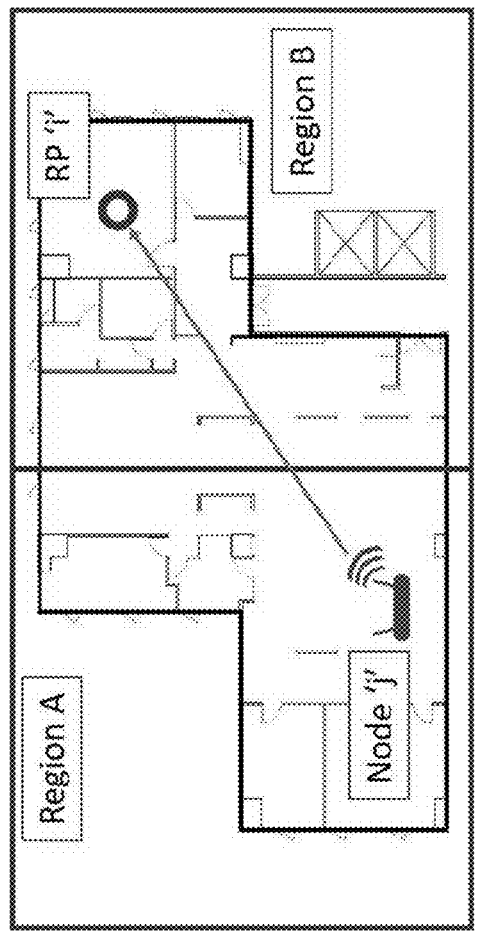
FIG. 22A illustrates an access point at node 'j' transmitting to a calibration device at reference point 'i'.
Figure 22B:
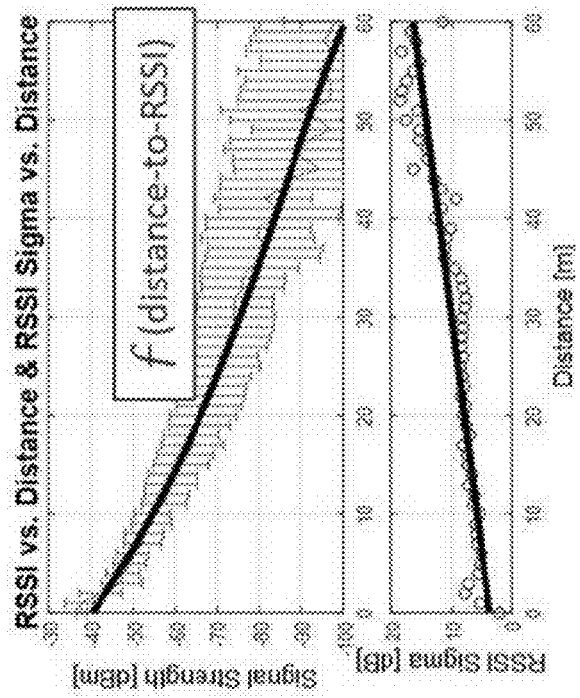
FIG. 22B illustrates a representation of predicted RSSI in dBm (dB milliwatts) and the standard deviation of the predicted RSSI as a function of the distance from a transmitter.

FIG. 22A illustrates the wireless AP at node 'j' transmitting to the calibration device at reference point 'i'. FIG. 22B illustrates a representation of predicted RSSI in dBm (dB milliwatts) and the standard deviation of the predicted RSSI as a function of the distance from a transmitter. The wireless AP transmit strength, the locations of the calibration reference points, and the idealized single-ray spatially-dependent path-loss model can be used to predict the RSSI of a wireless AP received at each of the several RPs. The system can set in the database 110, the entry for the signal strength prediction at an RP to 'no detect' if the signal strength prediction is below the detection sensitivity of one or more target devices. The system can provision an AP into the database 110 and set the AP status to 'healthy' for subsequent use. The subsequent use can be in a weighted-KNN location algorithm.

A method of operation of the spatially-dependent path-loss model system can include dividing, using the processing unit 200 of the server 100, the coordinate-plane 304 representing the indoor environment 300 into non-overlapping tiles 302. The method can then include obtaining, using the server communication unit 204 of the server 100 coupled to the processing unit 200, AP transmit strengths 900 of wireless signals generated by wireless access point (APs) 108 positioned throughout the indoor environment 300 to each of the other wireless APs 108 at the first frequency 602. The AP transmit strengths 900 can be obtained from each of the wireless APs 108 or the database 110. The method can then include obtaining, using the server communication unit 204, AP-to-AP received signal strength indicators (RSSIs) 904 measured at each of the wireless APs 108 from the wireless signals transmitted by the other wireless APs 108 at the first frequency 602. The AP-to-AP RSSIs 904 can be obtained from each of the wireless APs 108 or the database 110. The method can then include calculating, using the processing unit 200, AP-to-AP distance vectors 906 between each of the wireless APs 108. The method can then include constructing, using the processing unit 200, the set of path-loss equations 1400 using the AP transmit strengths 900 at the first frequency 602, the AP-to-AP RSSIs 904 obtained at the first frequency 602, the AP-to-AP distance vectors 906, and the tile-specific path-loss coefficient 600 for each of the tiles within the indoor environment 300. The method can then include solving, using the processing unit 200, the set of path-loss equations 1400 to yield a value for the tile-specific path-loss coefficient 600 for each of the tiles within the indoor environment 300. The method can also include obtaining, using the server communication unit 204, additional AP transmit strengths 900 of wireless signals transmitted by each of the wireless APs 108 to the other wireless APs 108 at the second frequency 604 different from the first frequency 602. The additional AP transmit strengths 900 can be obtained from each of the wireless APs 108 or the database 110. The method can include obtaining, using the server communication unit 204, additional AP-to-AP RSSIs 904 measured at each of the wireless APs 108 from the wireless signals transmitted by the other wireless APs 108 at the second frequency 604. The additional AP-to-AP RSSIs 904 can be obtained from each of the wireless APs 108 or the database 110. The method can include constructing, using the processing unit 200, another set of path-loss equations 1400 using the additional AP transmit strengths 900 at the second frequency 604, the additional AP-to-AP RSSIs 904 obtained at the second frequency 604, the AP-to-AP distance vectors 906, and another tile-specific path-loss coefficient 600 for each of the tiles within the indoor environment 300. The method can then include solving, using the processing unit 200, the other set of path-loss equations 1400 to yield a value for the other tile-specific path-loss coefficient 600 for each of the tiles within the indoor environment 300. The method can also include obtaining using the server communication unit 204, RP calibration transmit strengths 1900 of the wireless signals generated by the calibration device 206 at a number of calibration reference points (RPs) 308 at the first frequency 602. The calibration device 206 can be moveable within the indoor environment 300 such that the calibration device 206 can be configured to transmit wireless signals to the wireless APs at the calibration RPs located throughout the indoor environment 300. The RP calibration transmit strengths 1900 can be obtained from the calibration device 206 or the database 110. The method can then obtain, using the server communication unit 204, RP-to-AP calibration RSSIs 1902 measured at each of the wireless APs 108 from the wireless signals transmitted by the calibration device 206 at each of the calibration RPs 308 at the first frequency 602. The RP-to-AP calibration RSSIs 1902 can be obtained from each of the wireless APs 108 or the database 110. The method can then include calculating, using the processing unit, RP-to-AP distance vectors 1904 between each of the calibration RPs 308 and the wireless APs 108. The method can then include constructing, using the processing unit 200, the set of path-loss equations 1400 using the AP transmit strengths 900 at the first frequency 602, the RP calibration transmit strengths 1900 at the first frequency 602, the AP-to-AP RSSIs 904 obtained at the first frequency 602, the RP-to-AP calibration RSSIs 1902 obtained at the first frequency 602, the AP-to-AP distance vectors 906, the RP-to-AP distance vectors 1904, and the tile-specific path-loss coefficient 600 for each of the tiles within the indoor environment 300. The method can then include obtaining, using the server communication unit 204, AP-to-RP calibration RSSIs 21002 measured by the calibration device 206 at each of the calibration RPs 308 from the wireless signals transmitted by each of the wireless APs 108 at the first frequency 602. The AP-to-RP calibration RSSIs 2102 can be obtained from the calibration device 206 or the database 110. The method can then include constructing, using the processing unit 200, the set of path-loss equations 1400 using the AP transmit strengths 900 at the first frequency 602, the RP calibration transmit strengths 1900 at the first frequency 602, the AP-to-AP RSSIs 904 obtained at the first frequency 602, the RP-to-AP calibration RSSIs 1902 obtained at the first frequency 602, the AP-to-RP calibration RSSIs 2012 obtained at the first frequency 602, the AP-to-AP distance vectors 906, the RP-to-AP distance vectors 1904, and the tile-specific path-loss coefficient 600 for each of the tiles within the indoor environment 3001.

Another method of operation of the spatially-dependent path-loss model system can include dividing, using the processing unit 200 of the server 102, a coordinate-plane 304 representing the indoor environment 300 into non-overlapping tiles 302. The method can also include obtaining, using a server communication unit 204 of the server 102 coupled to the processing unit 200, AP transmit strengths 900 of wireless signals transmitted by a number of wireless access points (APs) 108 to the calibration device 206 at a number of calibration reference points (RPs) 308 at the first frequency 602 within the indoor environment 300. The AP transmit strengths 900 can be obtained from the wireless APs 108 or the database 110. The calibration device 206 can be moveable within the indoor environment 300. The method can then include obtaining, using the server communication unit 204, AP-to-RP calibration RSSIs 2102 measured at the calibration device 206 at the number of calibration RPs 308 from the wireless signals transmitted by the wireless APs 108 at the first frequency 602, wherein the AP-to-RP calibration RSSIs 2102 can be obtained from the calibration device 206 or the database 110. The method can include calculating, using the processing unit 200, AP-to-RP distance vectors 2104 between each of the calibration RPs 308 and the wireless APs 108. The method can then include constructing, using the processing unit 200, a set of path-loss equations 1400 using the AP transmit strengths 900 at the first frequency 602, the AP-to-RP calibration RSSIs 2102 obtained at the first frequency 602, the AP-to-RP distance vectors 2104, and tile-specific path-loss coefficient 600 for each of the tiles within the indoor environment 300. The method can then include solving, using the processing unit 200, the set of path-loss equations 1400 to yield a value for the tile-specific path-loss coefficient 600 for each of the tiles within the indoor environment 300.

Figure 23:
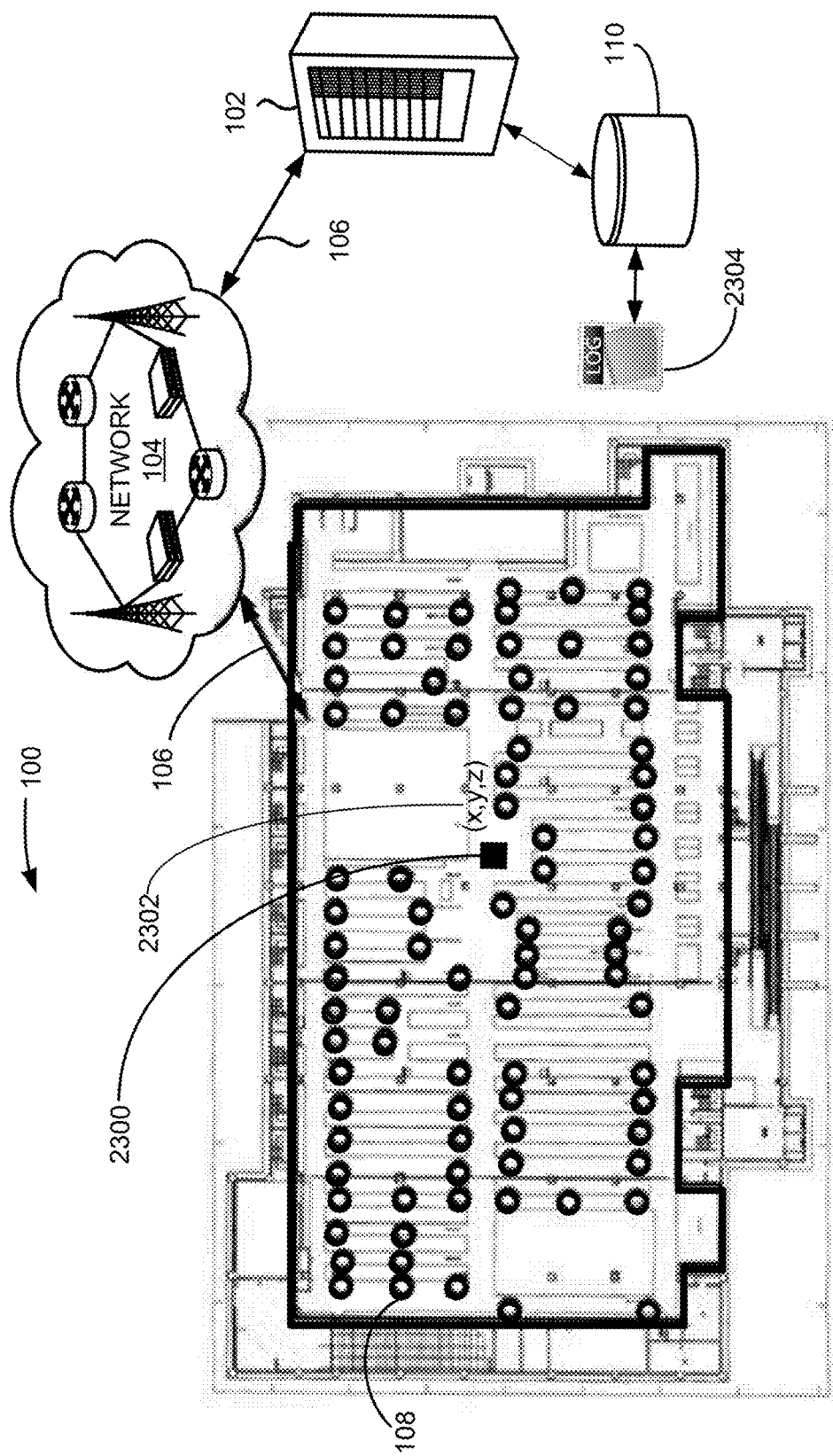
FIG. 23 illustrates a representation of a wireless access point (AP) location solver system with a new wireless AP.

FIG. 23 illustrates that the system 100 can be used as an AP location solver 2500 (see FIG. 25) for the wireless APs 108 and a new wireless AP 2300 in the indoor environment 300. The system 100 can include the server 102, network 104, connections 106, calibration devices 112, and wireless APs 108. The server 102 can record a location 2302 for the new wireless AP 2300 in the database 110. The database 110 can be the wireless signal-strength database. In another embodiment, the server 100 can record and access the location 2302 of the new wireless AP 2300 in another database. The database 110 can be local to the server 102 or it can be in the cloud. The database 110 can be a wireless signal-strength database, or another database for information that is used or accessed by the server 102. The server 102 can record and access an installation log 2304 in the database 110. The installation log 2304 can be recorded in the database 110 at the time the new wireless AP 2300 is installed or moved. The server 102 can also record and access check-in data of the wireless APs 108. The check-in data can be compared with a previous check-in of the wireless APs 108. The system 102 can be used to discover the new wireless AP 2300 within the indoor environment 300. The system 100 can include the wireless APs 108 positioned throughout the indoor environment 300. The wireless APs 108 can include the new wireless AP 2300.

Discovering a new wireless AP 2300 can be done in several ways. In one variation, an installer log can contain an entry for a wireless AP 108 which is not yet in the database 110. In another variation, a wireless AP 108 which is not yet in the database 110 can send data to the server 102 in a recognized format (eg., handshaking, encryption, message format, etc.) In another variation, wireless APs 2300 which are already in the database 110 can report measurements and data in a format they recognize from a wireless AP 108 which is not yet in the database 110.

Figure 24A:
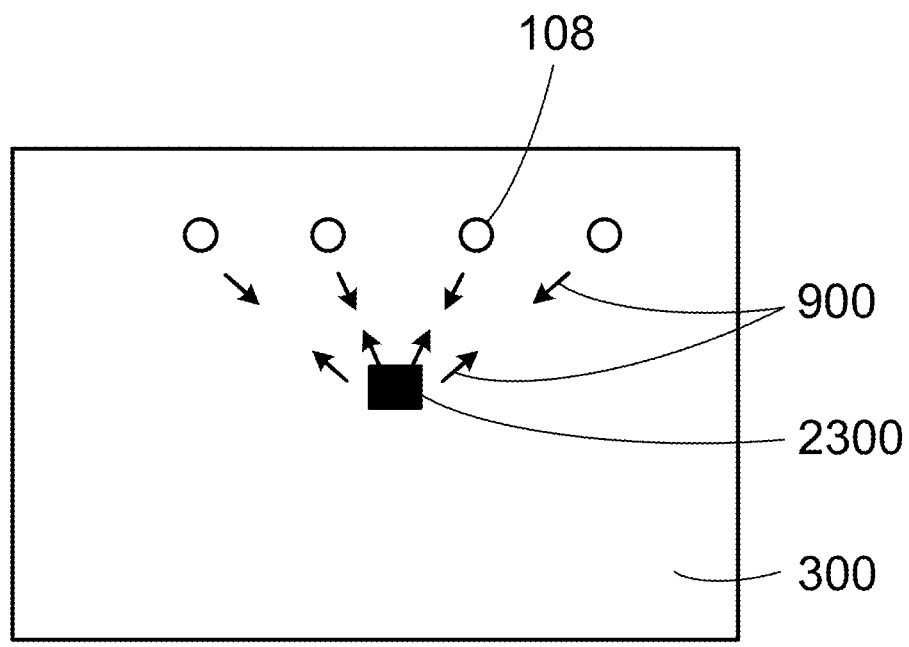
FIG. 24A illustrates AP transmit strengths in the indoor environment with a new wireless access point (AP).

FIG. 24A illustrates that the new wireless AP 2300 can transmit wireless signals. The AP transmit strengths 900 in the indoor environment 300 of the new wireless access point (AP) 2300 can be measured in units of dBm. The system 100 can obtain the AP transmit strengths 900 of wireless signals generated by the new wireless AP 2300 to the other wireless APs 108. The system 100 can also obtain the AP transmit strengths 900 of the wireless signals generated by the other wireless APs 108. The AP transmit strengths 900 can be obtained by the system 100 from the new wireless AP 2300 and the other wireless APs 108 or from the database 110. The system 100 can use a standardized protocol or a proprietary protocol to obtain the AP transmit strengths 900.

Figure 24B:
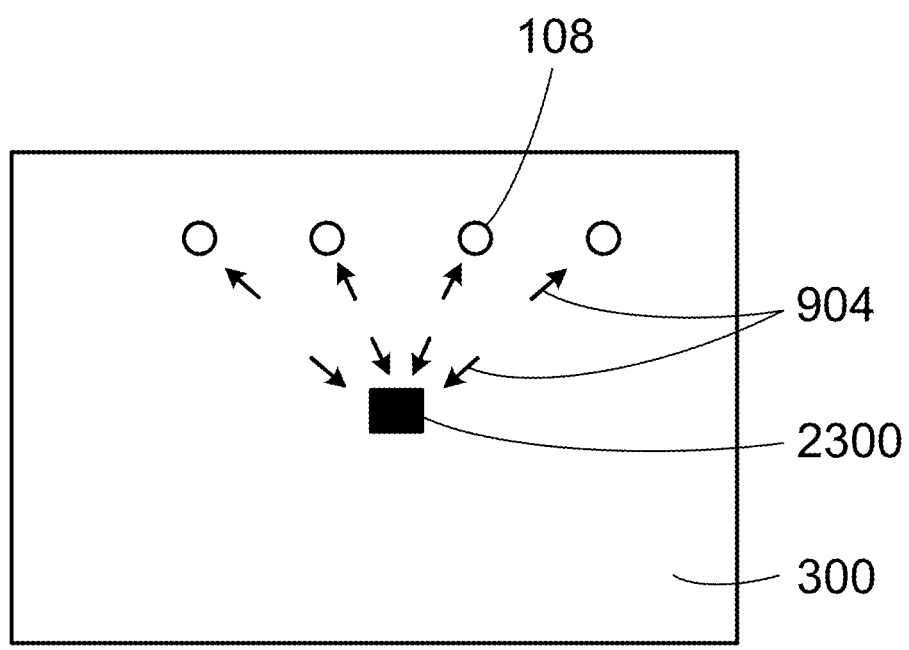
FIG. 24B illustrates AP-to-AP received signal strength indicators (RSSIs) in the indoor environment with a new wireless access point (AP).

FIG. 24B illustrates that the system 100 can obtain AP-to-AP received signal strength indicators (RSSIs) 904 in an indoor environment 300 from the new wireless access point (AP) 2300 and the other wireless APs 108. The AP-to-AP RSSIs 904 can be for the wireless signals received at the new wireless AP 2300 from the wireless signals transmitted by the other wireless APs 108. The AP-to-AP RSSIs 904 can also be for the wireless signals received at each of the other wireless APs 108 from the wireless signals transmitted by the new wireless AP 2300. The AP-to-AP RSSIs 904 can be obtained by the system 100 from the new wireless AP 2300 and the other wireless APs 108 or from a database 110. The system 100 can use a standardized protocol or a proprietary protocol to request and receive the AP-to-AP RSSIs 904. The AP-to-AP RSSIs can be measured in units of dBm.

Figure 25:
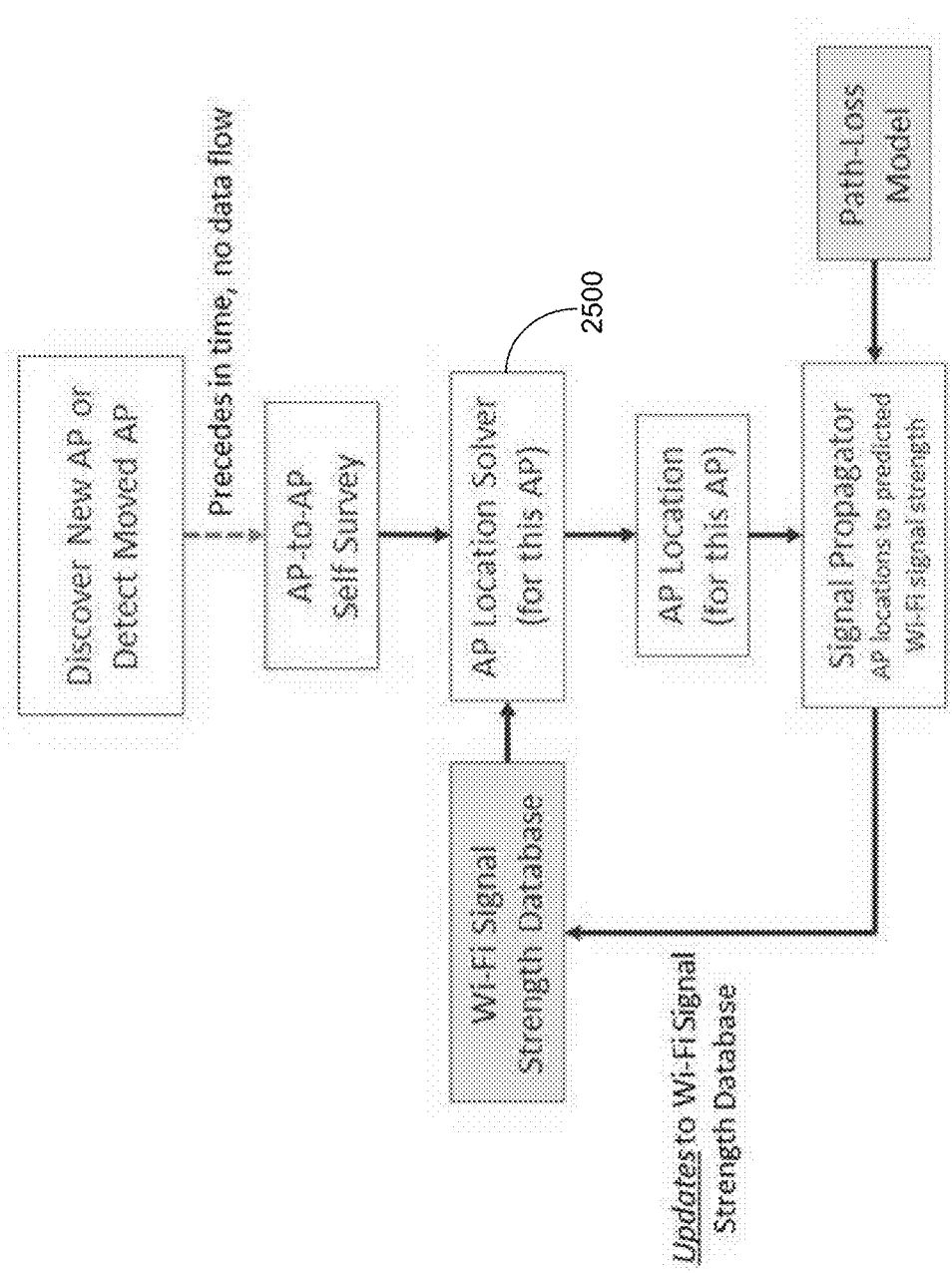
FIG. 25 illustrates a method for operation of an AP location solver for new or moved wireless access points (APs).
Figure 29:
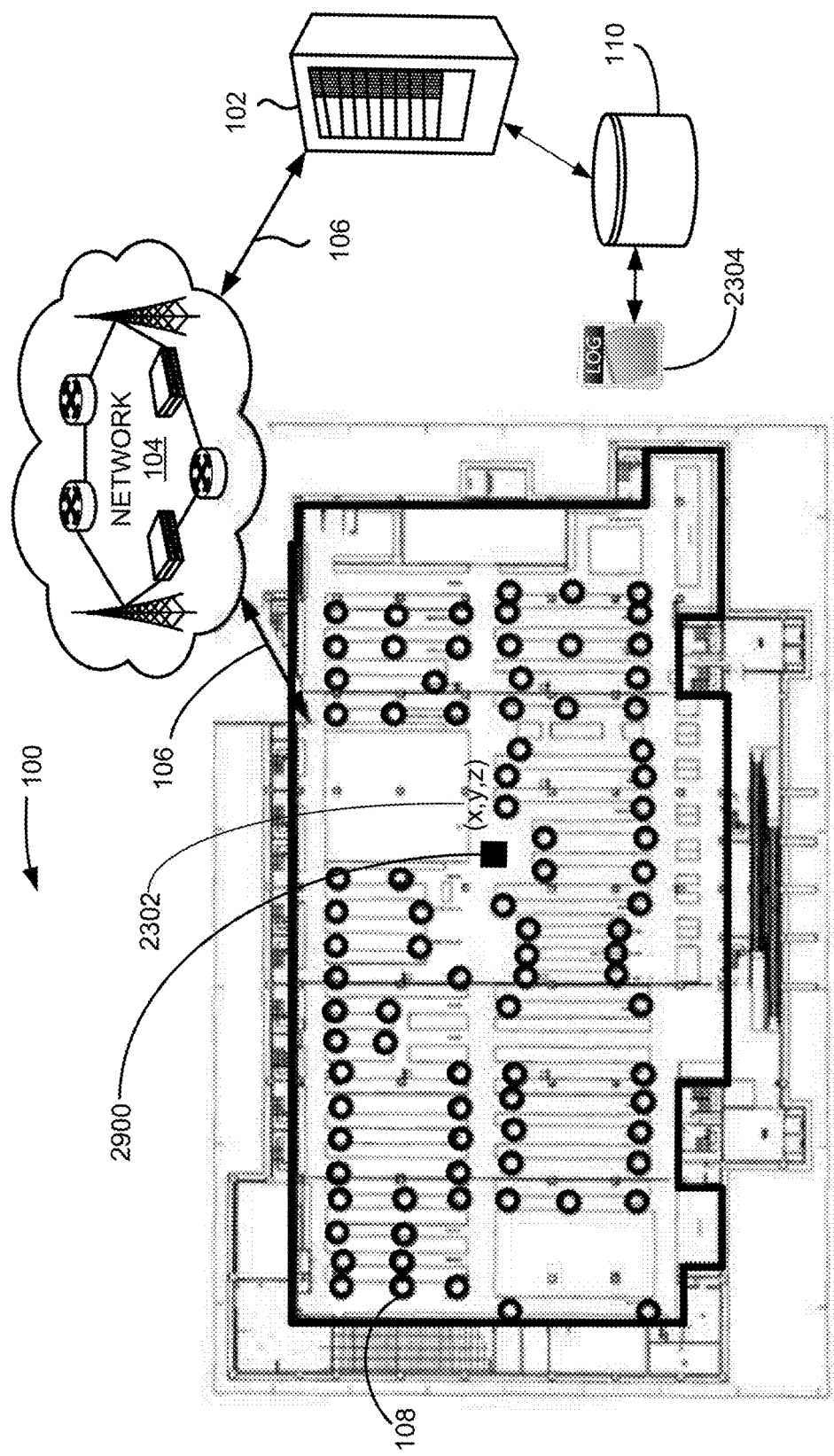
FIG. 29 illustrates a representation of a wireless access point (AP) location solver system with a moved wireless access point (AP).

FIG. 25 illustrates a method for operation of an AP location solver 2500 for determination of the location of the new wireless AP 2300 or a moved wireless AP 2900 (see FIG. 29). The system 100 can determine a location 2302 of the new wireless AP 2300 within the indoor environment 300 using the AP location solver 2500 and information from an installation log 2304, the AP transmit strengths 900, the AP-to-AP RSSIs 904, and data from the database 110. The database 110 can be a wireless signal-strength database, or more specifically a Wi-Fi signal strength database.

The AP location solver 2500 can use a k-nearest neighbor (KNN) location algorithm. The KNN algorithm is a non-parametric method used for classification and regression. In one embodiment, the AP location solver 2500 can use the KNN location algorithm with k=4. In another embodiment, the AP location solver 2500 can use the KNN location algorithm with k=7. In another embodiment, the KNN algorithm can be a weighted KNN algorithm.

The system 100 can flag one of the wireless APs 108 as the moved wireless AP 2900 (see FIG. 29) by comparing the AP transmit strengths 900 and the AP-to-AP RSSIs against transmit strength data and RSSI data previously stored in the database 110. The database 110 can be a wireless signal-strength database, or more specifically a Wi-Fi signal strength database.

The system 100 can determine the location of the moved wireless AP 2900 (see FIG. 29) within the indoor environment 300 using the AP location solver 2500 and information from the installation log 2304, the AP transmit strengths 900, the AP-to-AP RSSIs 904, and data from the database 110. The database 110 can be a wireless signal strength database, or more specifically a Wi-Fi signal strength database. The AP location solver 2500 can use the KNN location algorithm.

Figure 26A:
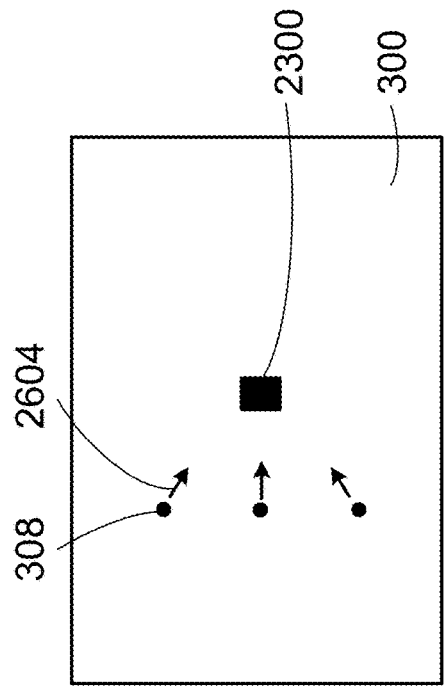
FIG. 26A illustrates AP-to-RP transmit strengths in the indoor environment representing wireless signals generated by the new wireless AP.

FIG. 26A illustrates AP-to-RP transmit strengths 2600 in an indoor environment 300 representing wireless signals generated by the new wireless AP 2300.

Figure 26B:
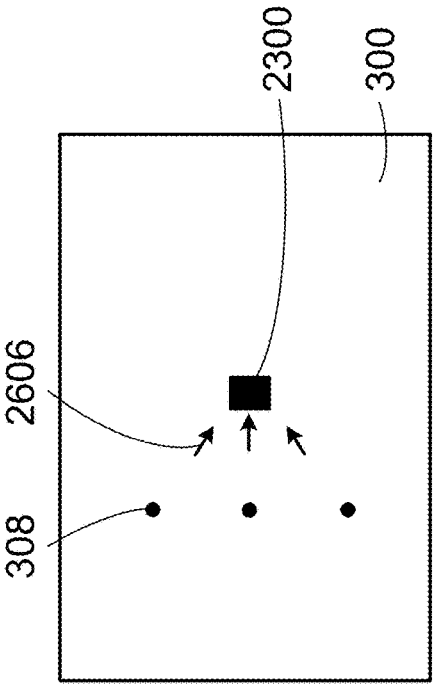
FIG. 26B illustrates estimated AP-to-RP RSSIs in the indoor environment representing simulated wireless signals transmitted by the new wireless AP.

FIG. 26B illustrates estimated AP-to-RP RSSIs 2602 in an indoor environment 300 representing wireless signals which could be transmitted by the new wireless AP 2300 and received at the calibration RPs 308. The system 100 can calculate estimated AP-to-RP RSSIs 2602 which would be measured at the calibration RPs 308 from wireless signals transmitted by the new wireless AP 2300 to the calibration RPs 308 using the spatially-dependent path-loss model 800. The spatially-dependent path-loss model 800 can take as input the location of the new wireless AP 2300 and the AP transmit strength 900 of the new wireless AP 2300. The system 100 can add the resulting estimated AP-to-RP RSSIs 2602 to the database 110. The database 110 can be the wireless signal-strength database.

Figure 26C:
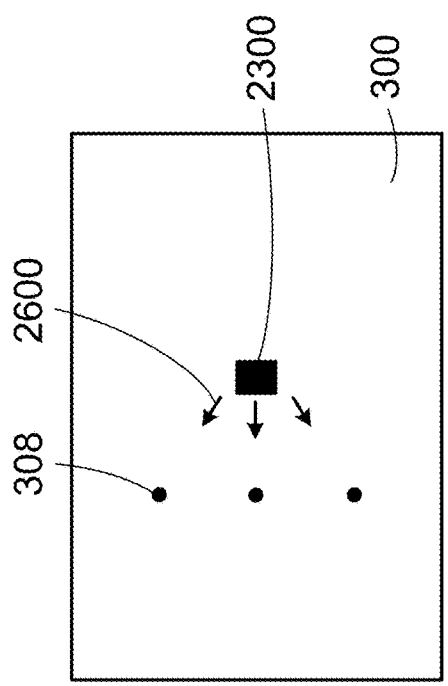
FIG. 26C illustrates RP-to-AP transmit strengths in the indoor environment generated by a calibration device positioned at the calibration RPs to the new wireless AP.

FIG. 26C illustrates RP-to-AP transmit strengths 2604 in an indoor environment 300 generated by the calibration RPs 308 to the new wireless AP 2300.

Figure 26D:
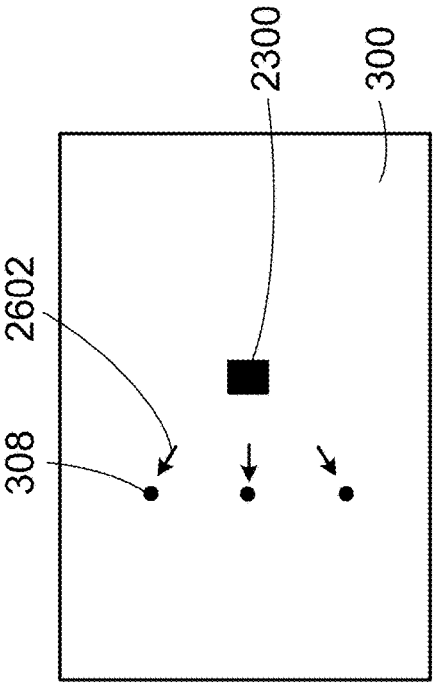
FIG. 26D illustrates RP-to-AP RSSIs in the indoor environment measured at the new wireless AP.

FIG. 26D illustrates RP-to-AP RSSIs 2606 in an indoor environment 300 measured at the new wireless AP 2300.

Figure 27A:
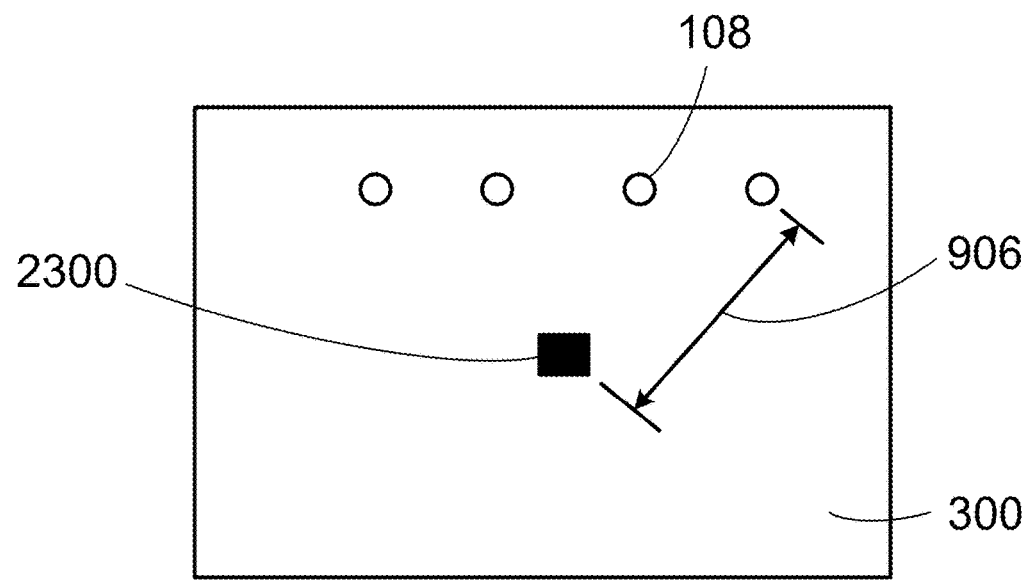
FIG. 27A illustrates the calculation of AP-to-AP distance vectors with the new wireless AP.

FIG. 27A illustrates that the system 100 can calculate the AP-to-AP distance vectors 906 between each of the wireless APs 108 and the new wireless AP 2300. The system 100 can calculate the location 2302 of the new wireless AP 2300 prior to calculating the estimated AP-to-RP RSSIs 2602. The AP-to-AP distance vector 906 can have units of meters or feet.

Figure 27B:
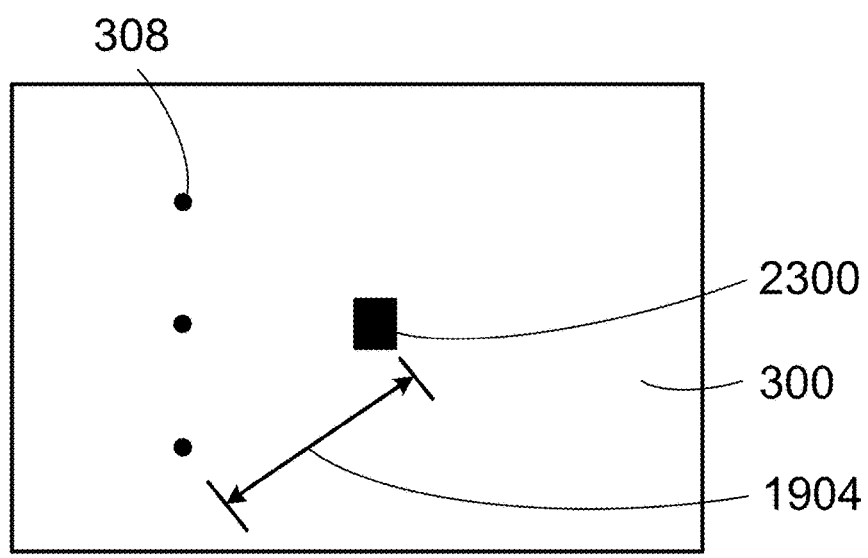
FIG. 27B illustrates the calculation of RP-to-AP distance vectors with the new wireless AP.

FIG. 27B illustrates that the system can calculate RP-to-AP distance vectors 1904 between each of the calibration RPs 308 and the new wireless AP 2300. The system 100 can calculate the location 2302 of the new wireless AP 2300 prior to calculating the estimated AP-to-RP RSSIs 2602. The RP-to-AP distance vector 1904 can have units of meters or feet.

Figure 28:
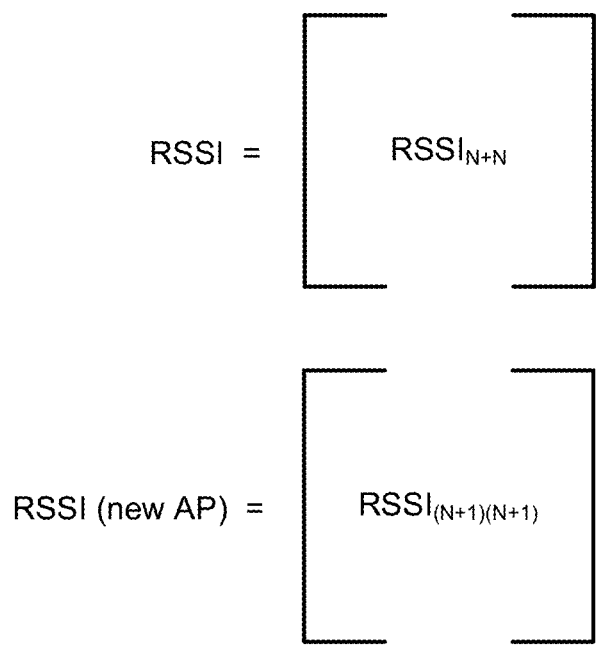
FIG. 28 illustrates the RSSI matrix before and after a new wireless AP is added.

FIG. 28 illustrates that the processing unit 200 of the server 102 can access the RSSI matrix which is N×N for N wireless APs 108 before a new wireless AP 2300 is added to the indoor environment 300. After a new wireless AP 2300 is added to the indoor environment 300, the system can access the RSSI matrix which becomes (N+1)×(N+1). The processing unit 200 can identify the new wireless AP 2300 as a previously unseen AP prior to determining the location of the new wireless AP 2300 by comparing the AP transmit strengths 900 and the AP-to-AP RSSIs 904 against transmit strength data and RSSI data previously stored in the database 110. The processing unit 200 of the server 102 can add an entry into the database 110 associated with the new wireless AP 2300. The database entry can include a time field, a MAC address field, and a number of signal strength fields.

Information for new wireless APs 2300 added to the database 110 can include MAC-ID, SSID, first appearance in database 110, estimated x-location, estimated y-location, location uncertainty, and health status.

FIG. 29 illustrates that the system 100 can be used to discover the moved wireless AP 2900 in the indoor environment 300. The system 100 can include the server 102, network 104, connections 106, calibration devices 112, and wireless APs 108. The server 102 can record a location 2302 for the moved wireless AP 2900 in the database 110. The database 110 can be the wireless signal-strength database. In another embodiment, the server 100 can record and access the location 2302 of the moved wireless AP 2900 in another database. The database 110 can be local to the server 102 or it can be in the cloud. The database 110 can be a wireless signal-strength database, or another database for information that is used or accessed by the server 102. The server 102 can record and access an installation log 2304 in the database 110. The installation log 2304 can be recorded in the database 110 at the time the moved wireless AP 2900 is moved. The server 102 can also record and access check-in data of the wireless APs 108. The check-in data can be compared with a previous check-in of the wireless APs 108.

The system 102 can be used to discover the moved wireless AP 2900 within the indoor environment 300. The system 100 can comprise the wireless APs 108 positioned throughout the indoor environment 300 including one or more moved wireless APs 2900 discovered since a previous check-in. The system 100 can also comprise the server 102 comprising the processing unit 200, the memory unit 202, and the server communication unit 204. The server communication unit 204 can be in communication with the wireless APs 108.

The system 102 can continuously perform online calibration meaning that the wireless APs can periodically send/receive signals to/from their neighbors, and the system 102 can run the AP location solver 2500 on the signal from online calibration. Flagging a moved wireless AP 2900 can be done in several ways. In one variation, the signals from online calibration can differ from those already in the database 110 by more than a threshold (which can be determined by the previously expected variation in each signal). In another variation, the new calculated location can differ from that already in the database 110 by more than a threshold (which can be based on the location uncertainty of each wireless AP 108). In another variation, the mobile device locations calculated using that wireless AP 108 can have higher measurement residuals and the system 102 can mark that wireless AP 108 as 'unhealthy' and suspect that it may have moved.

Figure 30A:
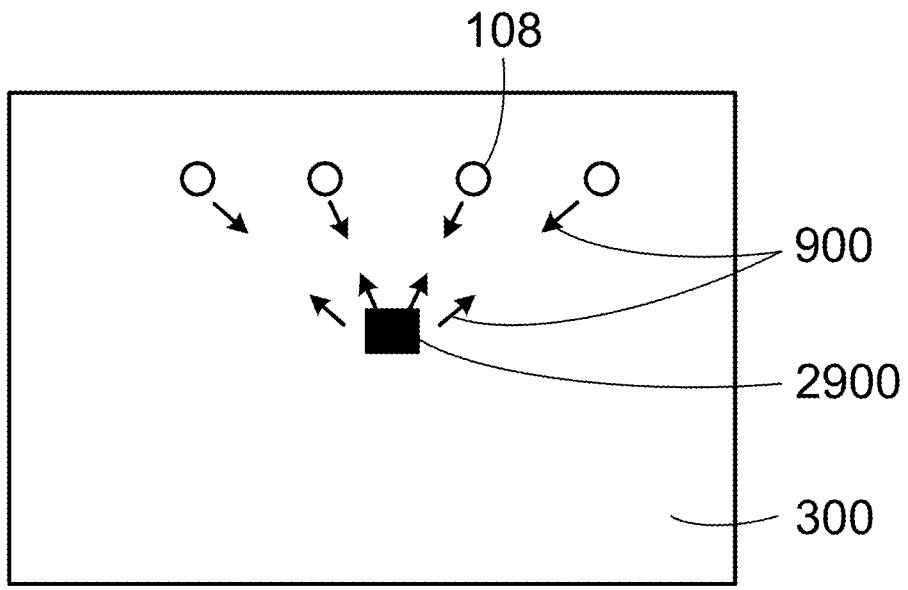
FIG. 30A illustrates AP transmit strengths in the indoor environment with a moved wireless access point (AP).

FIG. 30A illustrates that the moved wireless AP 2900 can transmit wireless signals. The AP transmit strengths 900 in the indoor environment 300 of the moved wireless access point (AP) 2900 can be measured in units of dBm. The system 100 can obtain the AP transmit strengths 900 of wireless signals transmitted by the moved wireless AP 2900 to the other wireless APs 108. The system 100 can also obtain the AP transmit strengths 900 of the wireless signals transmitted by the other wireless APs 108. The AP transmit strengths 900 can be obtained by the system 100 from the moved wireless AP 2900 and the other wireless APs 108 or from the database 110. The system 100 can use a standardized protocol or a proprietary protocol to obtain the AP transmit strengths 900.

The AP transmit strengths 900 can be signal strengths of idealized single-ray signals 404 transmitted by the moved wireless AP 2900 and the other wireless APs 108. The AP-to-AP RSSIs 904 can be signal strengths of the idealized single-ray signals 404 received by the moved wireless AP 2900 and the other wireless APs 108.

Figure 30B:
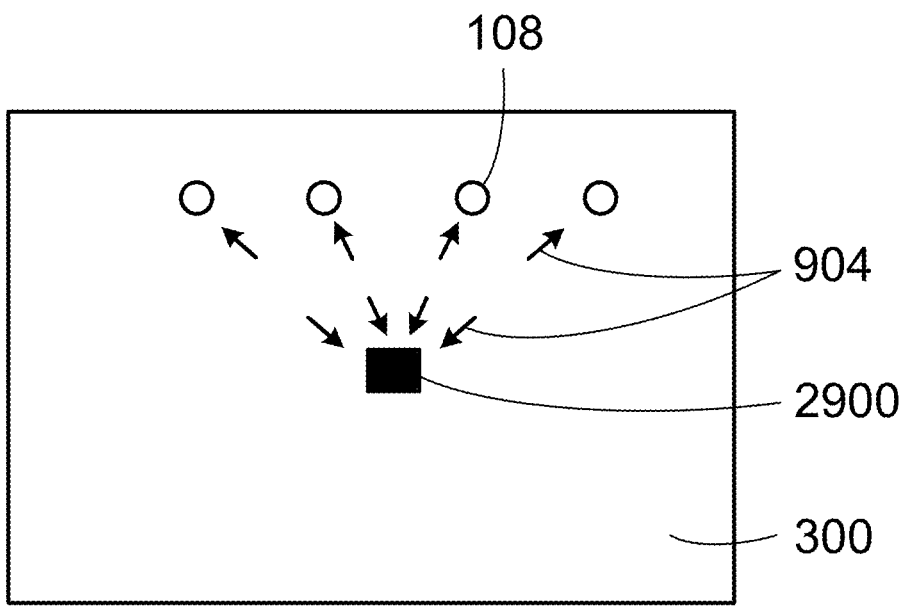
FIG. 30B illustrates AP-to-AP received signal strength indicators (RSSIs) in the indoor environment with a moved wireless access point (AP).

FIG. 30B illustrates that the system 100 can obtain AP-to-AP received signal strength indicators (RSSIs) 904 in an indoor environment 300 from the moved wireless access point (AP) 2900 and the other wireless APs 108. The AP-to-AP RSSIs 904 can be for the wireless signals received at the moved wireless AP 2900 from the wireless signals transmitted by the other wireless APs 108. The AP-to-AP RSSIs 904 can also be for the wireless signals received at each of the other wireless APs 108 from the wireless signals transmitted by the moved wireless AP 2900. The AP-to-AP RSSIs 904 can be obtained by the system 100 from the moved wireless AP 2900 and the other wireless APs 108 or from a database 110. The system 100 can use a standardized protocol or a proprietary protocol to request and receive the AP-to-AP RSSIs 904. The AP-to-AP RSSIs can be measured in units of dBm.

The AP transmit strengths 900 can be signal strengths of idealized single-ray signals 404 transmitted by the moved wireless AP 2900 and the other wireless APs 108. The AP-to-AP RSSIs 904 can be signal strengths of the idealized single-ray signals 404 received by the moved wireless AP 2900 and the other wireless APs 108.

FIG. 31A illustrates AP-to-RP transmit strengths 2600 in an indoor environment 300 representing wireless signals generated by the moved wireless AP 2900.

FIG. 31B illustrates estimated AP-to-RP RSSIs 2602 in an indoor environment 300 representing wireless signals which could be transmitted by the moved wireless AP 2900 and received at the calibration RPs 308. The system 100 can calculate estimated AP-to-RP RSSIs 2602 measured at the calibration RPs 308 from wireless signals transmitted by the moved wireless AP 2900 to the calibration RPs 308 using the spatially-dependent path-loss model 800. The spatially-dependent path-loss model 800 can take as input the location of the moved wireless AP 2300 and the AP transmit strength 900 of the moved wireless AP 2300. The system 100 can add the resulting estimated AP-to-RP RSSIs 2602 to the database 110. The database 110 can be the wireless signal-strength database.

FIG. 31C illustrates RP-to-AP transmit strengths 2604 in an indoor environment 300 transmitted by a calibration device positioned at the calibration RPs 308 to the moved wireless AP 2300.

FIG. 31D illustrates RP-to-AP RSSIs 2606 in an indoor environment 300 measured at the moved wireless AP 2900.

Figure 32A:
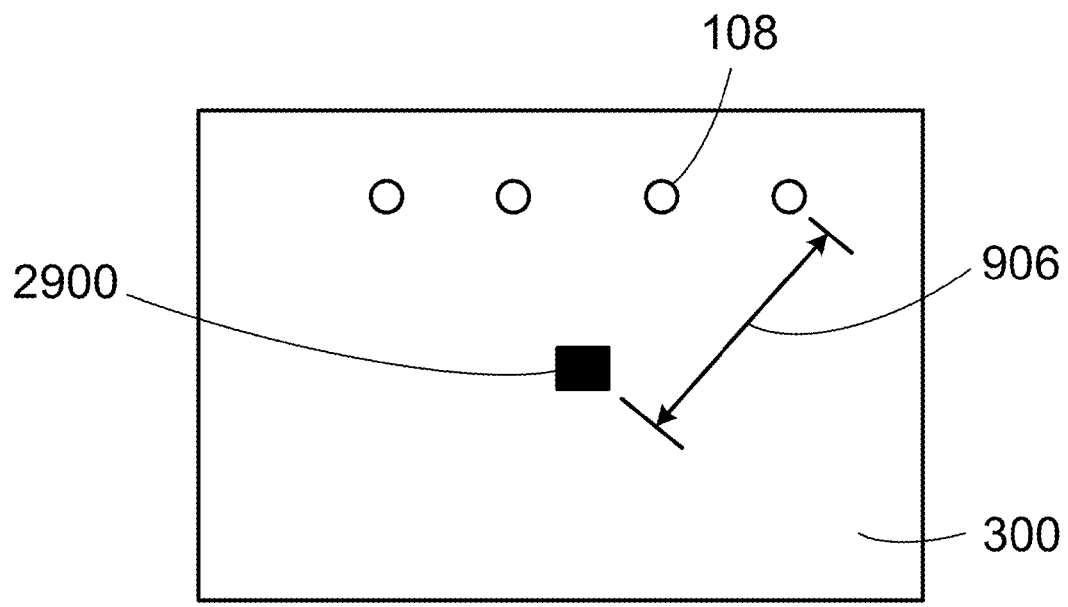
FIG. 32A illustrates the calculation of AP-to-AP distance vectors with the moved wireless AP.

FIG. 32A illustrates that the system 100 can calculate the AP-to-AP distance vectors 906 between each of the wireless APs 108 and the moved wireless AP 2900. The system 100 can calculate the location 2302 of the moved wireless AP 2900 prior to calculating the estimated AP-to-RP RSSIs 2602. The AP-to-AP distance vector 906 can have units of meters or feet.

Figure 32B:
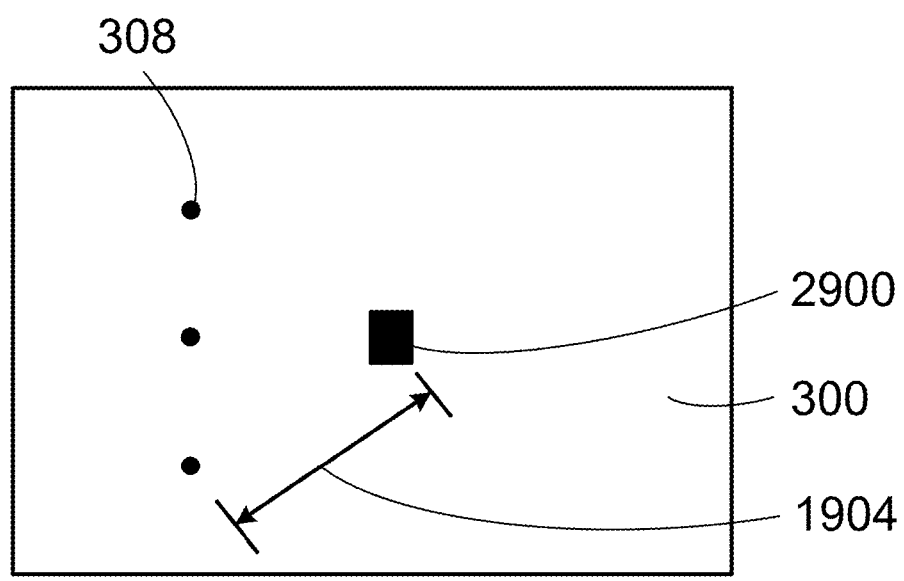
FIG. 32B illustrates the calculation of RP-to-AP distance vectors with the moved wireless AP.

FIG. 32B illustrates that the system can calculate RP-to-AP distance vectors 1904 between each of the calibration RPs 308 and the moved wireless AP 2900. The system 100 can calculate the location 2302 of the new wireless AP 2900 prior to calculating the estimated AP-to-RP RSSIs 2602. The RP-to-AP distance vector 1904 can have units of meters or feet.

A method for discovering the new wireless AP 2300 within the indoor environment 300 can include obtaining, using the server communication unit 204 of the server 102, AP transmit strengths 900 of wireless signals transmitted by the new wireless AP 2300 to the other wireless APs 108 and of the wireless signals transmitted by the other wireless APs 108 to the new wireless AP 2300. The AP transmit strengths 900 can be obtained from the new wireless AP 2300 and the other wireless APs 108. The method can then include obtaining, using the server communication unit 204, AP-to-AP received signal strength indicators (RSSIs) 904 measured at the new wireless AP 2300 from the wireless signals transmitted by the other wireless APs 108 and the AP-to-AP RSSIs 904 measured at each of the other wireless APs 108 from the wireless signals transmitted by the new wireless AP 2300. The AP-to-AP RSSIs 904 can be obtained from the new wireless AP 2300 and the other wireless APs 108. The method can include determining, using a processing unit 200 of the server 102, the location 2302 of the new wireless AP 2300 within the indoor environment 300 using information from at least one of the installation log 2304 and the AP location solver 2500 based on information from the AP transmit strengths 900, the AP-to-AP RSSIs 904, and data from the database 110. The method can then include calculating, using the processing unit 200, a number of estimated AP-to-RP RSSIs 2602 representing estimated RSSIs which could be measured at the calibration RPs 308 from wireless signals transmitted by the new wireless AP 2300 to the calibration RPs 308 using the spatially-dependent path-loss model 800 based on the location 2302 of the new wireless AP 2300 and the AP transmit strength 900 of the new wireless AP 2302. The method can then include adding, using the processing unit 200, the estimated AP-to-RP RSSIs 2602 to the database 110. The method can also include calculating, using the processing unit 200, AP-to-AP distance vectors 906 between each of the APs and the new wireless AP 2300 using the location 2302 of the new wireless AP 2300 calculated prior to calculating the estimated AP-to-RP RSSIs 2602. The method can also include calculating, using the processing unit 200, RP-to-AP distance vectors 1904 between each of the calibration RPs 308 and the new wireless AP 2300 using the location 2302 of the new wireless AP 2300 calculated prior to calculating the estimated AP-to-RP RSSIs 2602. The method can also include identifying using the processing unit 200, the new wireless AP 2300 as a previously unseen AP prior to determining the location 2302 of the new wireless AP 2300 by comparing the AP transmit strengths 900 and the AP-to-AP RSSIs 904 against transmit strength data and RSSI data previously stored in the database 110. The method can then include adding, using the processing unit 200, an entry in the database 110 associated with the new wireless AP 2300. The AP transmit strengths 900 can be signal strengths of idealized single-ray signals transmitted 404 by the new wireless AP 2300 and the other wireless APs 108. The AP-to-AP RSSIs 904 can be signal strengths of idealized single-ray signals 404 received by the new wireless AP 2300 and the other wireless APs 108.

A method of discovering the moved wireless access point (AP) 2900 within the indoor environment 300 can include obtaining, using a server communication unit 204 of a server 102, AP transmit strengths 900 of wireless signals transmitted by a number of wireless APs 108 within the indoor environment 300 to other wireless APs 108 within the indoor environment 300. At least one of the wireless APs 108 has been physically moved within the indoor environment 300 since a previous check-in. The method can include obtaining, using the server communication unit 204, AP-to-AP received signal strength indicators (RSSIs) 904 measured at each of the wireless APs 108 from the wireless signals generated by each of the other wireless APs 108. The method can then include flagging, using the processing unit 200 of the server 102, one of the wireless APs 108 as the moved wireless AP 2900 by comparing the AP transmit strengths 900 and the AP-to-AP RSSIs 904 against transmit strength data and RSSI data previously stored in the database 110. The method can then include determining, using the processing unit 200, the location 2302 of the moved wireless AP 2900 within the indoor environment 300 using at least one of information from the installation log 2304 and the AP location solver 2500 based on information from the AP transmit strengths 900, the AP-to-AP RSSIs 904, and data from the database 110. The method can then include calculating, using the processing unit 200, a number of estimated AP-to-RP RSSIs 2602 representing estimated RSSIs which could be measured at the calibration RPs 308 from wireless signals transmitted by the moved wireless AP 2900 using a spatially-dependent path-loss model 800 based on the location of the moved wireless AP 2900 and the AP transmit strength 900 of the moved wireless AP 2900. The method can then include adding, using the processing unit 200, the estimated AP-to-RP RSSIs 2602 to the database 110. The AP transmit strengths can be signal strengths of idealized single-ray signals 404 transmitted by the moved wireless AP 2900 and the other wireless APs 108. The AP-to-AP RSSIs 904 can be signal strengths of idealized single-ray signals 404 received by the moved wireless AP 2900 and the other wireless APs 108. The method can also include calculating, using the processing unit 200, AP-to-AP distance vectors 906 between each of the APs and the moved wireless AP 2900 using the location of the moved wireless AP 2900 calculated prior to calculating the estimated AP-to-RP RSSIs 2602. The method can also include calculating, using the processing unit 200, RP-to-AP distance vectors 1904 between each of the calibration RPs 308 and the moved wireless AP 2900 using the location of the moved wireless AP 2900 calculated prior to calculating the estimated AP-to-RP RSSIs 2602.

The systems, devices, methods, elements or combinations thereof disclosed in U.S. patent application Ser. No. 15/192,635, filed Jun. 24, 2016, U.S. patent application Ser. No. 15/256,351, filed Sep. 2, 2016, U.S. Pat. No. 9,210,544, filed Jun. 6, 2014, U.S. Pat. No. 9,258,674, filed Jul. 10, 2014, U.S. Pat. No. 9,367,215, filed Oct. 27, 2014, U.S. Pat. No. 9,414,189, filed Sep. 26, 2014, U.S. Pat. No. 8,315,389 filed Jan. 25, 2010, U.S. patent application Ser. No. 14/469,461, filed Aug. 26, 2014, U.S. patent application Ser. No. 14/938,691, filed Nov. 11, 2015, U.S. patent application Ser. No. 14/701,226, filed Apr. 30, 2015, U.S. patent application Ser. No. 14/822,817, filed Oct. 10, 2015, U.S. patent application Ser. No. 15/388,803, filed Dec. 22, 2016, U.S. patent application Ser. No. 15/388,848, filed Dec. 22, 2016, and U.S. patent application Ser. No. 15/388,826, filed Dec. 22, 2016, can be used in combination with anything disclosed herein and are incorporated herein by reference in their entireties.

A number of embodiments have been described. Nevertheless, it will be understood by one of ordinary skill in the art that various modifications may be made without departing from the spirit and scope of the embodiments. In addition, the flowcharts or logic flows depicted in the figures do not require the particular order shown, or sequential order, to achieve desirable results. In addition, other steps or operations may be provided, or steps or operations may be eliminated, from the described flows, and other components may be added to, or removed from, the described systems. Accordingly, other embodiments are within the scope of the following claims.

It will be understood by one of ordinary skill in the art that the various methods disclosed herein may be embodied in a non-transitory readable medium, machine-readable medium, and/or a machine accessible medium comprising instructions compatible, readable, and/or executable by a processor or processing unit of a machine, device, or computing device. The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

We claim:

1. A system to generate a spatially-dependent path-loss model associated with an indoor environment, the system comprising:
   wireless access points (APs) positioned throughout the indoor environment;
   a calibration device moveable within the indoor environment such that the calibration device is configured to transmit wireless signals to the wireless APs and receive wireless signals transmitted by the wireless APs at a number of calibration reference points (RPs) located throughout the indoor environment; and
   a server comprising a processing unit, a memory unit, and a server communication unit, wherein the server communication unit is in communication with the wireless APs and the calibration device, wherein the processing unit is programmed to:
   divide a coordinate-plane representing the indoor environment into non-overlapping tiles,
   obtain RP calibration transmit strengths of the wireless signals transmitted by the calibration device at each of the calibration RPs to the wireless APs at a first frequency, wherein the RP calibration transmit strengths are obtained from the calibration device or a wireless signal-strength database,
   obtain AP transmit strengths of the wireless signals transmitted by each of the wireless APs to the calibration device at each of the calibration RPs at the first frequency, wherein the AP transmit strengths are obtained from each of the wireless APs or the wireless signal-strength database,
   obtain RP-to-AP calibration RSSIs measured at each of the wireless APs from the wireless signals transmitted by the calibration device at each of the calibration RPs at the first frequency, wherein the RP-to-AP calibration RSSIs are obtained from each of the wireless APs or the wireless signal-strength database,
   obtain AP-to-RP calibration RSSIs measured by the calibration device at each of the calibration RPs from the wireless signals transmitted by each of the wireless APs at the first frequency, wherein the AP-to-RP calibration RSSIs are obtained from the calibration device or the wireless signal-strength database,
   calculate RP-to-AP distance vectors between each of the calibration RPs and the wireless APs,
   construct a set of path-loss equations using the RP calibration transmit strengths at the first frequency, the RP-to-AP calibration RSSIs obtained at the first frequency, the RP-to-AP distance vectors, and tile-specific path-loss coefficient for each of the tiles within the indoor environment,
   construct the set of path-loss equations using the RP calibration transmit strengths at the first frequency, the AP transmit strengths at the first frequency, the RP-to-AP calibration RSSIs obtained at the first frequency, the AP-to-RP calibration RSSIs obtained at the first frequency, the RP-to-AP distance vectors, and the tile-specific path-loss coefficient for each of the tiles within the indoor environment,
   solve the set of path-loss equations to yield a value for the tile-specific path-loss coefficient for each of the tiles within the indoor environment, and
   add AP-to-RP RSSIs to the wireless signal-strength database to update the wireless signal-strength database.

2. The system of claim 1, wherein the tiles comprise at least a first tile having a first shape and a second tile having a second shape, wherein the first shape is different from the second shape.

3. The system of claim 2, wherein a side of the first shape is selected to align with a physical feature of the indoor environment that attenuates wireless signals at the first frequency.

4. The system of claim 1, wherein the processing unit is further programmed to divide the coordinate plane into a number of the non-overlapping tiles covering the indoor environment, wherein the number of tiles is dependent on an amount of wireless APs and calibration RPs within the indoor environment.

5. The system of claim 1, wherein a path-loss within each of the tiles is spatially independent such that the tile-specific path-loss coefficient calculated for each of the tiles is a constant value.

6. The system of claim 1, wherein the RP calibration transmit strengths are signal strengths of idealized single-ray signals transmitted by the calibration device at each of the calibration RPs and the RP-to-AP calibration RSSIs are signal strengths of the idealized single-ray signals received by each of the wireless APs.

7. A system to generate a spatially-dependent path-loss model associated with an indoor environment, the system comprising:
   wireless access points (APs) positioned throughout the indoor environment;
   a calibration device moveable within the indoor environment such that the calibration device is configured to transmit wireless signals to the wireless APs and receive wireless signals transmitted by the wireless APs at a number of calibration reference points (RPs) located throughout the indoor environment; and
   a server comprising a processing unit, a memory unit, and a server communication unit, wherein the server communication unit is in communication with the wireless APs and the calibration device, wherein the processing unit is programmed to:
      divide a coordinate-plane representing the indoor environment into non-overlapping tiles,
      obtain RP calibration transmit strengths of the wireless signals transmitted by the calibration device at each of the calibration RPs to the wireless APs at a first frequency, wherein the RP calibration transmit strengths are obtained from the calibration device or a wireless signal-strength database,
      obtain additional RP calibration transmit strengths of wireless signals transmitted by the calibration device at each of the calibration RPs to the wireless APs at a second frequency different from the first frequency, wherein the additional RP calibration transmit strengths are obtained from the calibration device or the wireless signal-strength database,
      obtain RP-to-AP calibration RSSIs measured at each of the wireless APs from the wireless signals transmitted by the calibration device at each of the calibration RPs at the first frequency, wherein the RP-to-AP calibration RSSIs are obtained from each of the wireless APs or the wireless signal-strength database,
      obtain additional RP-to-AP calibration RSSIs measured at each of the wireless APs from the wireless signals transmitted by the calibration device at the second frequency, wherein the additional RP-to-AP calibration RSSIs are obtained from each of the wireless APs or the wireless signal-strength database,
      calculate RP-to-AP distance vectors between each of the calibration RPs and the wireless APs,
      construct a set of path-loss equations using the RP calibration transmit strengths at the first frequency, the RP-to-AP calibration RSSIs obtained at the first frequency, the RP-to-AP distance vectors, and tile-specific path-loss coefficient for each of the tiles within the indoor environment,
      construct another set of path-loss equations using the additional RP calibration transmit strengths at the second frequency, the additional RP-to-AP calibration RSSIs obtained at the second frequency, the RP-to-AP distance vectors, and another tile-specific path-loss coefficient for each of the tiles within the indoor environment,
      solve the set of path-loss equations to yield a value for the tile-specific path-loss coefficient for each of the tiles within the indoor environment,
      solve the other set of path-loss equations to yield a value for the other tile-specific path-loss coefficient for each of the tiles within the indoor environment, and
      add AP-to-RP RSSIs to the wireless signal-strength database to update the wireless signal-strength database.

8. The system of claim 7, wherein the tiles comprise at least a first tile having a first shape and a second tile having a second shape, wherein the first shape is different from the second shape.

9. The system of claim 8, wherein a side of the first shape is selected to align with a physical feature of the indoor environment that attenuates wireless signals at the first frequency.

10. The system of claim 7, wherein the processing unit is further programmed to divide the coordinate plane into a number of the non-overlapping tiles covering the indoor environment, wherein the number of tiles is dependent on an amount of wireless APs and calibration RPs within the indoor environment.

11. The system of claim 7, wherein a path-loss within each of the tiles is spatially independent such that the tile-specific path-loss coefficient calculated for each of the tiles is a constant value.

12. The system of claim 7, wherein the RP calibration transmit strengths are signal strengths of idealized single-ray signals transmitted by the calibration device at each of the calibration RPs and the RP-to-AP calibration RSSIs are signal strengths of the idealized single-ray signals received by each of the wireless APs.

13. A system to generate a spatially-dependent path-loss model associated with an indoor environment, the system comprising:
   wireless access points (APs) positioned throughout the indoor environment;
   a calibration device moveable within the indoor environment such that the calibration device is configured to receive wireless signals transmitted by each of the wireless APs at a number of calibration reference points (RPs) located throughout the indoor environment; and
   a server comprising a processing unit, a memory unit, and a server communication unit, wherein the server communication unit is in communication with the wireless APs, wherein the processing unit is programmed to:
      divide a coordinate-plane representing the indoor environment into non-overlapping tiles,
      obtain AP transmit strengths of the wireless signals transmitted by each of the wireless APs to the calibration device at each of the calibration RPs at the first frequency, wherein the AP transmit strengths are obtained from each of the wireless APs or a wireless signal-strength database,
      obtain additional AP transmit strengths of wireless signals transmitted by each of the wireless APs to the calibration device at each of the calibration RPs at a second frequency different from the first frequency, wherein the additional AP transmit strengths are obtained from each of the wireless APs or the wireless signal-strength database, obtain AP-to-RP calibration RSSIs measured by the calibration device at each of the calibration RPs from the wireless signals transmitted by each of the wireless APs at the first frequency, wherein the AP-to-RP calibration RSSIs are obtained from the calibration device or the wireless signal-strength database, obtain additional AP-to-RP calibration RSSIs measured by the calibration device at each of the calibration RPs from the wireless signals transmitted by each of the wireless APs at the second frequency, wherein the additional AP-to-RP calibration RSSIs are obtained from the calibration device or the wireless signal-strength database, calculate AP-to-RP distance vectors between each of the wireless APs and the calibration RPs, construct the set of path-loss equations using the AP transmit strengths at the first frequency, the AP-to-RP calibration RSSIs obtained at the first frequency, the AP-to-RP distance vectors, and tile-specific path-loss coefficient for each of the tiles within the indoor environment, construct another set of path-loss equations using the additional AP transmit strengths at the second frequency, the additional AP-to-RP calibration RSSIs obtained at the second frequency, the AP-to-RP distance vectors, and another tile-specific path-loss coefficient for each of the tiles within the indoor environment, solve the set of path-loss equations to yield a value for the tile-specific path-loss coefficient for each of the tiles within the indoor environment, solve the other set of path-loss equations to yield a value for the other tile-specific path-loss coefficient for each of the tiles within the indoor environment, and add AP-to-RP RSSIs to the wireless signal-strength database to update the wireless signal-strength database.

14. The system of claim 13, wherein at least one of the tiles is shaped as a polygon having at least three sides.

15. The system of claim 13, wherein the tiles comprise at least a first tile having a first shape and a second tile having a second shape, wherein the first shape is different from the second shape.

16. The system of claim 15, wherein a side of the first shape is selected to align with a physical feature of the indoor environment that attenuates wireless signals at the first frequency.

17. The system of claim 13, wherein the processing unit is further programmed to divide the coordinate plane into a number of the non-overlapping tiles covering the indoor environment, wherein the number of tiles is dependent on an amount of wireless APs and calibration RPs within the indoor environment.

18. The system of claim 13, wherein a path-loss within each of the tiles is spatially independent such that the tile-specific path-loss coefficient calculated for each of the tiles is a constant value.

19. The system of claim 13, wherein the AP transmit strengths are signal strengths of idealized single-ray signals transmitted by each of the wireless APs to the calibration device and the AP-to-RP calibration RSSIs are signal strengths of the idealized single-ray signals measured by the calibration device at each of the calibration RPs from the wireless signals transmitted by each of the wireless APs.

\* \* \* \* \*